US012743531B2

(12) United States Patent
Roper, Jr. et al.

(10) Patent No.: US 12,743,531 B2

(45) Date of Patent: Sep. 22, 2026

(54) MULTIMODAL USER INTERFACES FOR INTERACTING WITH DIGITAL MODEL FILES

(71) Applicant: Istari Digital, Inc., Charleston, SC (US)

(72) Inventors: William Roper, Jr., Charleston, SC (US); Christopher Lee Benson, Arlington, VA (US); Sriram Krishnan, Cambridge, MA (US); Baha aldeen E. A. Abunojaim, Roslindale, MA (US); Christopher Alexis Kotelly, Boston, MA (US); Rida Jalal Rida Haj Daoud, Amman (JO); Dwight Edward DeGroff, Westminster, MD (US)

(73) Assignee: Istari Digital, Inc., Charleston, SC (US)

( * ) Notice: Subject to any disclaimer, the term of this patent is extended or adjusted under 35 U.S.C. 154(b) by 0 days.

(21) Appl. No.: 19/328,121

(22) Filed: Sep. 13, 2025

(65) Prior Publication Data

US 2026/0010642 A1 Jan. 8, 2026

Related U.S. Application Data

(63) Continuation of application No. PCT/US2024/040468, filed on Jul. 31, 2024.

(Continued)

(51) Int. Cl.

| | |
|---|---|
| ***G06F 21/60*** | (2013.01) |
| ***G06F 16/3329*** | (2025.01) |
| ***G06F 21/62*** | (2013.01) |

(52) U.S. Cl.

CPC ...... *G06F 21/604* (2013.01); *G06F 16/33295* (2025.01); *G06F 21/6209* (2013.01); *G06F 2221/2141* (2013.01)

(58) Field of Classification Search

CPC ............. G06F 21/604; G06F 16/33295; G06F 21/6209; G06F 2221/2141

See application file for complete search history.

(56) References Cited

U.S. PATENT DOCUMENTS

| | | | | |
|---|---|---|---|---|
| 11,232,176 B1 | 1/2022 | Leonardi | | |
| 2006/0190264 A1* | 8/2006 | Jaramillo | ............. | H04M 3/385 704/270.1 |

(Continued)

OTHER PUBLICATIONS

Hafidy et al., "Digital Artifact Analysis on Windows Subsystem for Android (WSA) based on ISO/IEC," 2024 IEEE 2nd International Conference on Electrical Engineering, Computer and Information Technology (ICEECIT) Year: 2024 | Conference Paper | Publisher: IEEE.*

(Continued)

*Primary Examiner* — Roderick Tolentino

(74) *Attorney, Agent, or Firm* — American Patent Agency PC; Daniar Hussain; Stephen M. Hou

(57) ABSTRACT

Methods and systems enabling multimodal inputs for interacting with a live digital object are provided. The system receives the live digital object which includes a digital artifact extracted from a digital model file through a model representation. The system receives a user's security level and determines the user's access permission and modification permission to access and modify the digital artifact. The system accesses a multimodal interface configured to receive a conversational input and a spatial input, outputs the digital artifact to the multimodal interface based on the access permission, receives from the multimodal interface a conversational input and a spatial input from the user, and generates a modified digital artifact from the digital artifact via the digital model representation, based on the modification permission and on the conversational or spatial input. The multimodal interface may include conventional inter- (Continued)

faces (GUIs/APIs), conversational interfaces (text/voice), and spatial computing interfaces (VR/AR/MR/gestural).

20 Claims, 33 Drawing Sheets

Related U.S. Application Data

(60) Provisional application No. 63/516,891, filed on Aug. 1, 2023.

(56) References Cited

U.S. PATENT DOCUMENTS

| | | | | |
|---|---|---|---|---|
| 2013/0249902 | A1* | 9/2013 | Byrne | G06T 19/006 345/419 |
| 2019/0147411 | A1 | 5/2019 | John et al. | |
| 2020/0218519 | A1 | 7/2020 | Brebner | |
| 2021/0029123 | A1* | 1/2021 | Monteath | G05B 19/4099 |
| 2021/0086451 | A1 | 3/2021 | Carbone et al. | |
| 2021/0097182 | A1* | 4/2021 | Strogov | G06F 21/566 |
| 2022/0229895 | A1* | 7/2022 | Ranjan | G06F 21/35 |
| 2022/0261817 | A1 | 8/2022 | Ferrucci et al. | |
| 2022/0318362 | A1* | 10/2022 | Nagarathnam | G06F 21/32 |
| 2022/0375468 | A1* | 11/2022 | Kane | G06F 40/186 |
| 2022/0405400 | A1* | 12/2022 | Scheitlin | G06F 21/577 |
| 2024/0054190 | A1* | 2/2024 | Badr | G06F 21/16 |
| 2024/0169195 | A1* | 5/2024 | Tao | G06N 3/08 |

OTHER PUBLICATIONS

Koo et al., "A Reconfigurable Multimodal Sensor Interface IC Based on Direct-Conversion AZ Modulator Structure," 2024 IEEE International Symposium on Circuits and Systems (ISCAS) Year: 2024 | Conference Paper | Publisher: IEEE.*

International Search Report and Written Opinion of PCT Application No. PCT/US24/40468, mailed on Oct. 21, 2024.

International Preliminary Report on Patentability of PCT Application No. PCT/US24/40468, mailed on Sep. 10, 2025.

* cited by examiner

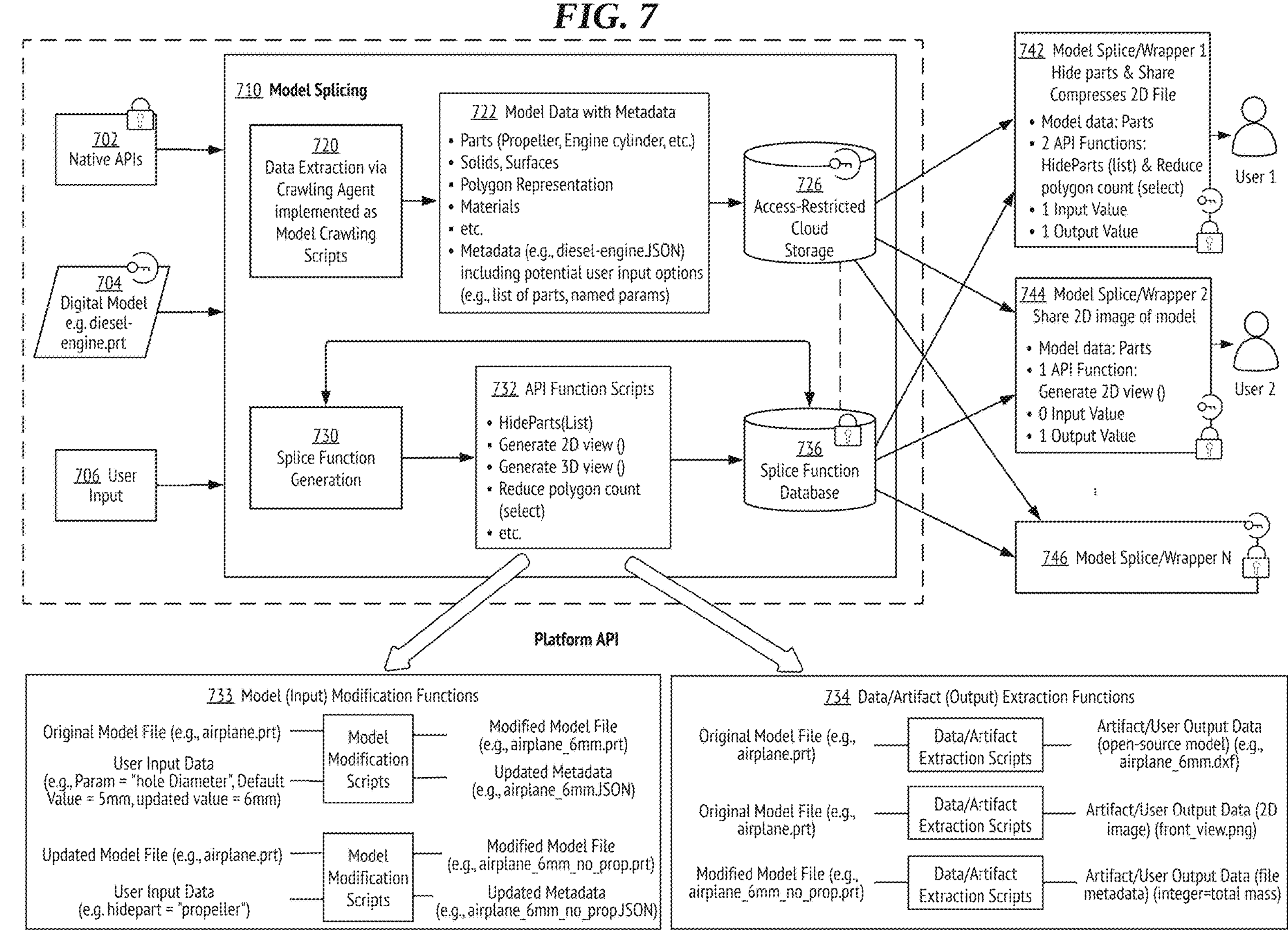

FIG. 7
702 Native APIs
704 Digital Model e.g. diesel-engine.prt
706 User Input
710 Model Splicing
720 Data Extraction via Crawling Agent implemented as Model Crawling Scripts
722 Model Data with Metadata
• Parts (Propeller, Engine cylinder, etc.)
• Solids, Surfaces
• Polygon Representation
• Materials
• etc.
• Metadata (e.g., diesel-engine.JSON) including potential user input options (e.g., list of parts, named params)
726 Access-Restricted Cloud Storage
730 Splice Function Generation
732 API Function Scripts
• HideParts(List)
• Generate 2D view ()
• Generate 3D view ()
• Reduce polygon count (select)
• etc.
736 Splice Function Database
742 Model Splice/Wrapper 1 Hide parts & Share Compresses 2D File
• Model data: Parts
• 2 API Functions: HideParts (list) & Reduce polygon count (select)
• 1 Input Value
• 1 Output Value
User 1
744 Model Splice/Wrapper 2 Share 2D image of model
• Model data: Parts
• 1 API Function: Generate 2D view ()
• 0 Input Value
• 1 Output Value
User 2
746 Model Splice/Wrapper N
Platform API
733 Model (Input) Modification Functions
Original Model File (e.g., airplane.prt)
User Input Data (e.g., Param = "hole Diameter", Default Value = 5mm, updated value = 6mm)
Model Modification Scripts
Modified Model File (e.g., airplane_6mm.prt)
Updated Metadata (e.g., airplane_6mm.JSON)
Updated Model File (e.g., airplane.prt)
User Input Data (e.g. hidepart = "propeller")
Model Modification Scripts
Modified Model File (e.g., airplane_6mm_no_prop.prt)
Updated Metadata (e.g., airplane_6mm_no_prop.JSON)
734 Data/Artifact (Output) Extraction Functions
Original Model File (e.g., airplane.prt)
Data/Artifact Extraction Scripts
Artifact/User Output Data (open-source model) (e.g., airplane_6mm.dxf)
Original Model File (e.g., airplane.prt)
Data/Artifact Extraction Scripts
Artifact/User Output Data (2D image) (front_view.png)
Modified Model File (e.g., airplane_6mm_no_prop.prt)
Data/Artifact Extraction Scripts
Artifact/User Output Data (file metadata) (integer=total mass)

MULTIMODAL USER INTERFACES FOR INTERACTING WITH DIGITAL MODEL FILES

REFERENCE TO RELATED APPLICATIONS

If an Application Data Sheet ("ADS") or PCT Request Form ("Request") has been filed on the filing date of this application, it is incorporated by reference herein. Any applications claimed on the ADS or Request for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

Furthermore, this application is related to the U.S. patent applications listed below, which are incorporated by reference in their entireties herein, as if fully set forth herein:

- PCT application No. PCT/US24/38878, filed on Jul. 19, 2024, entitled "Generative Artificial Intelligence (AI) for Digital Workflows," describes efficient AI-assisted script generation methods that preserve customer data sovereignty.
- PCT application No. PCT/US24/35885, filed on Jun. 27, 2024, entitled "Artificial Intelligence (AI) Assisted Integration of New Digital Model Types and Tools into Integrated Digital Model Platform," describes the enhancement of model splicer technology through AI-assistance.
- PCT application No. PCT/US24/27912, filed on May 5, 2024, entitled "Secure and Scalable Sharing of Digital Engineering Documents," describes secure and scalable document splicing technology.
- PCT application No. PCT/US24/27898, filed on May 4, 2024, entitled "Digital Twin Enhancement using External Feedback within Integrated Digital Model Platform," describes digital and physical twin management and the integration of external feedback within a DE platform.
- PCT application No. PCT/US24/19297, filed on Mar. 10, 2024, entitled "Software-Code-Defined Digital Threads in Digital Engineering Systems with Artificial Intelligence (AI) Assistance," describes AI-assisted digital threads for digital engineering platforms.
- PCT application No. PCT/US24/18278, filed on Mar. 3, 2024, entitled "Secure and Scalable Model Splicing of Digital Engineering Models for Software-Code-Defined Digital Threads," describes model splicing for digital engineering platforms.
- PCT application No. PCT/US24/14030, filed on Feb. 1, 2024, entitled "Artificial Intelligence (AI) Assisted Digital Documentation for Digital Engineering," describes AI-assisted documentation for digital engineering platforms.
- U.S. provisional patent application No. 63/442,659, filed on Feb. 1, 2023, entitled "AI-Assisted Digital Documentation for Digital Engineering with Supporting Systems and Methods," describes AI-assistance tools for digital engineering, including modeling and simulation applications, and the certification of digitally engineered products.
- U.S. provisional patent application No. 63/451,545, filed on Mar. 10, 2023, entitled "Digital Threads in Digital Engineering Systems, and Supporting AI-Assisted Digital Thread Generation," describes model splicer and digital threading technology.

- U.S. provisional patent application No. 63/451,577, filed on Mar. 11, 2023, entitled "Model Splicer and Microservice Architecture for Digital Engineering," describes model splicer technology.
- U.S. provisional patent application No. 63/462,988, filed on Apr. 29, 2023, also entitled "Model Splicer and Microservice Architecture for Digital Engineering," describes model splicer technology.
- U.S. provisional patent application No. 63/511,583, filed on Jun. 30, 2023, entitled "AI-Assisted Model Splicer Generation for Digital Engineering," describes model splicer technology with AI-assistance.
- U.S. provisional patent application No. 63/516,624, filed on Jul. 31, 2023, entitled "Document and Model Splicing for Digital Engineering," describes document splicer technology.
- U.S. provisional patent application No. 63/520,643, filed on Aug. 20, 2023, entitled "Artificial Intelligence-Assisted Automation of Testing in a Software Environment," describes software testing with AI-assistance.
- U.S. provisional patent application No. 63/590,420, filed on Oct. 14, 2023, entitled "Commenting and Collaboration Capability within Digital Engineering Platform," describes collaborative capabilities.
- U.S. provisional patent application No. 63/586,384, filed on Sep. 28, 2023, entitled "Artificial Intelligence (AI)-Assisted Streamlined Model Splice Generation, Unit Testing, and Documentation," describes streamlined model splicing, testing and documentation with AI-assistance.
- U.S. provisional patent application No. 63/470,870, filed on Jun. 3, 2023, entitled "Digital Twin and Physical Twin Management with Integrated External Feedback within a Digital Engineering Platform," describes digital and physical twin management and the integration of external feedback within a DE platform.
- U.S. provisional patent application No. 63/515,071, filed on Jul. 21, 2023, entitled "Generative Artificial Intelligence (AI) for Digital Engineering," describes an AI-enabled digital engineering task fulfillment process within a DE software platform.
- U.S. provisional patent application No. 63/517,136, filed on Aug. 2, 2023, entitled "Machine Learning Engine for Workflow Enhancement in Digital Engineering," describes a machine learning engine for model splicing and DE script generation.
- U.S. provisional patent application No. 63/516,891, filed on Aug. 1, 2023, entitled "Multimodal User Interfaces for Digital Engineering," describes multimodal user interfaces for DE systems.
- U.S. provisional patent application No. 63/580,384, filed on Sep. 3, 2023, entitled "Multimodal Digital Engineering Document Interfaces for Certification and Security Reviews," describes multimodal user interfaces for certification and security reviews.
- U.S. provisional patent application No. 63/613,556, filed on Dec. 21, 2023, entitled "Alternative Tool Selection and Optimization in an Integrated Digital Engineering Platform," describes tool selection and optimization.
- U.S. provisional patent application No. 63/584,165, filed on Sep. 20, 2023, entitled "Methods and Systems for Improving Workflows in Digital Engineering," describes workflow optimization in a DE platform.
- U.S. provisional patent application No. 63/590,456, filed on Oct. 15, 2023, entitled "Data Sovereignty Assurance for Artificial Intelligence (AI) Models," relates to data sovereignty assurance during AI model training and evaluation.

U.S. provisional patent application No. 63/606,030, filed on Dec. 4, 2023, also entitled "Data Sovereignty Assurance for Artificial Intelligence (AI) Models," further details data sovereignty assurances during AI model training and evaluation.

U.S. provisional patent application No. 63/419,051, filed on Oct. 25, 2022, entitled "Interconnected Digital Engineering and Certification Ecosystem."

U.S. non-provisional patent application Ser. No. 17/973,142 filed on Oct. 25, 2022, entitled "Interconnected Digital Engineering and Certification Ecosystem."

U.S. non-provisional patent application Ser. No. 18/383,635, filed on Oct. 25, 2023, entitled "Interconnected Digital Engineering and Certification Ecosystem."

U.S. provisional patent application No. 63/489,401, filed on Mar. 9, 2023, entitled "Security Architecture for Interconnected Digital Engineering and Certification Ecosystem."

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

ISTARI DIGITAL is a trademark name carrying embodiments of the present invention, and hence, the aforementioned trademark name may be interchangeably used in the specification and drawings to refer to the products/process offered by embodiments of the present invention. The terms ISTARI and ISTARI DIGITAL may be used in this specification to describe the present invention, as well as the company providing said invention.

FIELD OF THE INVENTION

This invention relates to multimodal user interfaces for digital software platforms, including conversational and spatial computing interfaces for said platforms.

BACKGROUND OF THE INVENTION

The statements in the background of the invention are provided to assist with understanding the invention and its applications and uses, and may not constitute prior art.

Digital engineering, and digital model software more generally, represents a field where developing interactive technologies and techniques such as virtual reality (VR), augmented reality (AR), and mixed reality (MR), are poised to play a major role as interfaces between users and emerging digital engineering platforms. These technologies are being used to create immersive experiences that allow users to interact with digital environments. Other areas of technology adoption include natural language processing (NLP), machine learning (ML), and artificial intelligence (AI). These technologies are being used to create more intelligent and intuitive interfaces that can adapt to the needs of individual users. In some aspects, there are several challenges with the integration of such technologies, such as the siloed nature of digital engineering applications. Furthermore, the fact that each of the feedback sources or digital models likely originate from different clients or organizations can, in some respects, compound the security issues associated with iterative digital engineering.

Conversational interfaces—both text and voice—have become increasingly prevalent in a variety of applications. These interfaces, such as SIRI and ALEXA, have been particularly successful in the realm of home automation, providing users with a hands-free, intuitive way to interact with their devices. However, their application in the field of digital model platforms has been limited. Existing conversational interfaces are primarily designed for general use and lack the specialized functionality required for digital model platforms. These platforms often involve complex operations and require precise control, which is difficult to achieve with the broad commands typically used in general-purpose voice interfaces. Furthermore, these interfaces often struggle to handle the technical language and specific terminology used in the field of digital models. Another limitation of the existing conversational interfaces is their inability to handle complex queries and commands. In the context of digital model platforms, users often need to perform multi-step operations or manipulate large amounts of data across multiple tools, tasks that are beyond the capabilities of current conversational interfaces.

Gestural and spatial interfaces have also been developed for certain applications, such as controlling game consoles, TVs, and projectors. These interfaces allow users to interact with digital systems using gestures or movements, providing a more immersive and interactive experience. However, these interfaces are often limited in their ability to handle precise engineering and model-related tasks, which require a high level of precise interaction with digital systems.

Code interfaces, such as APIs, have been used to interact with digital systems. These interfaces allow users to interact with digital systems using programming languages, providing a high level of control and flexibility. However, these interfaces often require a high level of technical expertise, which can be a barrier for non-technical users.

Therefore, there is a need for a conversational interface, including both text and voice, specifically designed for digital model platforms. Such an interface would need to handle the complex operations and technical language inherent to these platforms, and provide users with a more intuitive and efficient way to interact with their tools. Specifically, such an interface should simplify how the user engages while handling the desired actions on the specific digital software tools.

Furthermore, there is a need to provide a model collaboration platform that integrates multimodal interfaces that include more versatile and sophisticated interfaces (e.g., spatial interfaces alongside conversational interfaces as well as traditional user interfaces), that can handle a wide range of software tasks, and that are accessible to both technical and non-technical users.

Accordingly, it would be an advancement in the state of the art to enable multimodal interfaces within a unified, scalable, collaborative, and secure digital model platform integrating multidisciplinary engineering models from disparate, disconnected tools.

It is against this background that various embodiments of the present invention were developed.

BRIEF SUMMARY OF THE INVENTION

This summary of the invention provides a broad overview of the invention, its application, and uses, and is not intended to limit the scope of the present invention, which will be apparent from the detailed description when read in conjunction with the drawings.

The advent of model splicing as described below, and as further described in PCT applications No. PCT/US24/35885, PCT/US24/27912, PCT/US24/27898, PCT/US24/19297, PCT/US24/18278, and PCT/US24/14030, enables the scripting of digital workflow operations encompassing disparate software tools into a corpus of normative program code. As a consequence, a large space of digital workflows can be threaded into program code, including digital model generation, model modification, model data sharing, digital thread generation, thread modification, thread data extraction, thread data sharing, digital twin generation, digital twin modification, digital twin data extraction, digital twin sharing, etc. In turn, the transformation of digital workflow operations into code enables the generation and training of AI modules for the purpose of manipulating digital models, digital threads, and digital twins.

The methods and systems described herein enable the cross-tool creation, access, and manipulation of digital artifacts, digital model files, digital threads, and digital twins, using multimodal interfaces within a zero-trust environment, thus potentially leading to dramatic reductions in cost and delays throughout all phases of any digitally engineered product's lifecycle.

A live digital object, whether it is a live digital document (a live document interface), live digital board (a live dashboard interface), or a live digital space (a 3D virtual or augmented environment that provides the background context for a digital thread and its associated artifacts), is an interface configured based on zero-trust security principles, and designed to streamline digital workflow processes for decision-making and review.

Although live digital objects enable the creation of secure digital threads with the most relevant data artifacts tailored to a user's needs, the high volume of available digital artifacts can overwhelm users as they try to access the most pertinent information. The integration of VR/AR or spatial computing interfaces holds promise for enhancing user experience. Nevertheless, a VR/AR integration with the interconnected digital model/engineering platform (IDMP/IDEP) introduces additional challenges related to navigation, sorting, display, security, and real-time collaboration pertaining to digital artifacts, digital models, and digital documents.

The methods and systems disclosed herein provide for the integration of VR/AR with the IDMP and its live digital object interfaces, to enhance collaboration in a zero-trust manner, while solving the associated navigation, finding, and sorting problems in a real-time setting. By leveraging VR/AR, users can intuitively interact spatially and conversationally with digital artifacts, enabling quicker navigation and more efficient sorting of digital artifacts and models. This integration also ensures that data is securely displayed, respecting user permissions dynamically, thus supporting a secure and collaborative environment.

Compared to legacy VR/AR interfaces for viewing browsers and/or CAD models, the methods and systems disclosed herein extend the spatial and conversational interface capabilities (through the use of AR/VR peripherals, spatial gesture tracking with or without gloves, gaze tracking, spatial audio, and/or biometric authentication) to the viewing and manipulation of generic digital artifacts in a zero-trust fashion.

Accordingly, various methods, processes, systems, and non-transitory storage medium storing program code for executing processes for interacting with a live digital object are provided. Broadly, the present invention relates to methods and systems for digital workflows and digital engineering, and more specifically, to multimodal user interfaces for digital workflows and digital engineering systems, including conversational and spatial computing interfaces for human users, as well as code interfaces for bot or human users.

According to a first aspect or in one embodiment, a computer-implemented method for interacting with a live digital object is disclosed. The method may include receiving the live digital object. The live digital object may include a digital artifact extracted from a digital model file through a model representation. The model representation may include model-type-specific locators to digital model data. The method may include initiating a connection to a multimodal interface. The multimodal interface may be configured to receive input from at least two different modalities. The multimodal interface may be configured to output the at least two different modalities. The at least two different modalities may include at least a conversational modality and a spatial modality. The method may also include receiving a security level of a first user. The method may include determining an access permission of the first user to access the digital artifact and a modification permission of the first user to modify the digital artifact, based on the security level of the first user. The method may include outputting to the multimodal interface, through the connection, the digital artifact based on the access permission of the first user to access the digital artifact. The method may include receiving from the multimodal interface, through the connection, a conversational input and a spatial input from the first user related to the digital artifact. Finally, the method may include generating a modified digital artifact from the digital artifact via the model representation, based on the modification permission of the first user to modify the digital artifact, and based on at least one of the conversational input and the spatial input.

In a second aspect or in yet another embodiment, a system for interacting with a live digital object is provided, the system including at least one processor and at least one memory storing program code, the program code executable by the at least one processor to cause the at least one processor to execute a process for interacting with the live digital object, the program code including code to perform the aforementioned steps.

In a third aspect or in yet another embodiment, one or more non-transitory, computer-readable storage media storing program code are provided, the program code executable by a processor, the program code when executed by the processor causing the processor to implement a computerized process for interacting with a live digital object, the program code including code to perform the aforementioned steps.

In one embodiment, the program code may further include code to display a plurality of authorized artifacts based on the security level of the first user. The program code may also include code to receive the spatial input from the first user including a first gestural input to select one of the plurality of authorized artifacts. The program code may also include code to receive the spatial input from the first user including second gestural input for a placement of the one of the plurality of authorized artifacts. The program code may also include code to update the live digital object based on the placement of one of the plurality of authorized artifacts.

In another embodiment, the program code may further include code to generate an orchestration script accessing the one of the plurality of authorized artifacts. The orchestration script may include instructions to generate a new live digital object. A new security level of the new live digital object may be based on a given security level of the one of the plurality of authorized artifacts.

In yet another embodiment, the digital model file may be selected from the group consisting of a digital engineering (DE) model file, a medical model file, a supply chain logistics model file, a manufacturing model file, and a financial model file.

In one embodiment, the model representation may include a model splice connected to the digital model file. The model splice may include one or more splice data items, one or more splice data structures, and a splice function providing access to the digital artifact. The access to the digital artifact may be provided through an item selected from the group consisting of an Application Programming Interface (API) and a Software Development Kit (SDK) endpoint.

In another embodiment, the live digital object may be maintained using a software-code-defined digital thread. The software-code-defined digital thread may include instructions to access the model splice. The software-code-defined digital thread may include instructions to access the digital model file and a different digital model file.

In yet another embodiment, the digital model file and the different digital model file may be from different software tools. The software-code-defined digital thread may access a different digital artifact through a different model splice connected to the different digital model file.

In one embodiment, the program code may further include code to share the model splice associated with the modified digital artifact.

In another embodiment, the program code may further include code to modify the model representation. The code to modify the model representation may include code to update the model splice. The code to update the model splice may include code to update a splice feature of the model splice selected from the group of splice features consisting of a given splice data item of the model splice, a given splice data structure of the model splice, and a given splice function of the model splice.

In yet another embodiment, the modified digital artifact may appear on the live digital object within a predetermined delay.

In one embodiment, the live digital object may be a live digital document. The live digital document may include one or more digital artifacts retrieved from one or more model files within the predetermined delay.

In another embodiment, the live digital object may be a live digital board. The live digital board may display one or more documents and one or more applications on a two-dimensional (2D) screen rendered on a modality of the multimodal interface selected from the group consisting of a 2D display, a two-and-a-half-dimensional (2.5D) display, and a three-dimensional (3D) semi-immersive or fully immersive display.

In yet another embodiment, the live digital object may be a live digital space. The live digital space may display one or more documents and one or more other applications in a virtual space in a 3D spatial display.

In one embodiment, the live digital object may be stored and accessed from an interconnected digital model platform (IDMP).

In another embodiment, the program code may further include code to send the modified digital artifact to a second user. The program code may further include code to receive a feedback instruction from the second user. Responsive to action or approval of the first user, the program code may further include code modify the digital model file based on the feedback instruction from the second user.

In yet another embodiment, the live digital object may further include a second digital artifact accessed through a second model representation. The program code may further include code to receive a second user input from the second user on the live digital object. The second user input may be in a modality selected from the group consisting of the conversational modality and the spatial modality. The program code may further include code to further modify, based on the second user input, the second digital artifact to generate a second modified digital artifact.

In one embodiment, the live digital object may be in an interconnected digital model platform (IDMP). The IDMP may include a natural language processing (NLP) module configured to engage in a dialogue with the first user based on one or more user inputs. The multimodal interface may further be configured to communicate with the first user in natural language.

In another embodiment, the multimodal interface may include a conversational interface configured to receive an audio-based input. The one or more user inputs may include a voice-based input.

In yet another embodiment, the multimodal interface may include a conversation interface configured to receive a text-based input. At least one of the one or more user inputs may include the text-based input.

In one embodiment, the spatial input may include at least one of an augmented reality (AR) input, a virtual reality (VR) input, a mixed reality (MR) input, and a gestural input.

In another embodiment, the multimodal interface may include a spatial computing interface including a video input module, an audio input module, and a gesture input module. A video-based input may be captured via video received at the video input module. An audio-based input may be captured via audio received at the audio input module. At least one gesture may be extracted via the gestural input module.

In yet another embodiment, the spatial computing interface may further be configured to receive a contextual information associated with the video-based input.

In a fourth aspect or in yet another embodiment, a non-transitory, computer-readable storage medium is provided, the non-transitory, computer-readable storage medium storing executable instructions which when executed by one or more processors, cause the processors to perform a process for interacting with a live digital object, including the aforementioned steps.

In a fifth aspect or in yet another embodiment, a computer program product is provided. The computer program may be used for interacting with a live digital object, and may include a computer-readable storage medium having program instructions, or program code, embodied therewith, the program instructions executable by a processor to cause the processor to perform the aforementioned steps.

In a sixth aspect or in yet another embodiment, a system for interacting with a live digital object is provided, the system including a memory that stores computer-executable components, and a hardware processor, operably coupled to the memory, and that executes the computer-executable components stored in the memory, where the computer-executable components may include components communicatively coupled with the processor that execute the aforementioned steps.

In a seventh aspect or in yet another embodiment, a system for interacting with a live digital object is provided, the system including a user device having a processor, a multimodal interface, a first memory; a server including a second memory and a data repository; a communications link between said user device and said server; and a plurality of computer codes embodied on said first and second memory of said user device and said server, said plurality of computer codes which when executed causes said server and said user device to execute a process including the steps described herein.

In an eighth aspect or in yet another embodiment, a computerized server is provided, including at least one processor, memory, and a plurality of computer codes embodied on said memory, said plurality of computer codes which when executed causes said processor to execute a process including the steps described herein. Other aspects and embodiments of the present invention include the methods, processes, and algorithms including the steps described herein, and also include the processes and modes of operation of the systems and servers described herein.

In a ninth aspect or in yet another embodiment, an edge computerized system is provided, the edge computerized system running on a physical system or physical twin with either access to, or dedicated, processing, memory, computer code stored on a non-transitory computer-readable storage medium of the physical system or physical twin, and a plurality of sensor data being measured on said physical system or physical twin, the computer code causing the processor to perform the aforementioned steps.

Features which are described in the context of separate aspects and/or embodiments of the invention may be used together and/or be interchangeable wherever possible. Similarly, where features are, for brevity, described in the context of a single embodiment, those features may also be provided separately or in any suitable sub-combination. Features described in connection with the non-transitory physical storage medium may have corresponding features definable and/or combinable with respect to a digital documentation system and/or method and/or system, or vice versa, and these embodiments are specifically envisaged.

Yet other aspects and embodiments of the present invention will become apparent from the detailed description of the invention when read in conjunction with the attached drawings.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. For clarity, simplicity, and flexibility, not all elements, components, or specifications are defined in all drawings. Not all drawings corresponding to specific steps or embodiments of the present invention are drawn to scale. Emphasis is instead placed on illustration of the nature, function, and product of the manufacturing method and devices described herein.

Embodiments of the present invention described herein are exemplary, and not restrictive. Embodiments will now be described, by way of examples, with reference to the accompanying drawings, in which:

Interconnected Digital Engineering/Model Platform (IDEP/IDMP)

Figure 1:
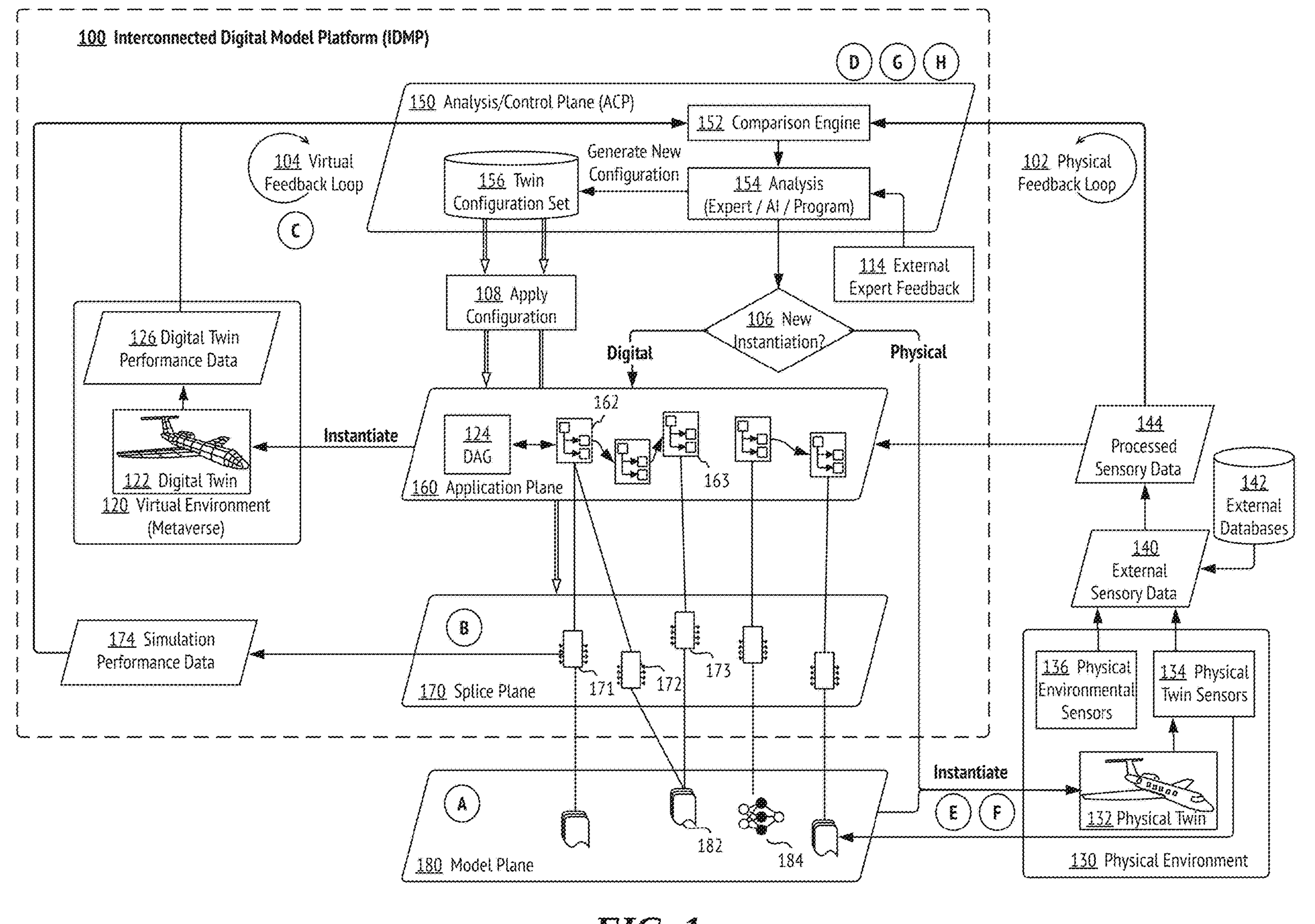

FIG. 1 shows an exemplary interconnected digital model platform (IDMP) architecture, in accordance with some embodiments of the present invention.

Figure 2:
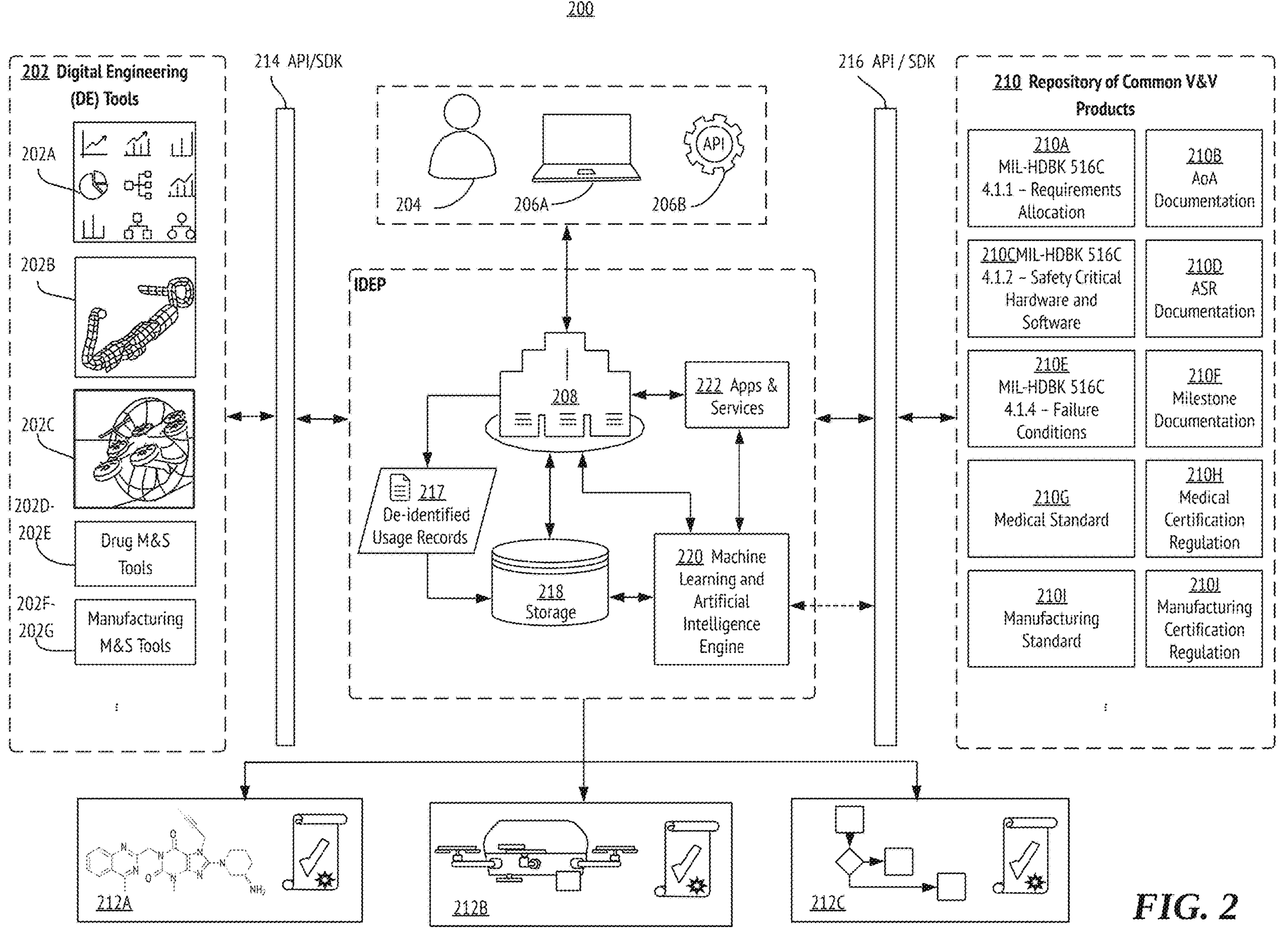

FIG. 2 shows an exemplary implementation of the IDEP as an interconnected digital engineering (DE) and certification ecosystem, and exemplary digitally certified products, in accordance with some embodiments of the present invention.

Figure 3:
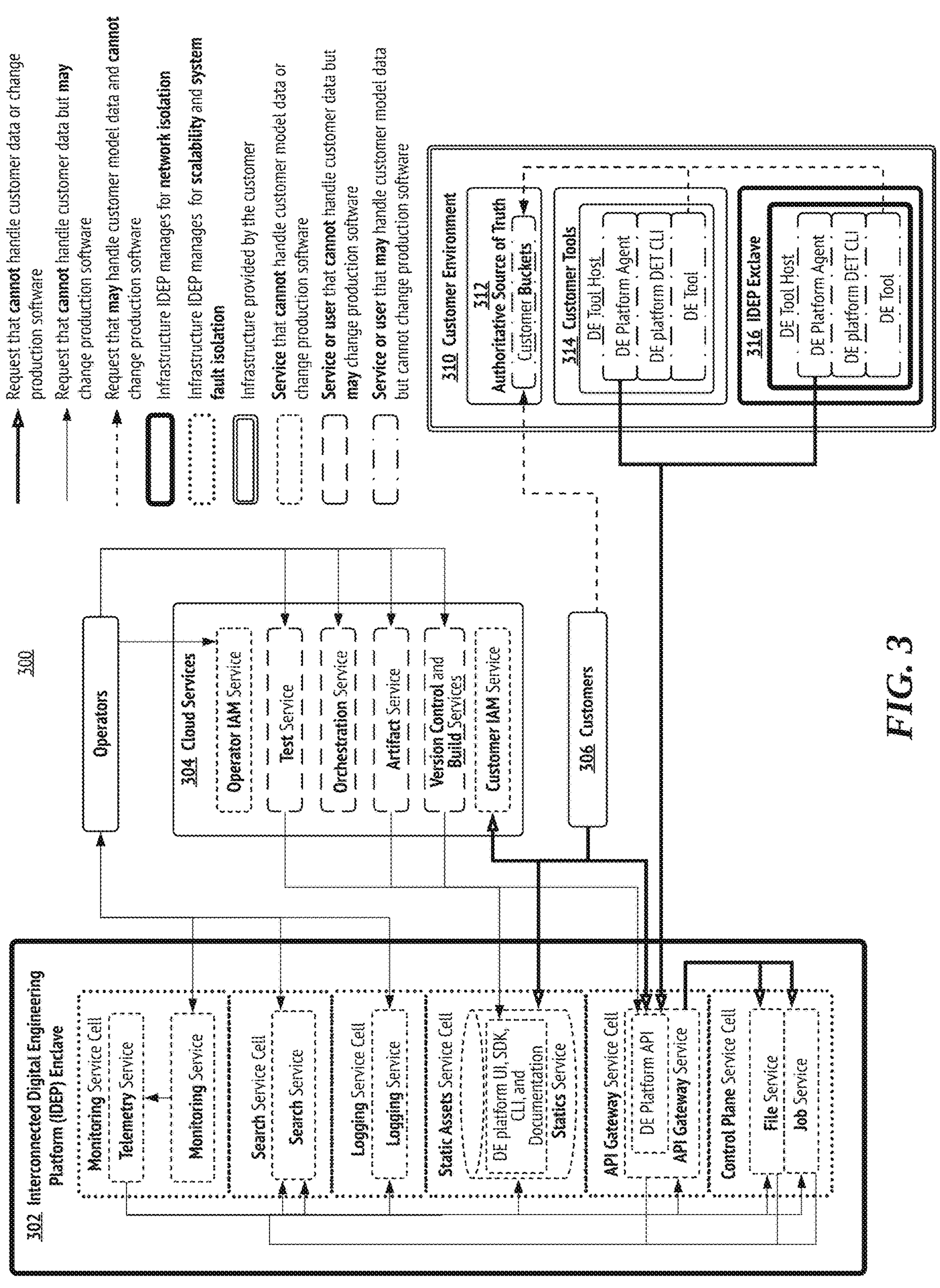

FIG. 3 shows another exemplary implementation of the IDEP illustrating its offered services and features, in accordance with some embodiments of the present invention.

Figure 4:
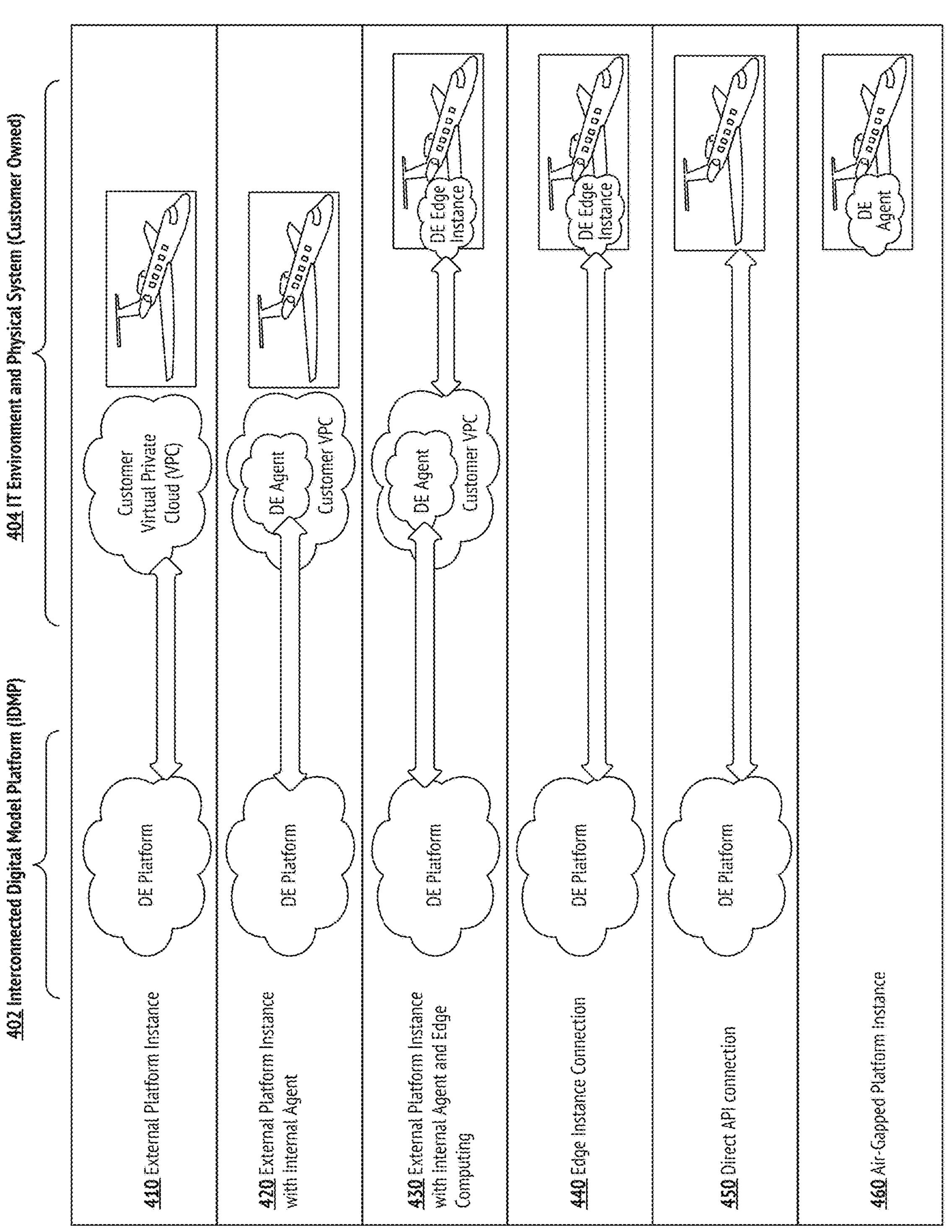

FIG. 4 shows potential scenarios for instantiating an IDEP in connection to a customer's physical system and IT environment, in accordance with some embodiments of the present invention.

Figure 5:
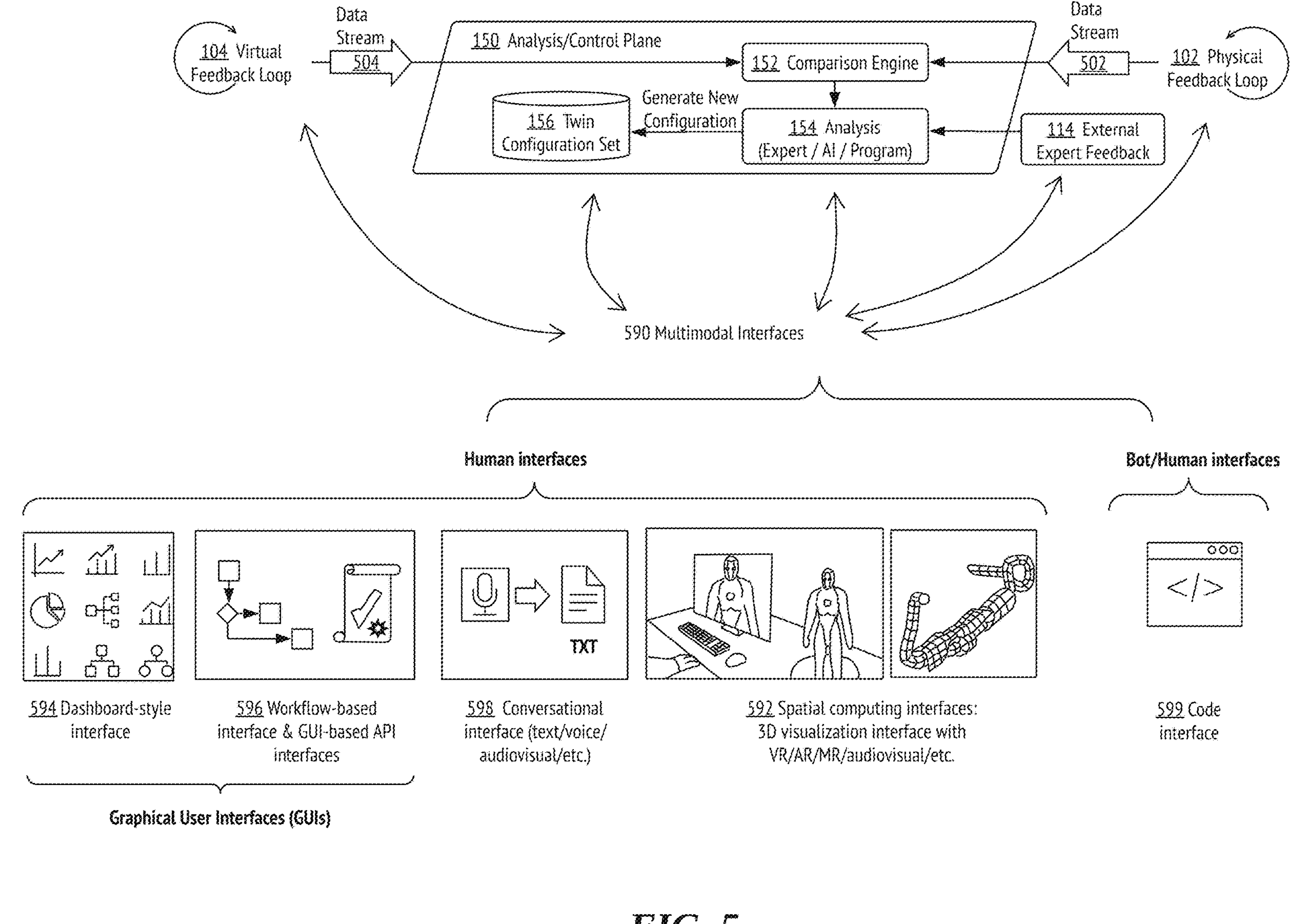

FIG. 5 shows exemplary multimodal interface designs for integration of feedback in am IDEP, in accordance with some embodiments of the present invention.

Digital Engineering Platform Links Digital Models into Digital Threads

Figure 6:
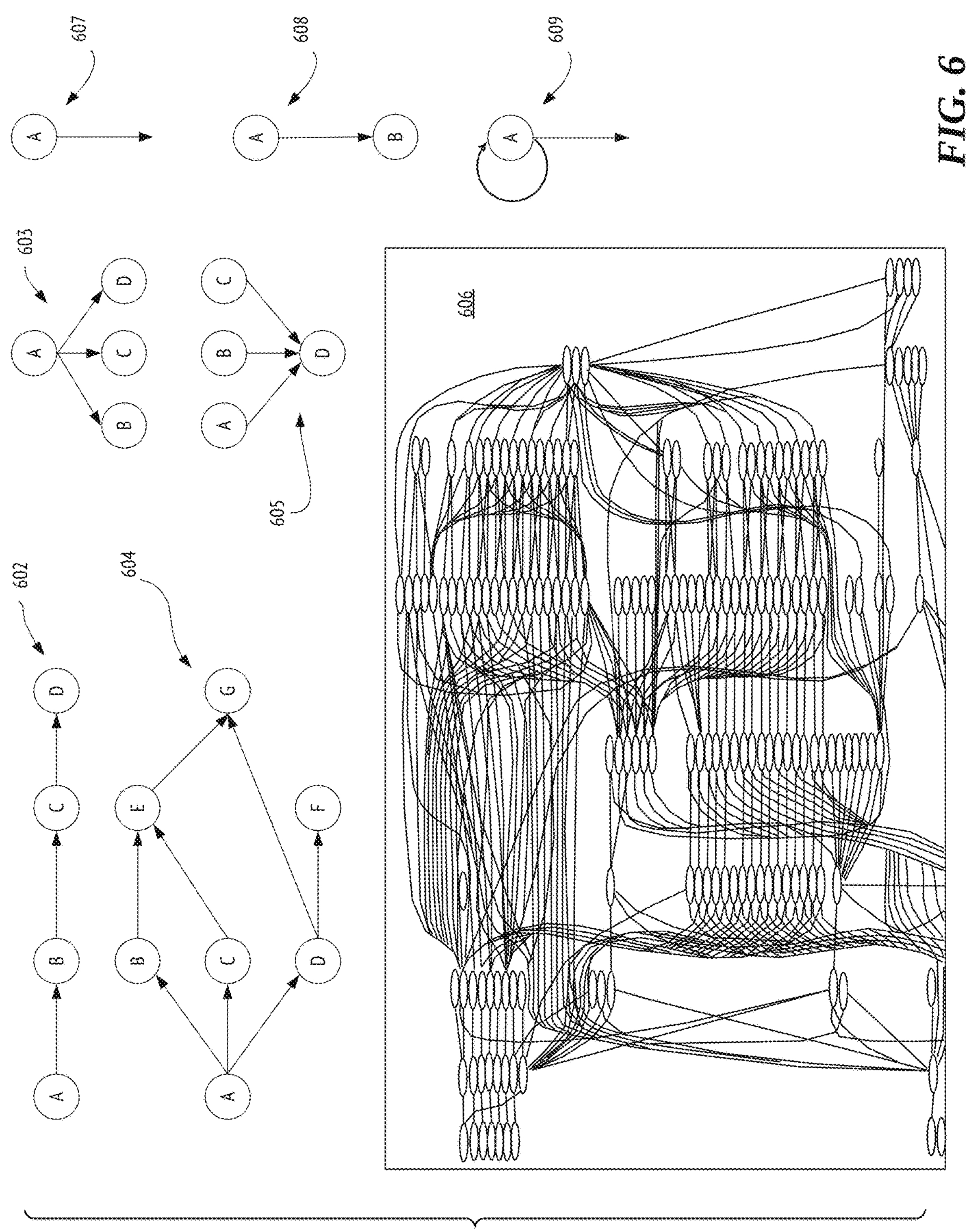

FIG. 6 is a schematic diagram comparing exemplary digital threads that connect DE models, in accordance with some embodiments of the present invention.

FIG. 7 is a schematic showing an exemplary DE model splicing setup, in accordance with some embodiments of the present invention.

Figure 8:
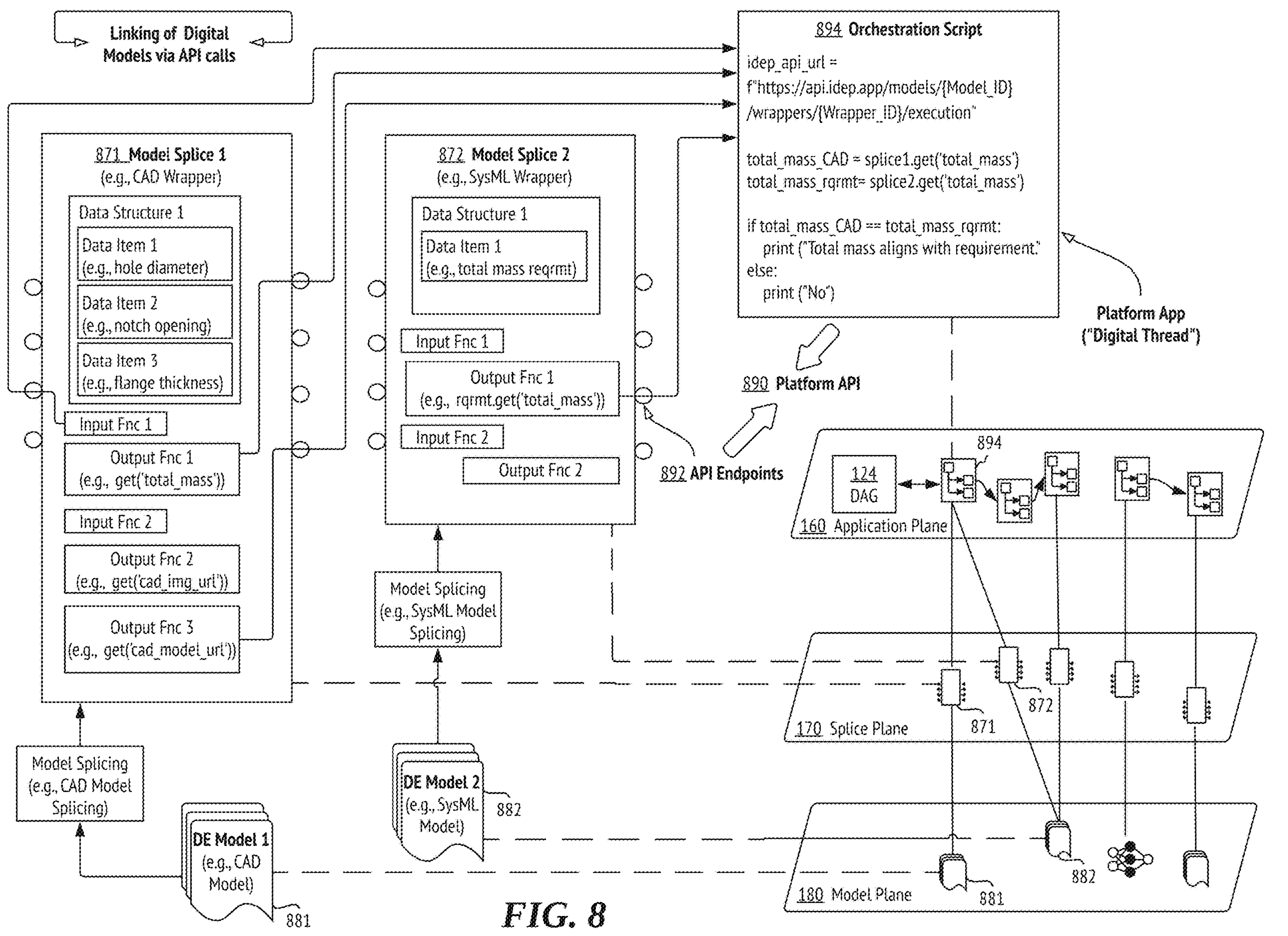

FIG. 8 is a schematic showing digital threading of DE models via model splicing, in accordance with some embodiments of the present invention.

Figure 9:
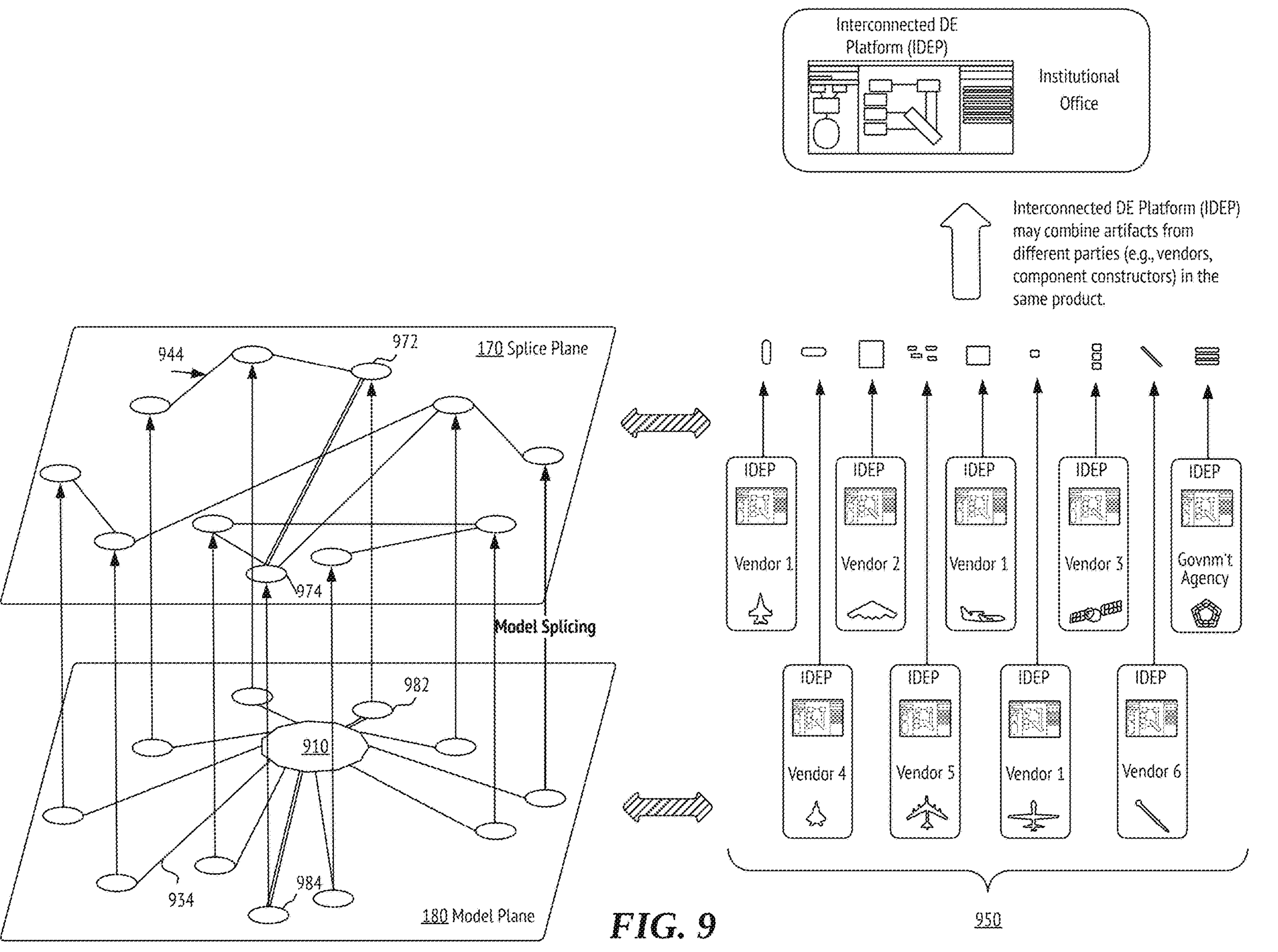

FIG. 9 is a schematic illustrating the linking of DE model splices in a splice plane and comparing digital threading with and without model splicing, in accordance with some embodiments of the present invention.

Figure 10:
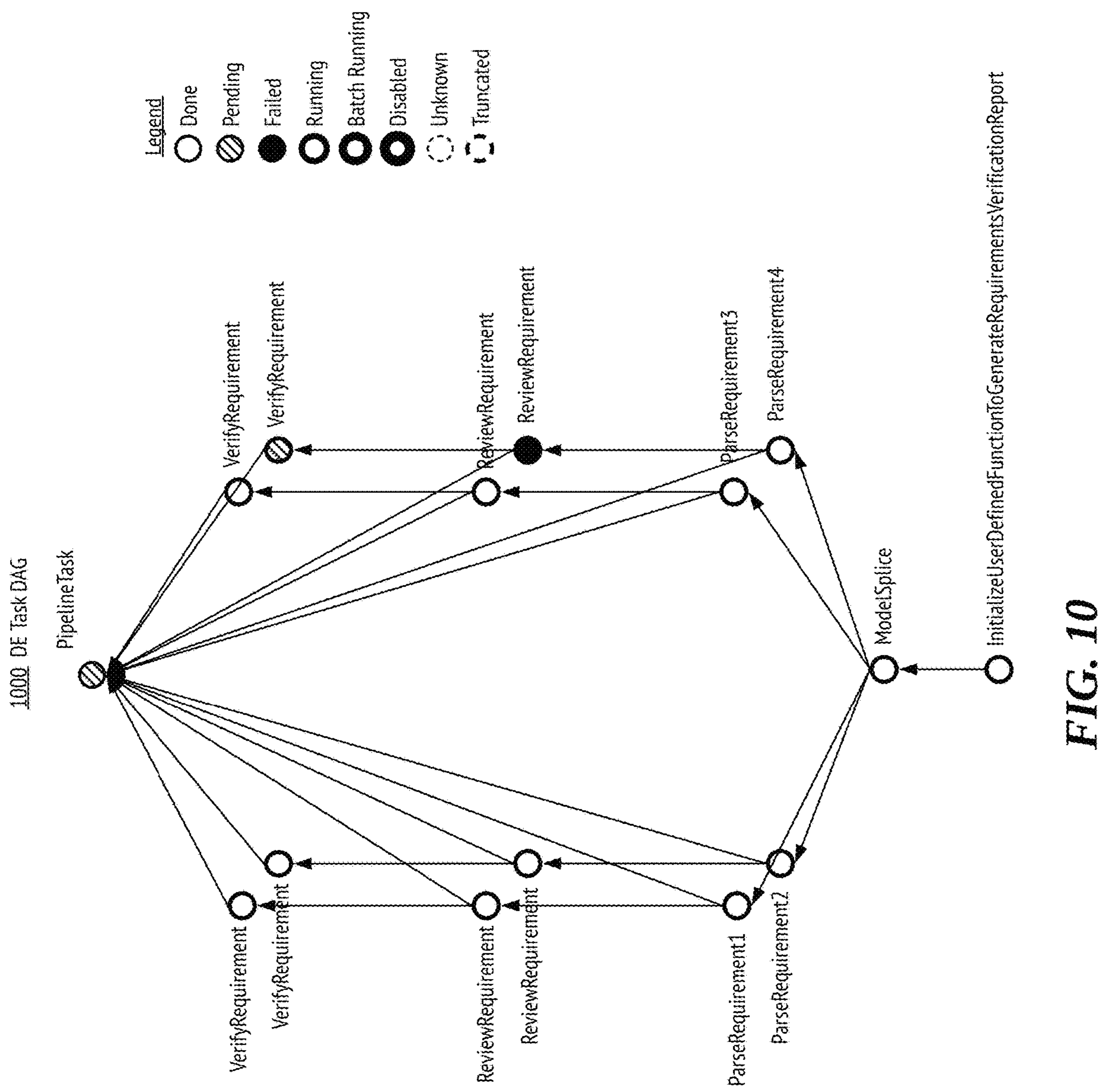

FIG. 10 shows an exemplary directed acyclic graph (DAG) representation of pipelined DE tasks related to digital threads, in accordance with some embodiments of the present invention.

Multimodal User Interfaces

Figure 11:
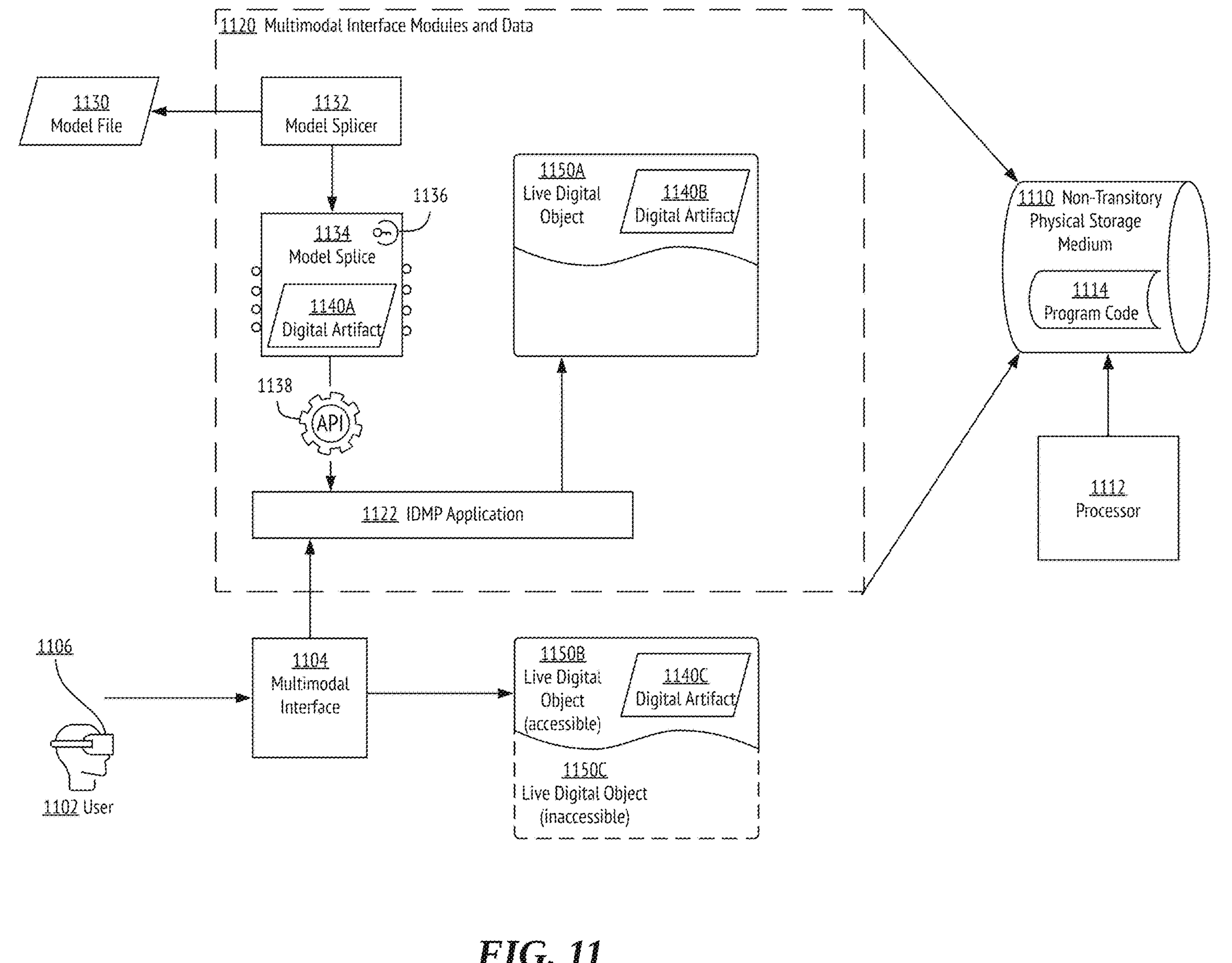

FIG. 11 is an exemplary system diagram showing a process interacting with a live digital object, in accordance with some embodiments of the present invention.

Figure 12:
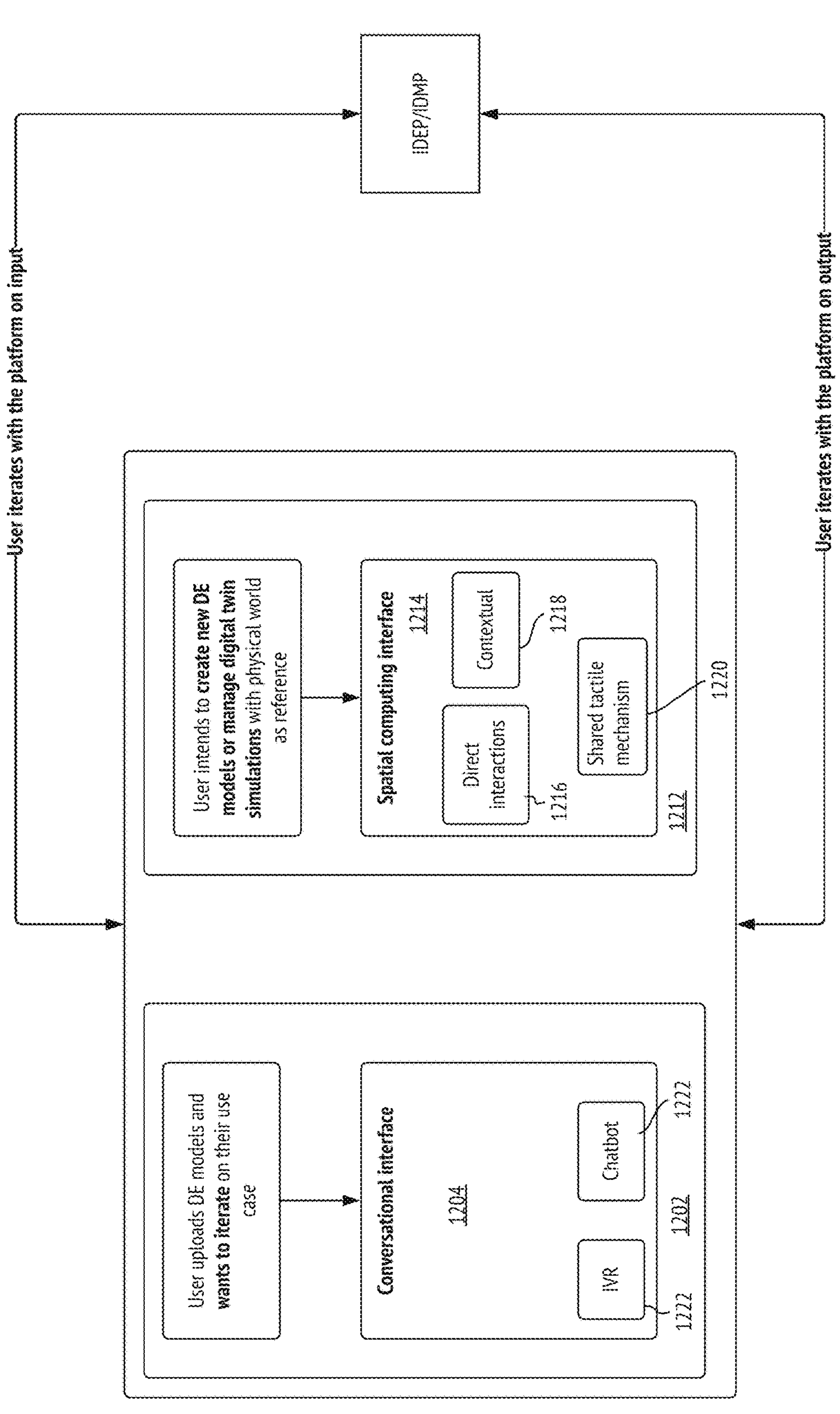

FIG. 12 shows an example workflow illustrating how different user interfaces may enable specific user operations within a digital engineering platform, in accordance with example embodiments of the present invention.

Figure 13:
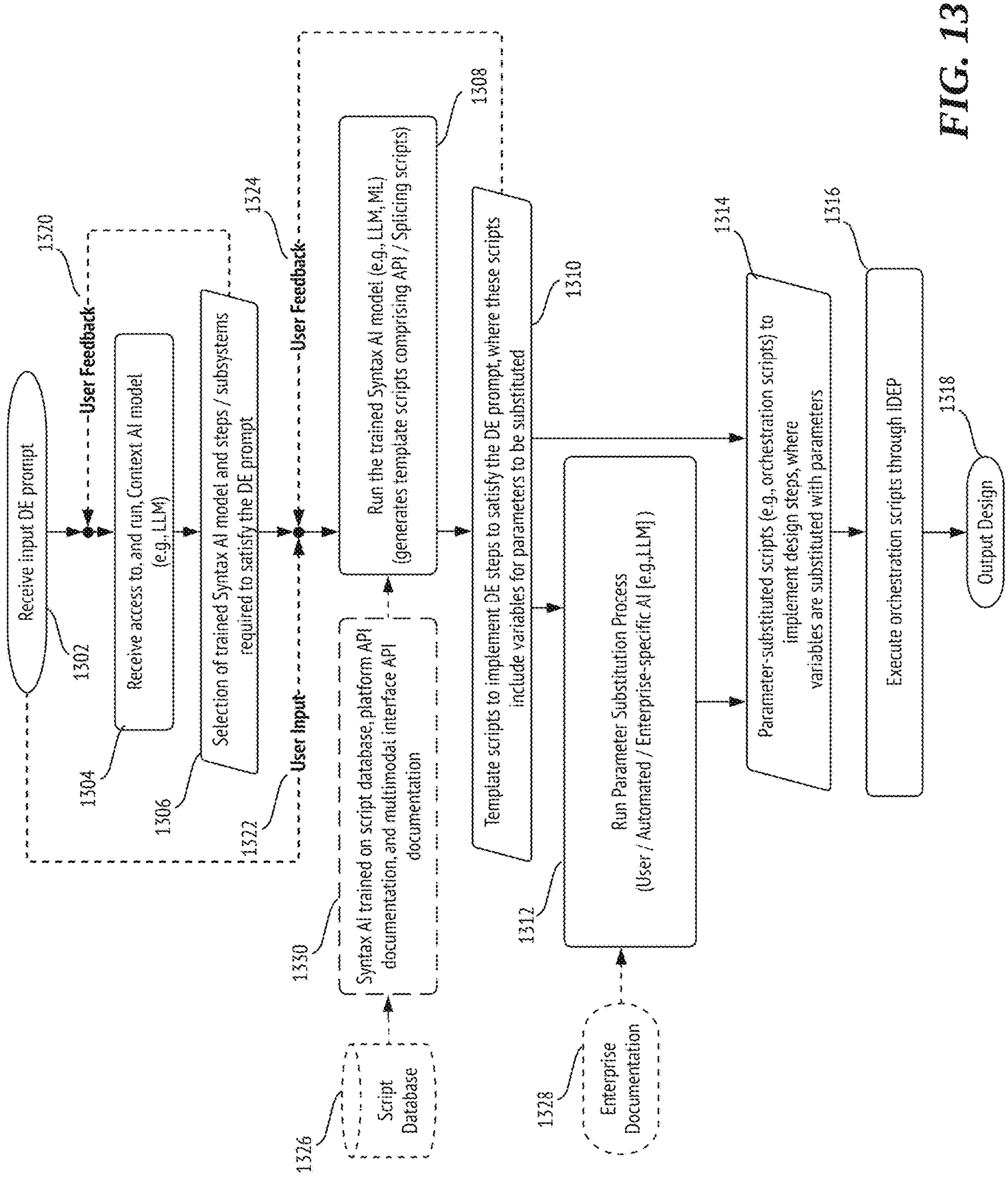

FIG. 13 shows a generalized AI-assisted design process over a digital engineering platform, in accordance with one embodiment of the present invention.

Figure 14:
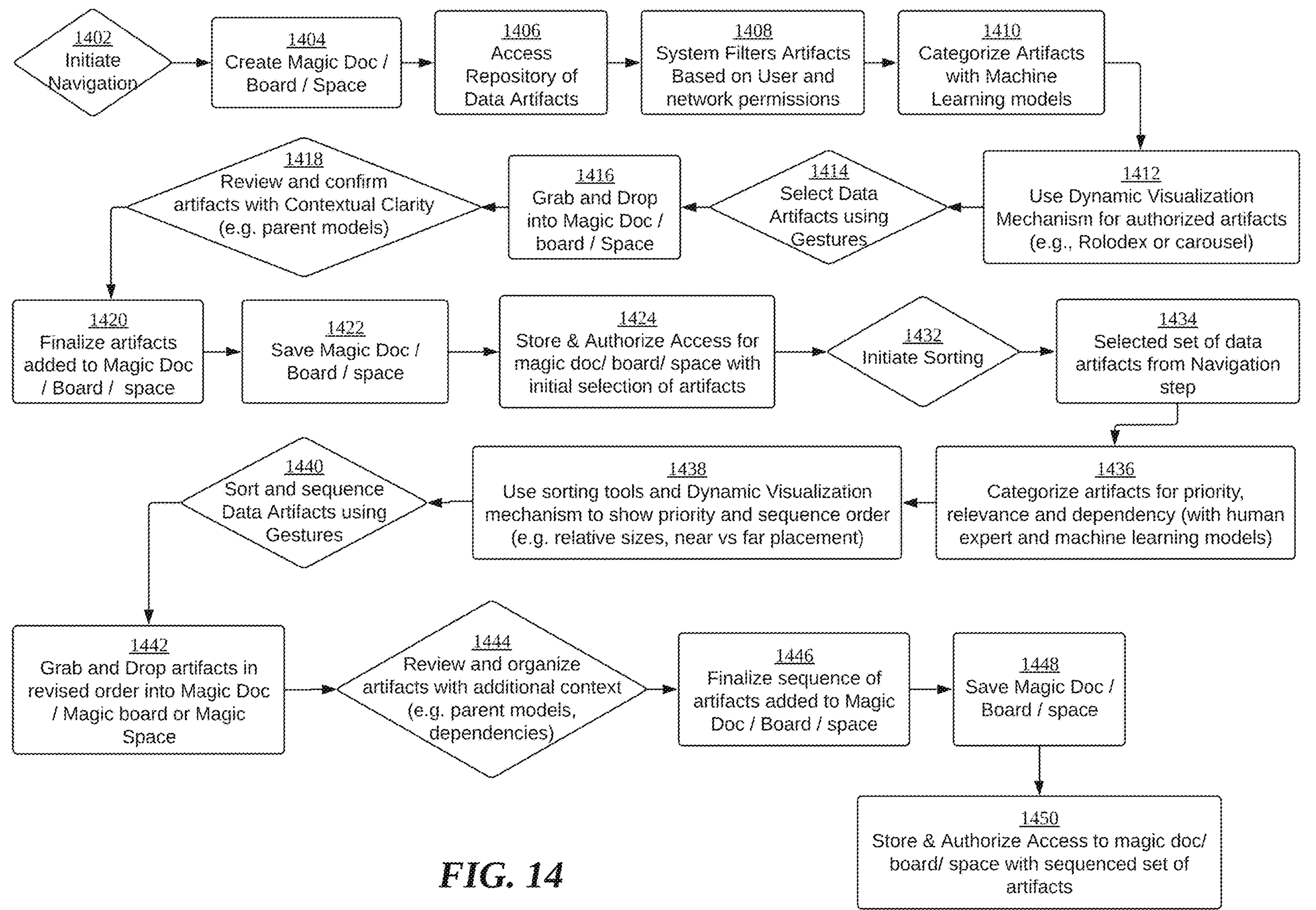

FIG. 14 shows a flowchart that illustrates the navigation and sorting of data artifacts in a multimodal interface, in accordance with the examples disclosed herein.

Figure 15:
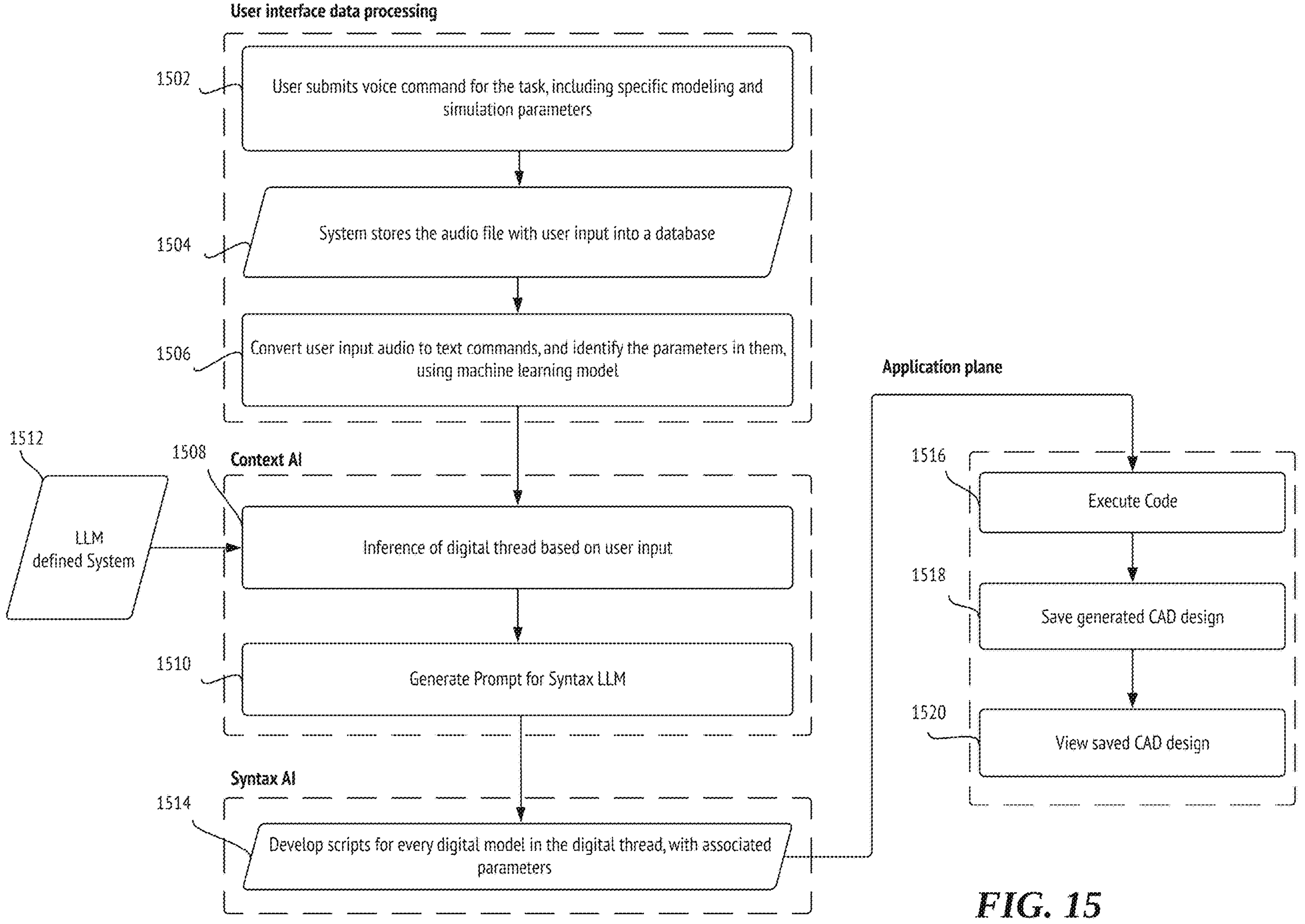

FIG. 15 shows an exemplary generation and execution of an orchestration script through a voice/conversational interface, in accordance with one embodiment of the present invention.

Figure 16:
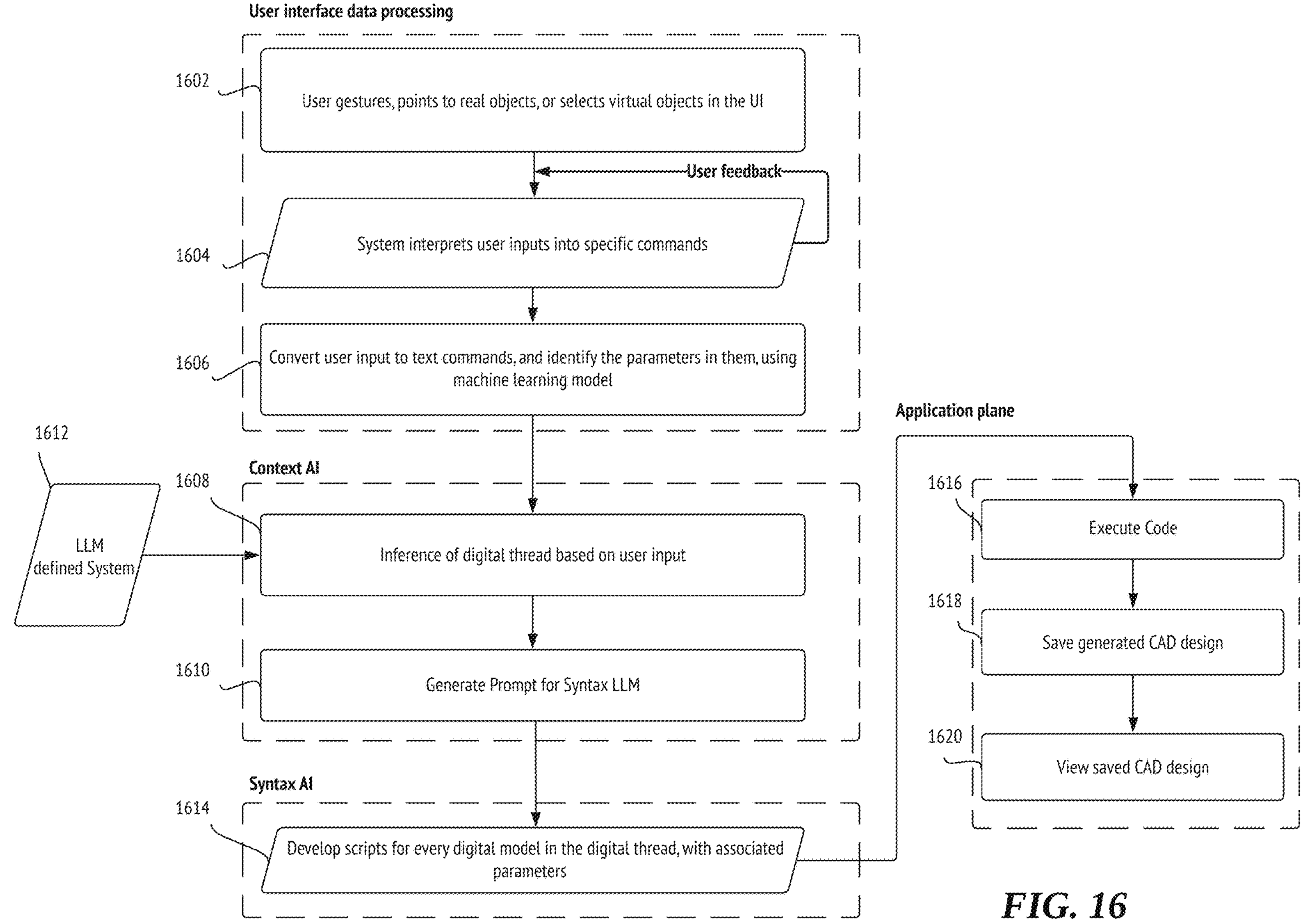

FIG. 16 shows an exemplary generation and execution of an orchestration script through a spatial computing interface, in accordance with one embodiment of the present invention.

Figure 17:
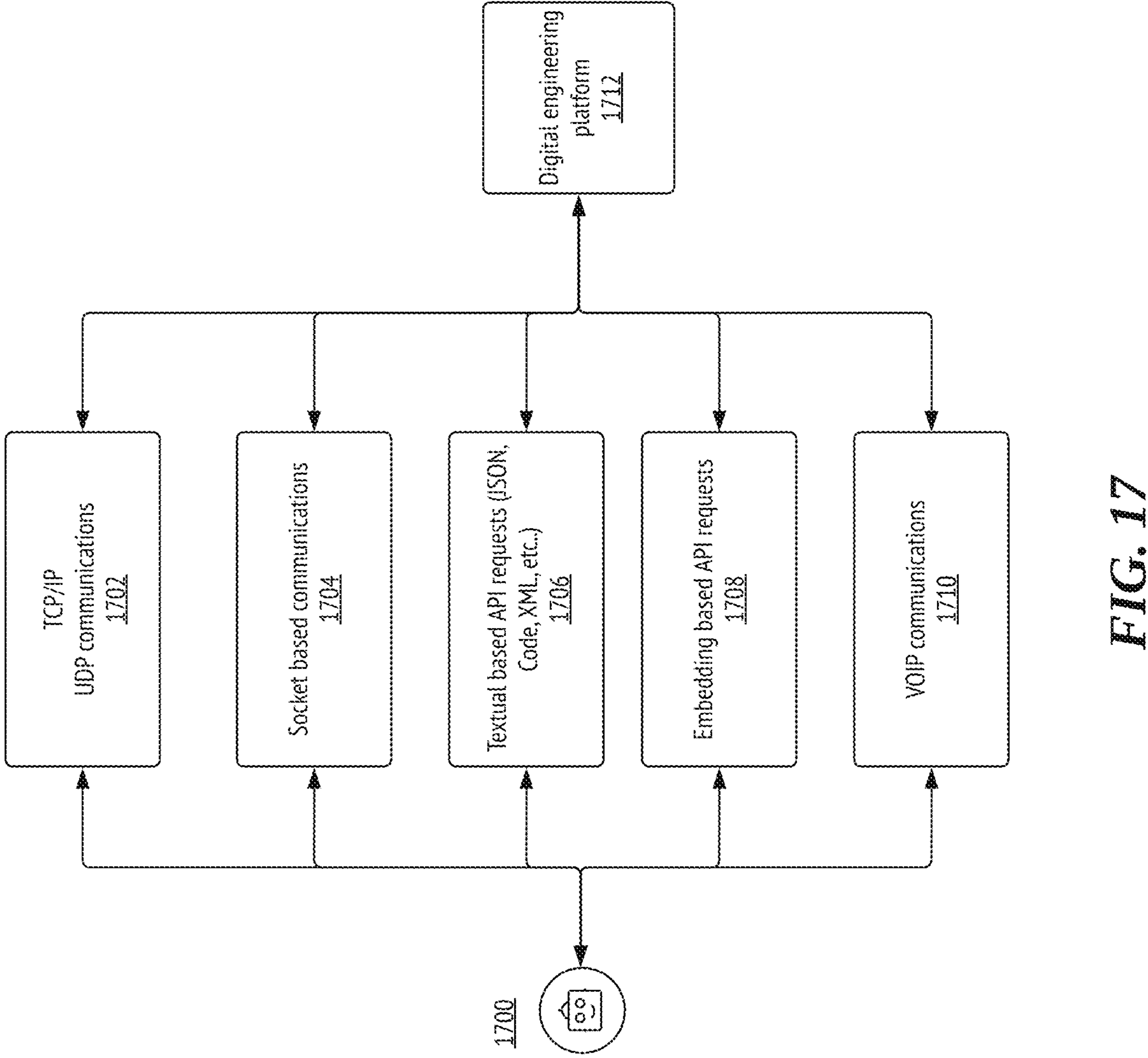

FIG. 17 shows an example flow chart illustrating aspects of the operation of the disclosed systems for multimodal communications for code interfaces, in accordance with example embodiments of the present invention.

Figure 18:
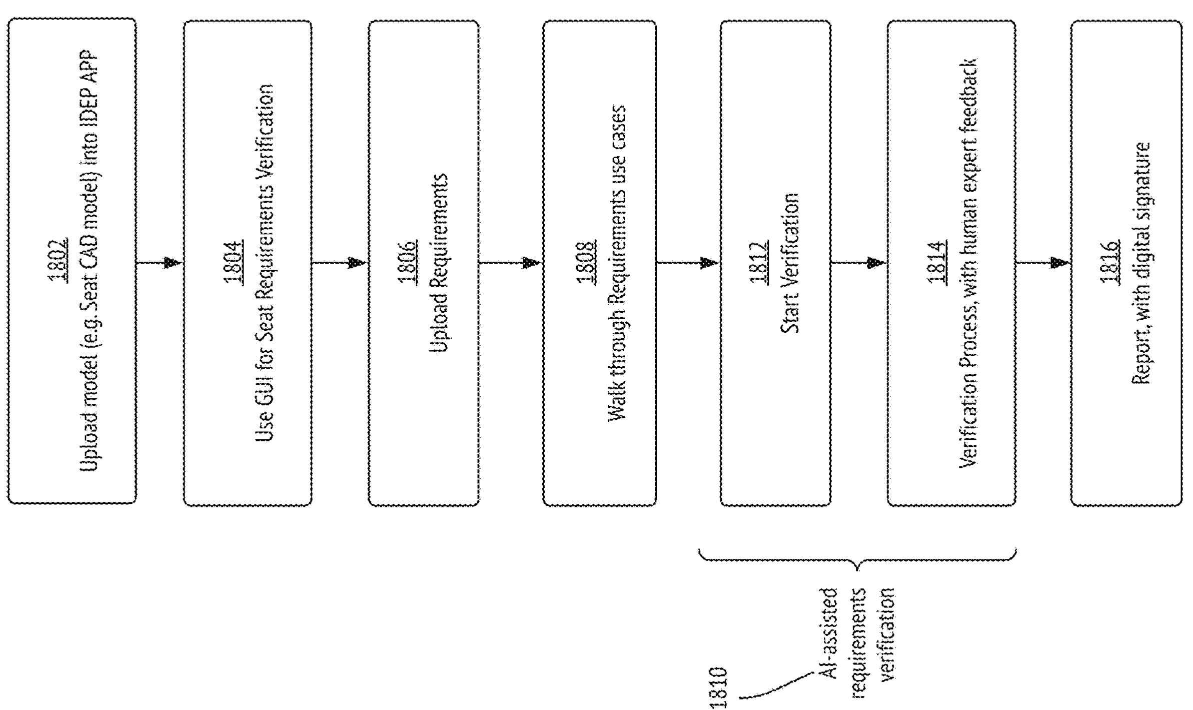

FIG. 18 shows an illustrative flow diagram for an exemplary use case where a GUI/API interface is used in an AI-assisted requirements verification process, according to some embodiments of the present invention.

Figure 19:
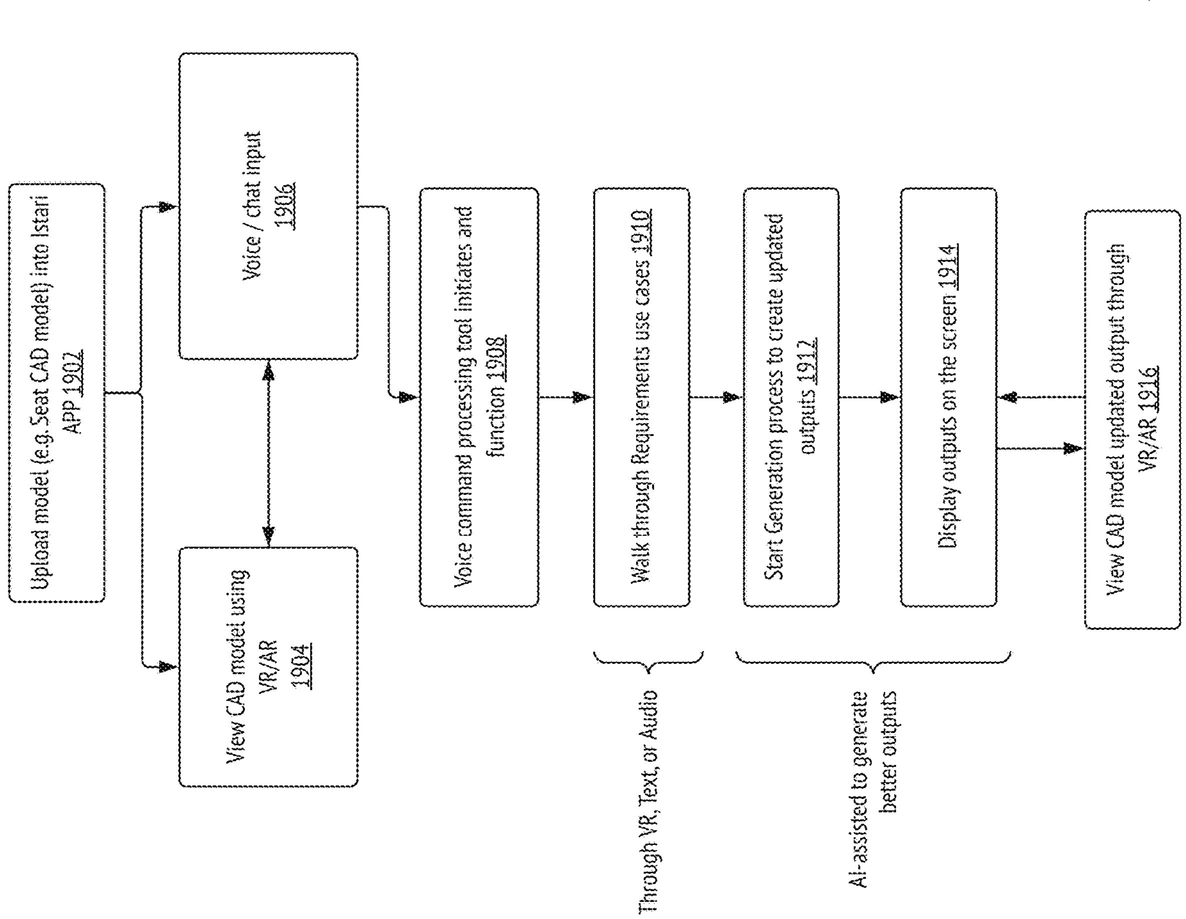

FIG. 19 shows an example workflow illustrating aspects of the operation of the disclosed systems in connection with interfaces for voice control, in accordance with example embodiments of the present invention.

Figure 20:
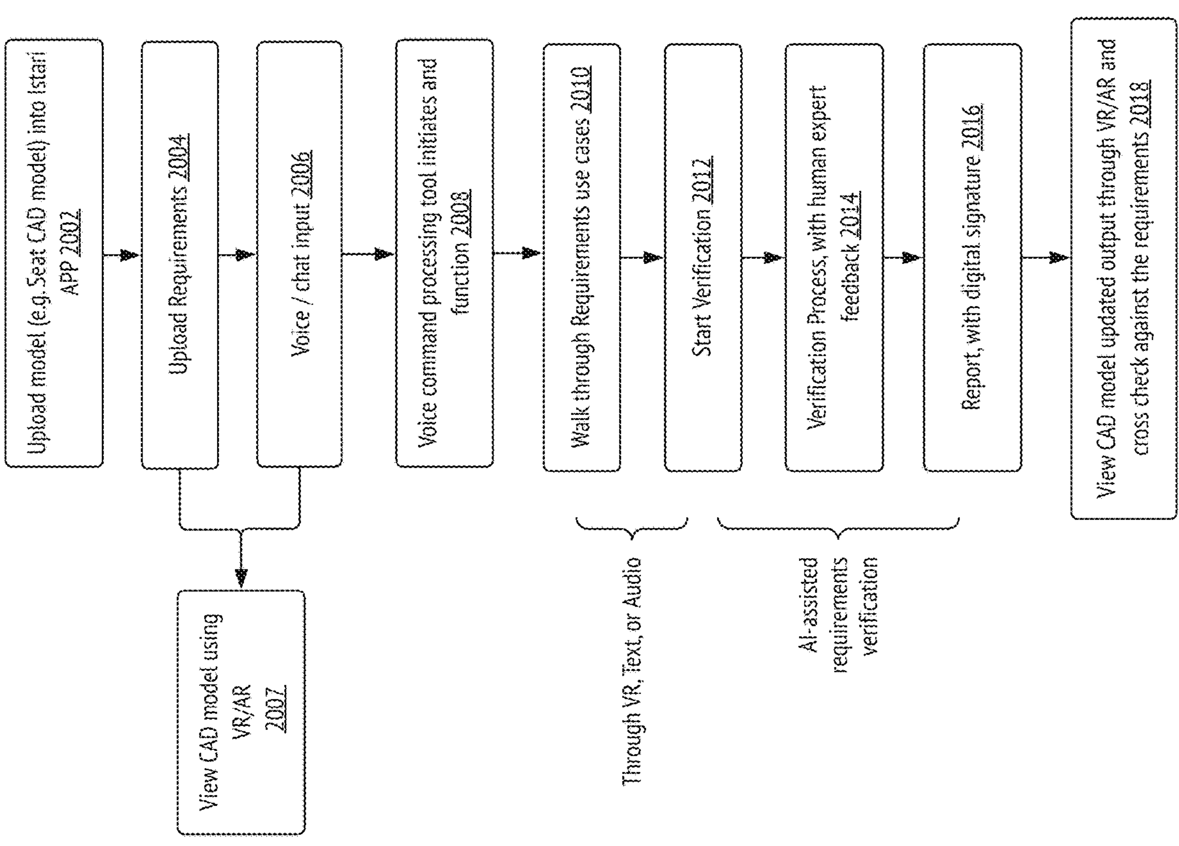

FIG. 20 shows another example workflow illustrating aspects of the operation of the disclosed systems in connection with interfaces for voice control, in accordance with example embodiments of the disclosure.

Figure 21:
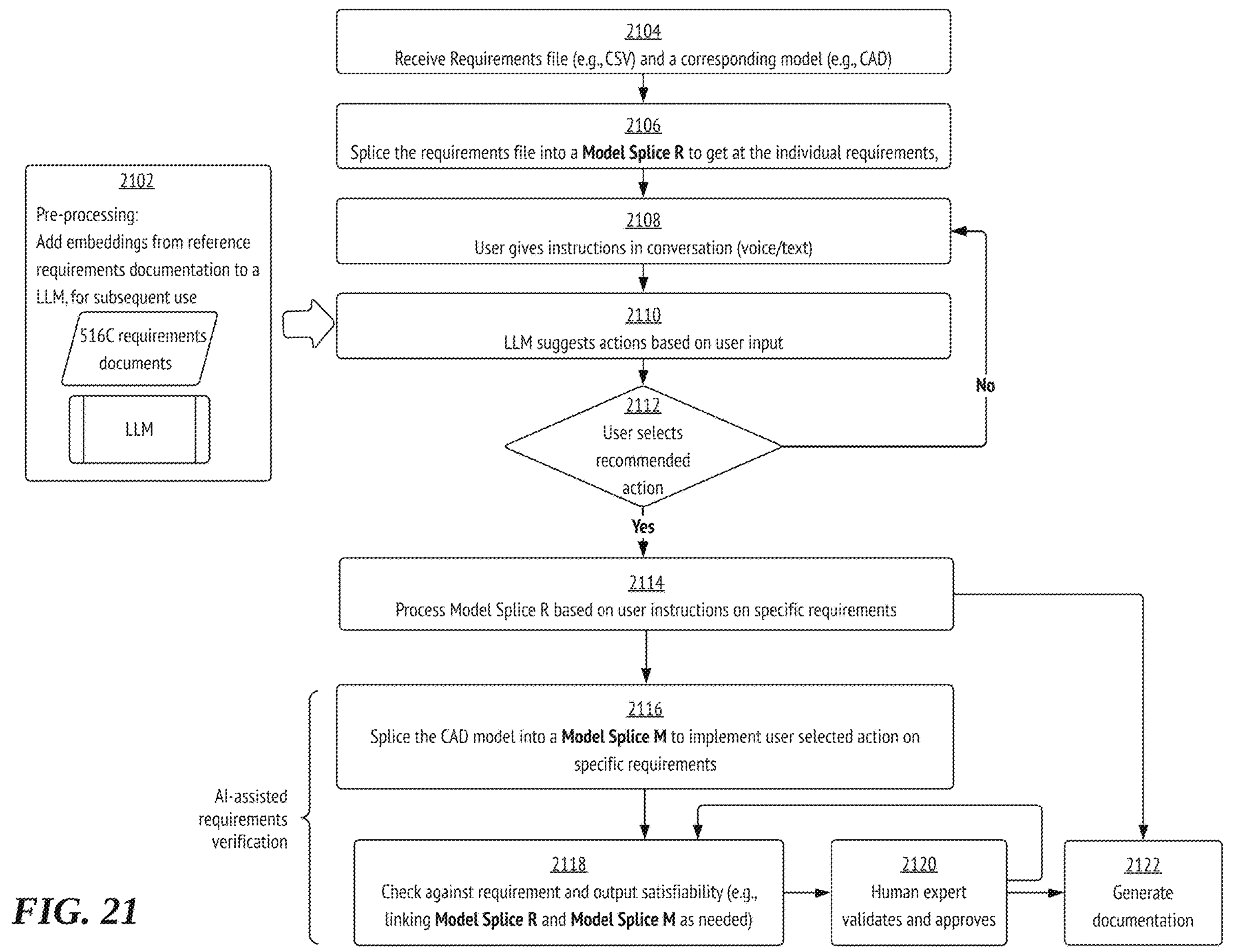

FIG. 21 shows an illustrative flow diagram of an exemplary AI-assisted requirements verification process using a conversational interface, according to some embodiments of the present invention.

Figure 22:
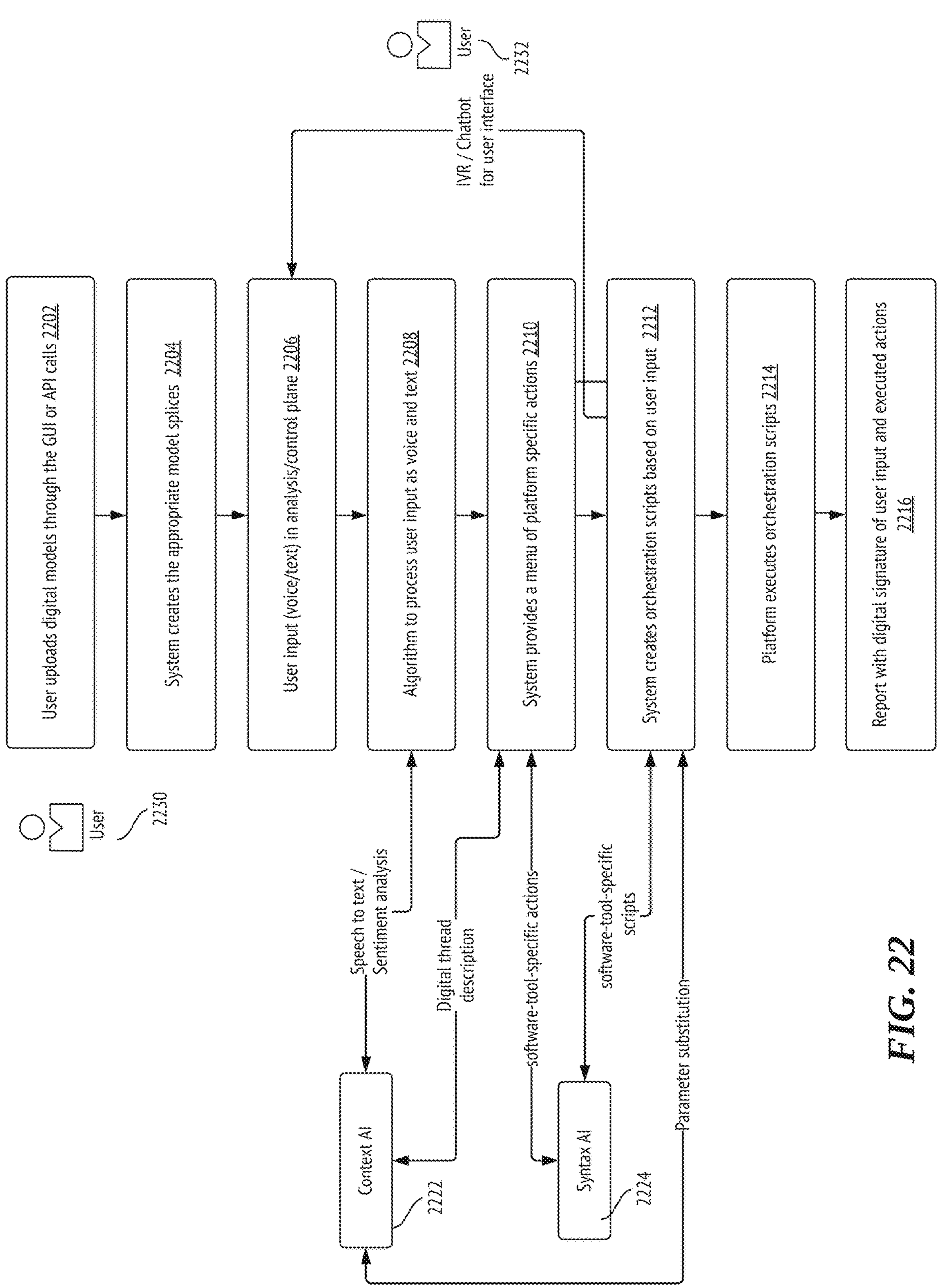

FIG. 22 shows an example workflow illustrating aspects of the operation of the disclosed systems in connection with AI-assisted conversational interfaces, in accordance with example embodiments of the disclosure.

Exemplary Graphical User Interfaces (GUIs)

Figure 23:
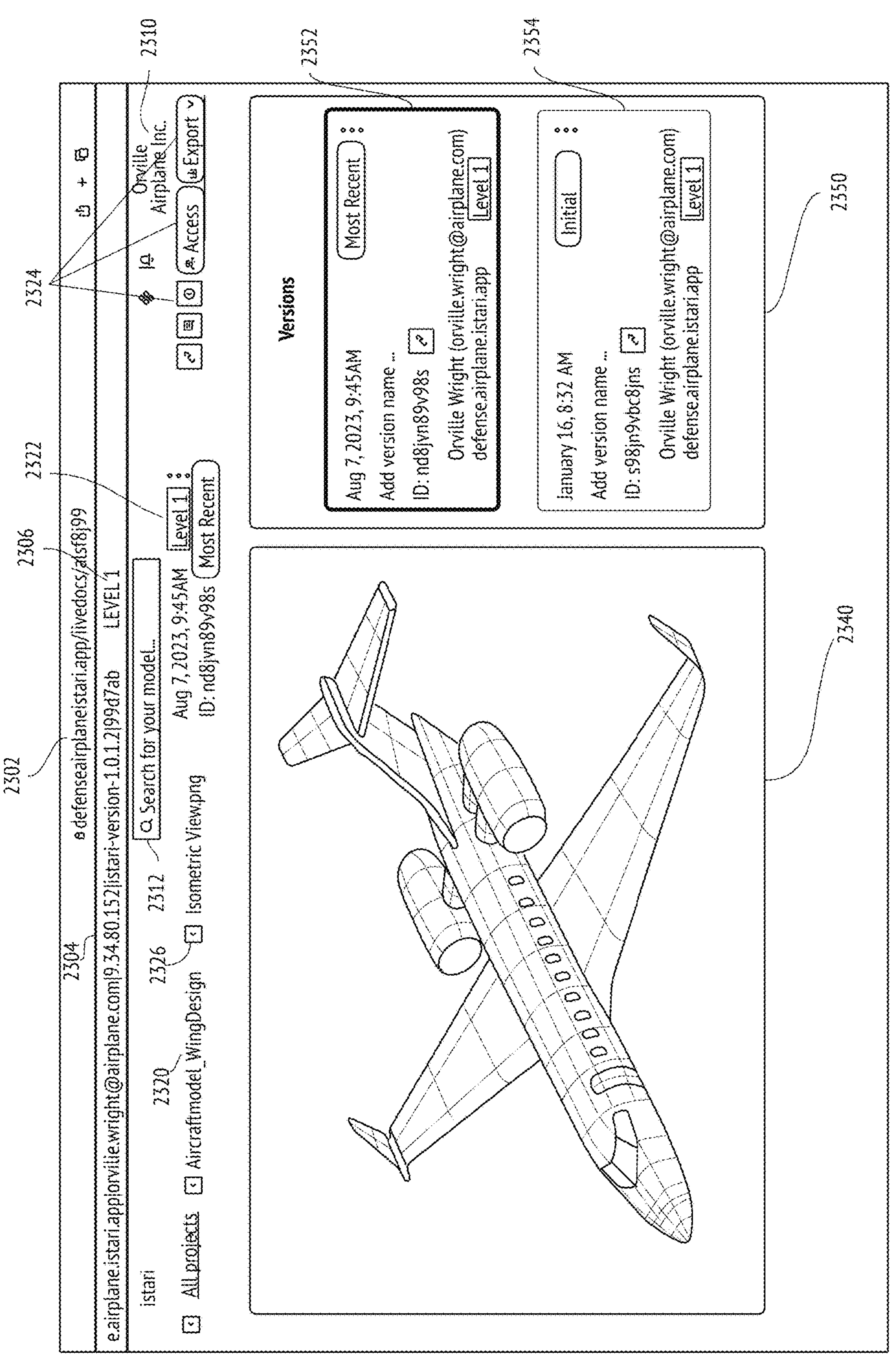

FIG. 23 shows a screenshot of an exemplary graphical user interface (GUI) used to operate a digital thread over the IDEP, according to one embodiment of the present invention.

Figure 24:
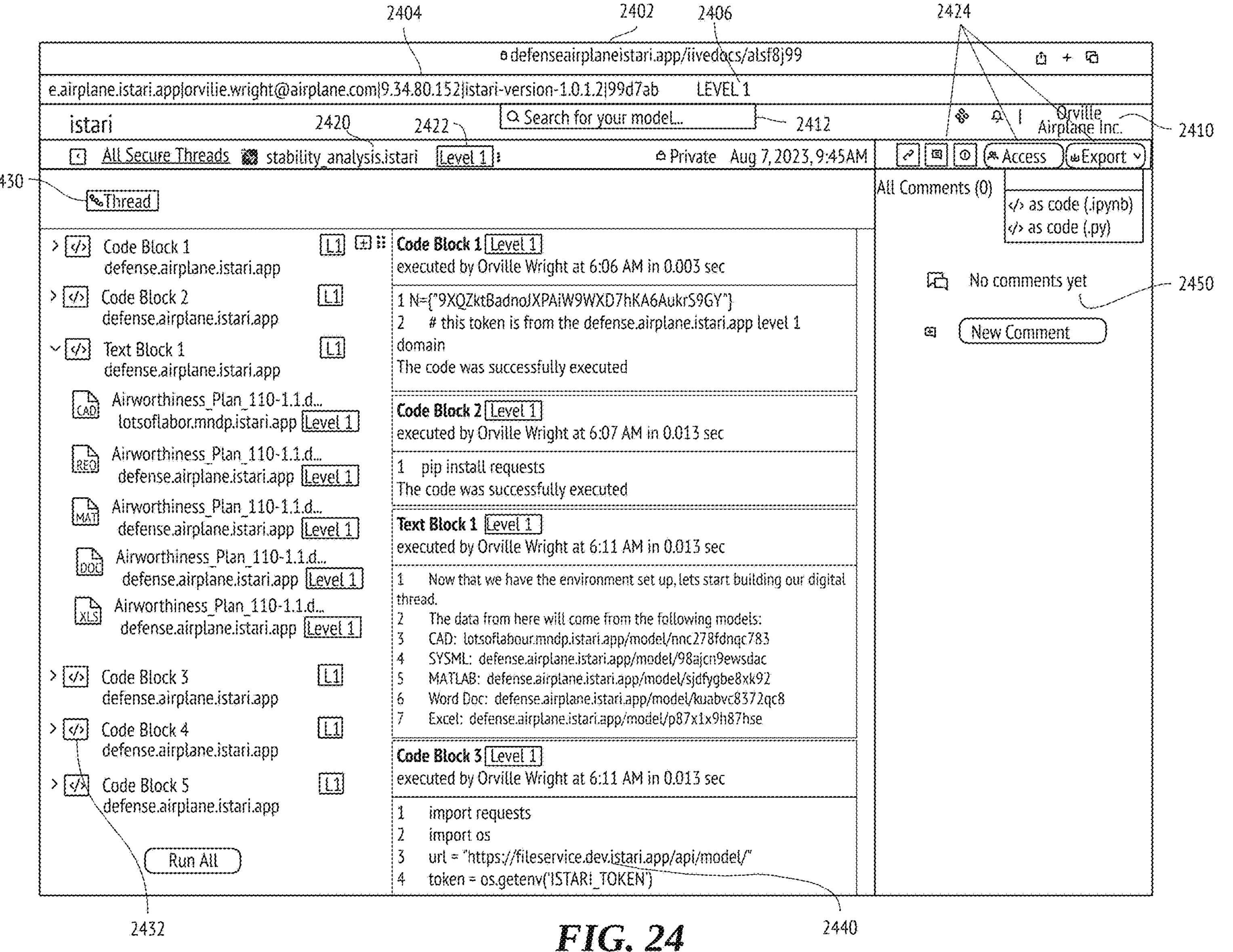

FIG. 24 shows a screenshot of another exemplary graphical user interface (GUI) used to operate a digital thread over the IDEP, according to one embodiment of the present invention.

Figure 25:
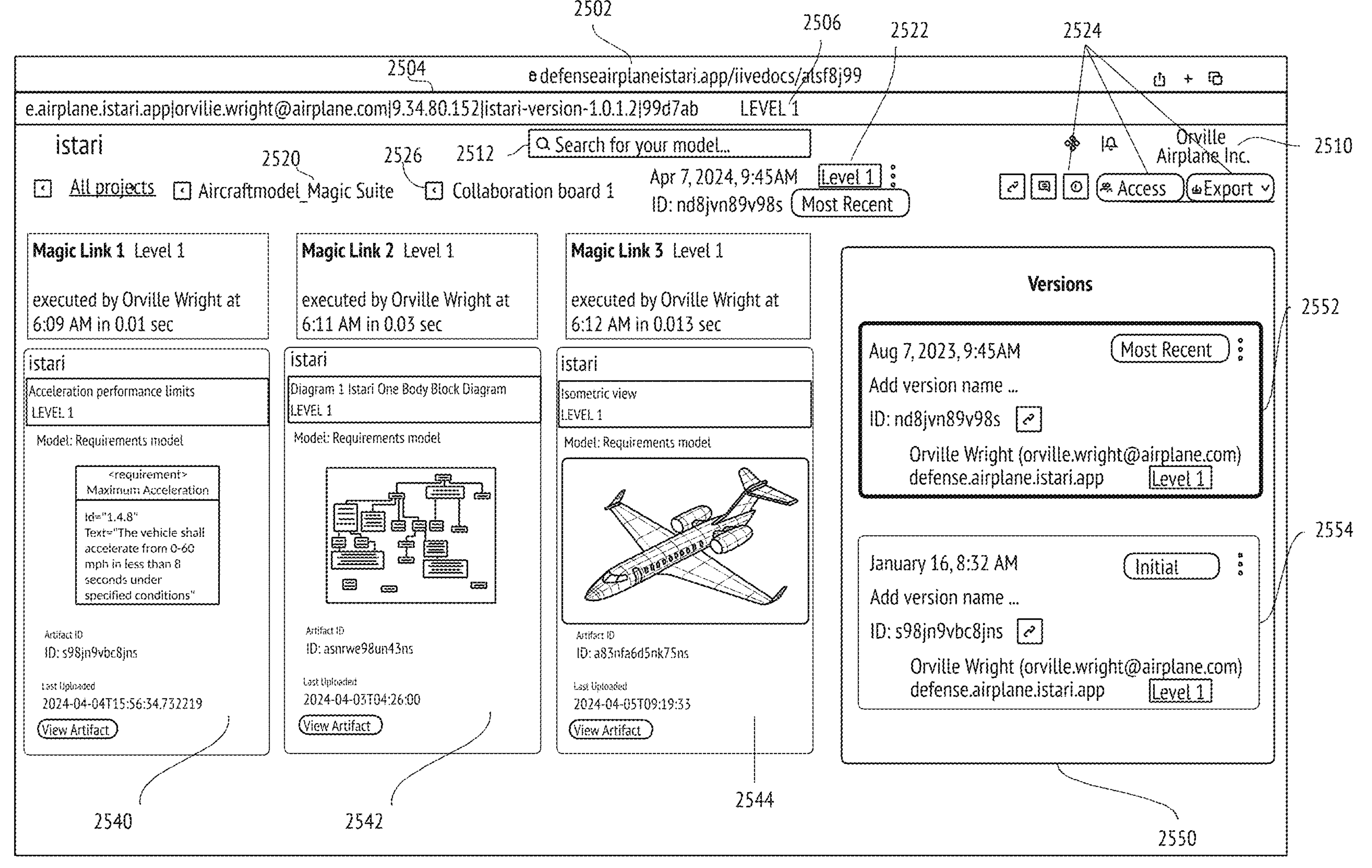

FIG. 25 shows an exemplary graphical user interface (GUI) used to generate or update a live suite or collaboration board over the IDMP, according to one embodiment of the present invention.

Exemplary Multimodal User Interface Methods and Systems

Figure 26:
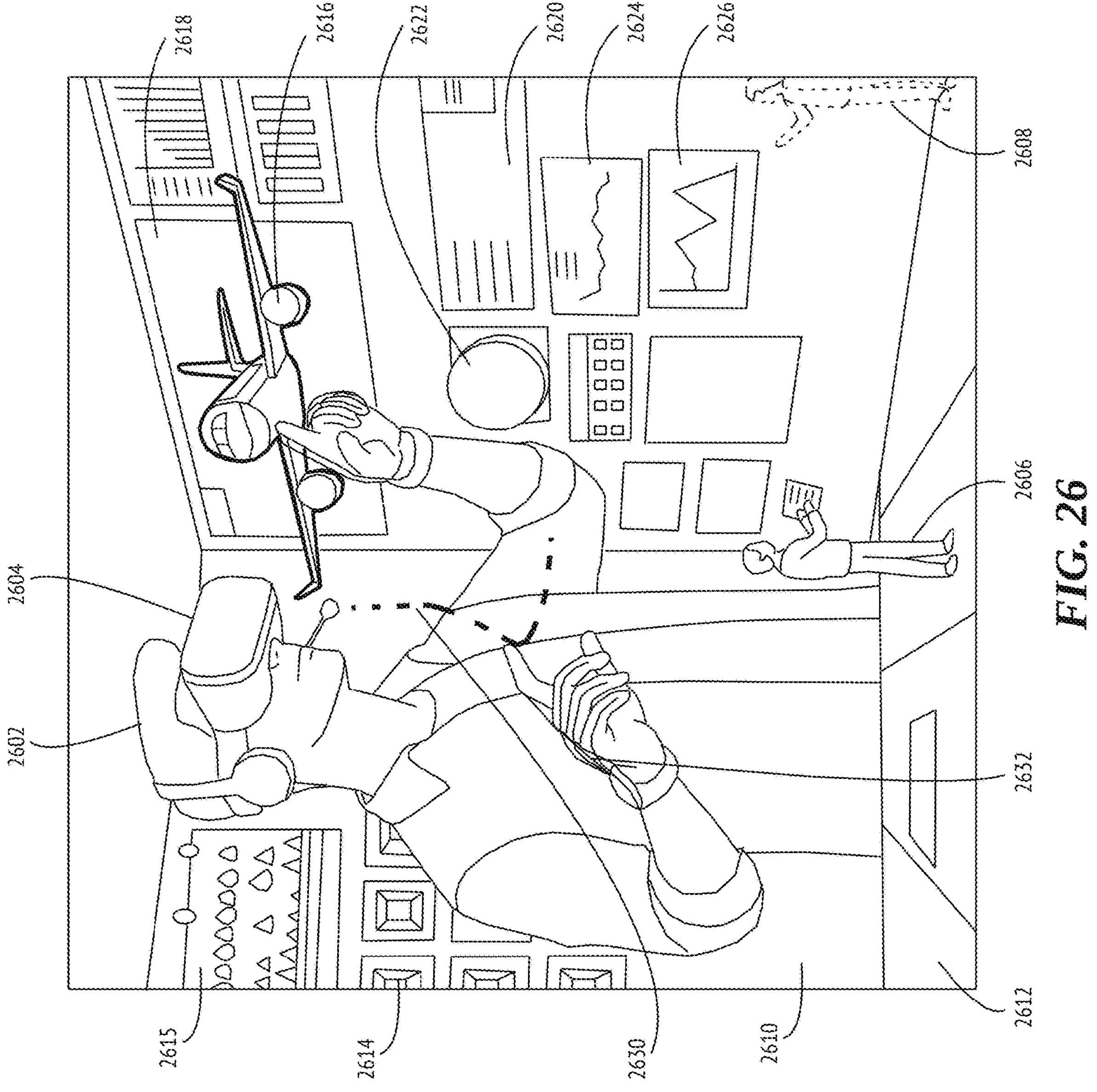

FIG. 26 illustrates the use of a multimodal interface to access data through a virtual live board, in accordance with the examples disclosed herein.

Figure 27:
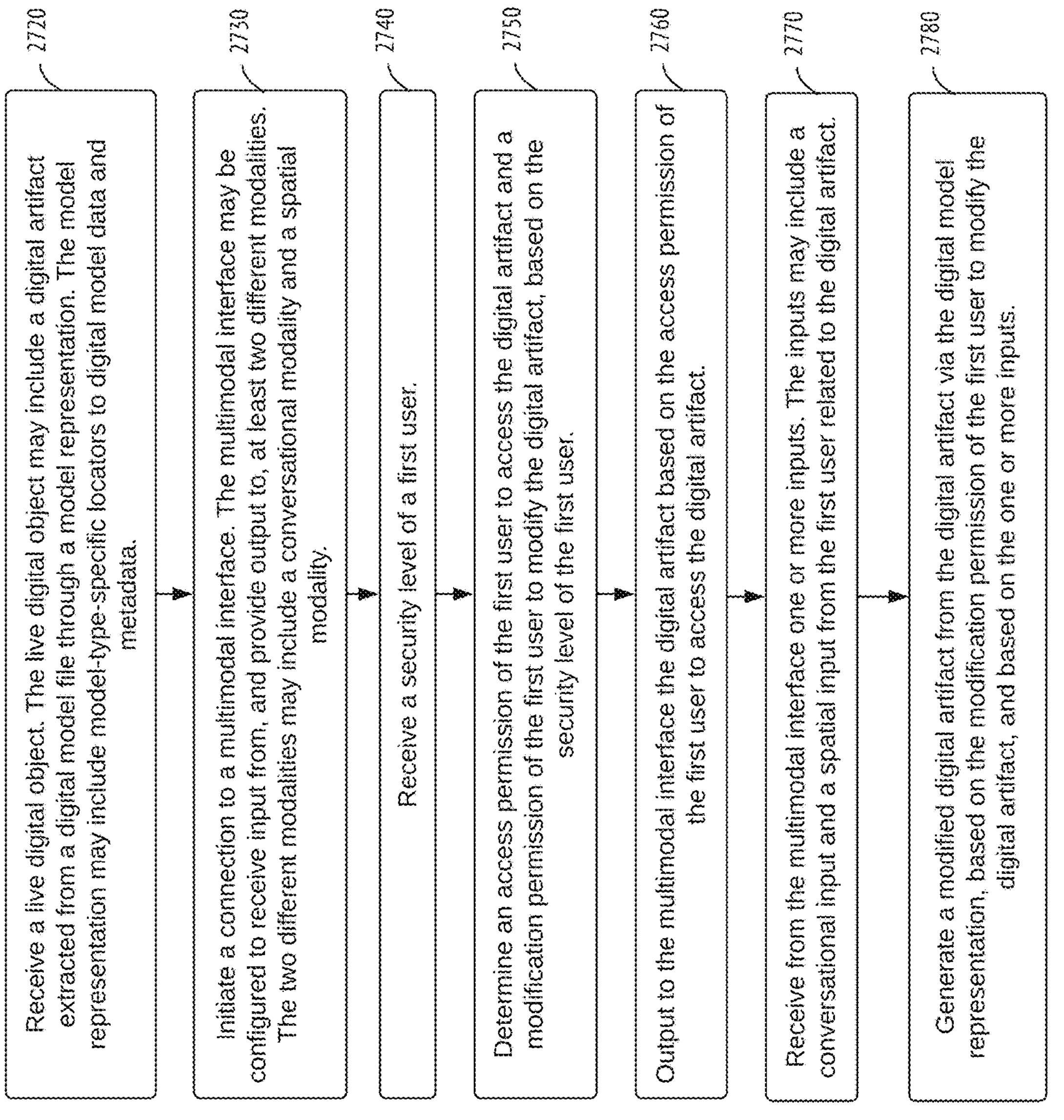

FIG. 27 shows a flowchart that details a process for interacting with a live digital object, in accordance with the examples disclosed herein.

Figure 28:
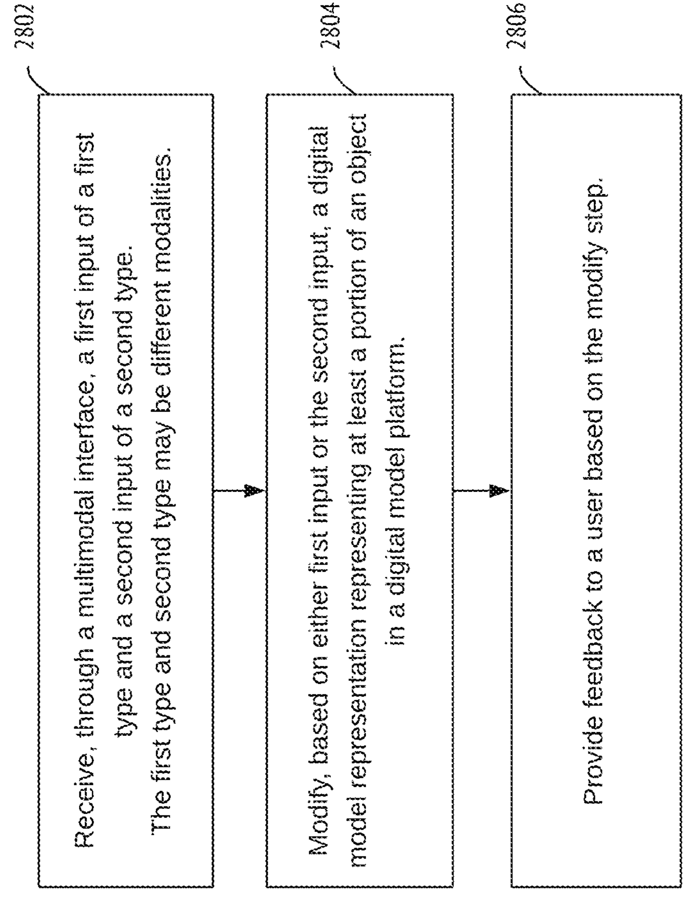

FIG. 28 shows a flowchart that details a process for digital engineering via a multimodal interface, in accordance with the examples disclosed herein.

Figure 29:
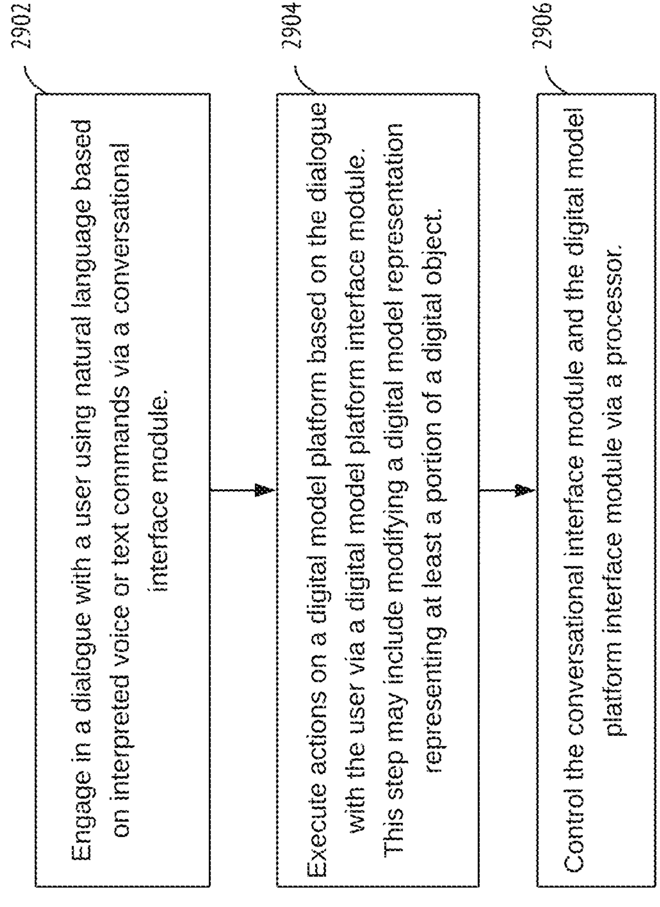

FIG. 29 is an exemplary flow chart showing a process for digital engineering via a conversational interface, in accordance with some embodiments of the present invention.

Machine Learning Implementation Architecture for IDEP/IDMP Operations

Figure 30:
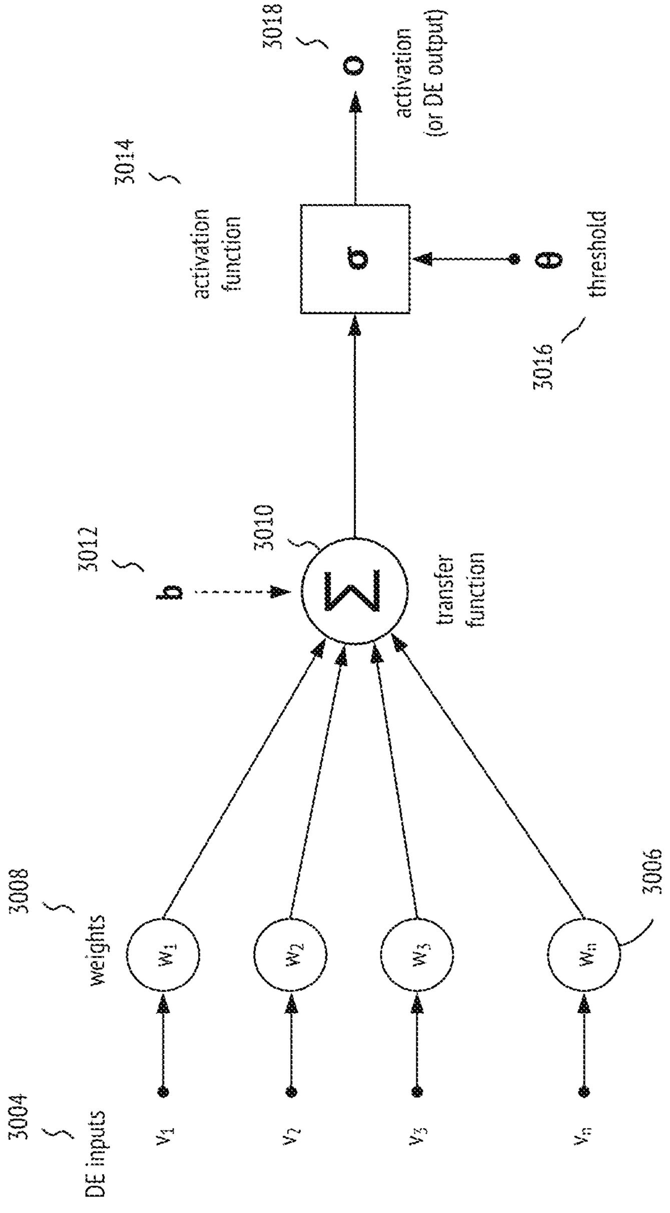

FIG. 30 describes neural network operation fundamentals, in accordance with some embodiments of the present invention.

Figure 31:
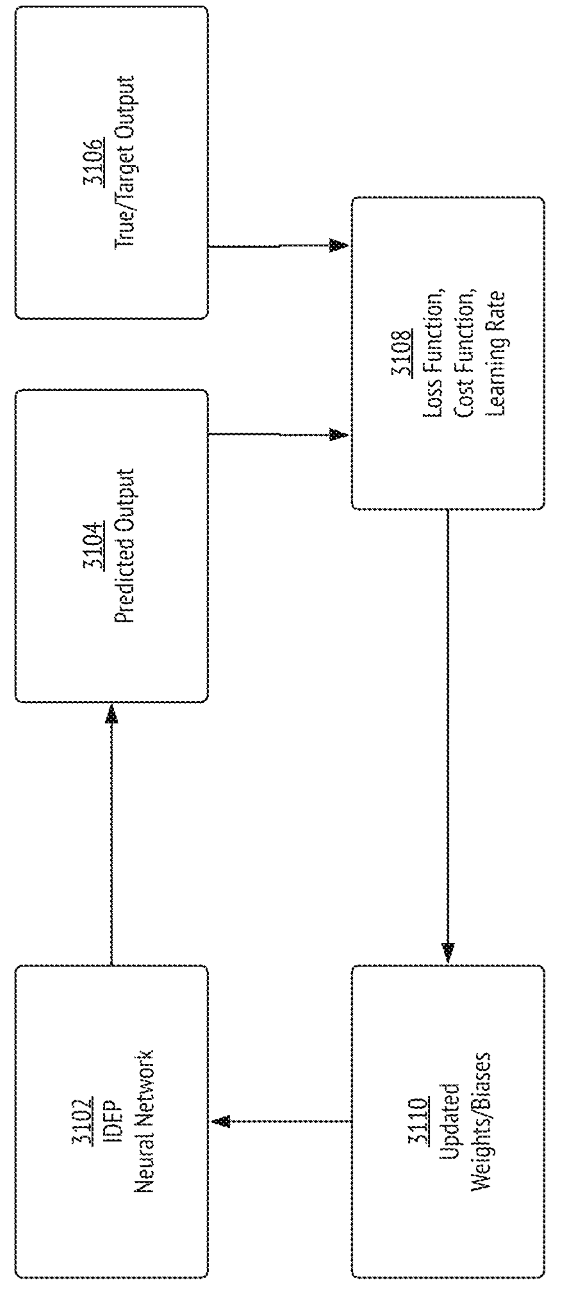

FIG. 31 shows an overview of an IDEP neural network training process, in accordance with some embodiments of the present invention.

Figure 32:
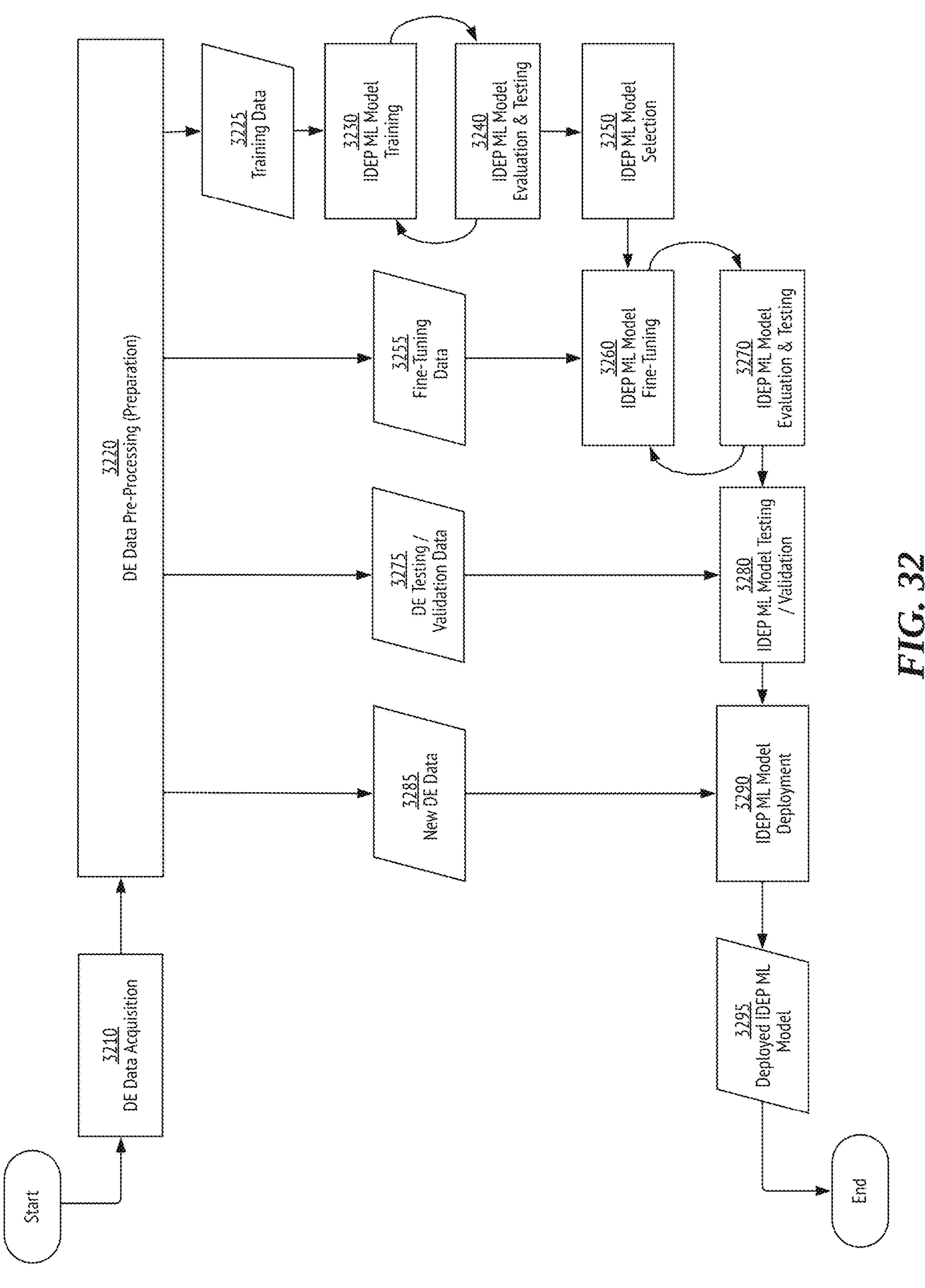

FIG. 32 is an illustrative flow diagram showing the different phases and datasets involved in training an IDEP machine learning model, in accordance with some embodiments of the present invention.

Hardware and Software Architecture for IDEP/IDMP Operations

Figure 33:
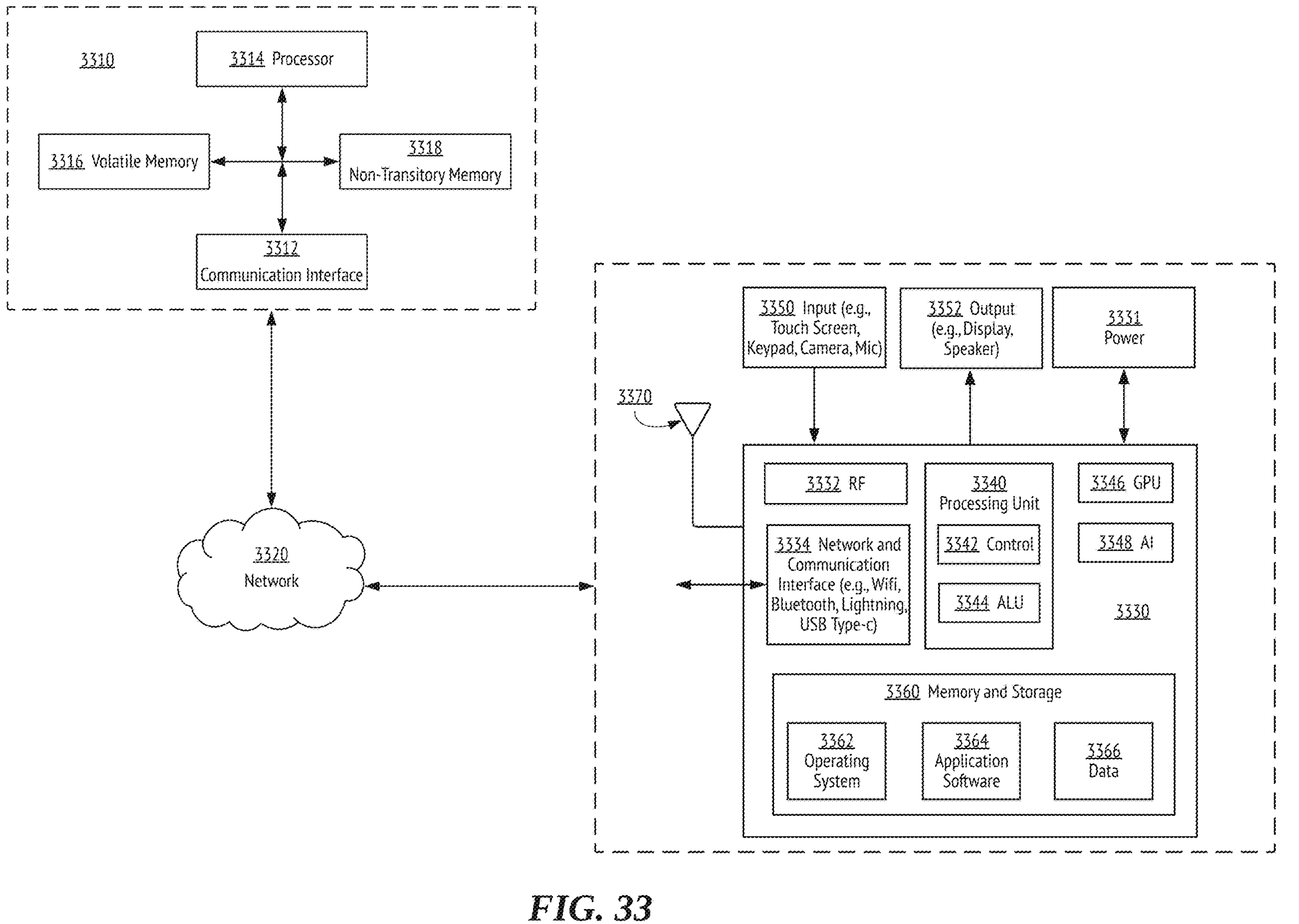

FIG. 33 provides illustrative schematics of a server (management computing entity) and a client (user computing entity) used for documentation within an IDEP, in accordance with some embodiments of the present invention.

DETAILED DESCRIPTION OF THE INVENTION

In the following description, for purposes of explanation, numerous specific details are set forth in order to provide a thorough understanding of the invention. It will be apparent, however, to one skilled in the art that the invention can be practiced without these specific details. In other instances, structures, devices, activities, methods, and processes are shown using schematics, use cases, and/or diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Overview

Broadly, the present invention relates to methods and systems for enabling user control and interaction with digital platforms via a variety of interfaces. Embodiments of the present invention are directed to a digital platform that can handle multimodal inputs and outputs to facilitate user interaction with digital models and collaboration. Multimodal inputs can generally refer to the use of multiple modes of communication such as text, speech, images, video, gestures, and/or the like to interact with a computer or other electronic devices. Multimodal inputs can be used to improve the accessibility and usability of electronic devices for people with disabilities or for people who prefer different modes of communication. It can also be used to improve the accuracy and efficiency of input methods by combining multiple sources of information.

Multimodal interfaces encompass text-based conversational and voice-activated interactions, spatial computing, including video and gestural interactions, and code-based interactions such as application programming interfaces (APIs). This system provides a comprehensive and versatile platform for digital workflows and digital engineering, enhancing user interaction and efficiency.

An integrated digital model platform that enables the streamlined creation and management of digital workflows by leveraging multimodal interfaces is described herein. Embodiments of the present invention enables the collaboration across disparate digital models and software tools, enabling industrial and creative metaverses to generate, design, manufacture, and operate digital systems, software tools, and digital models. Embodiments of the present invention enable complex learning curves related to digital workflows to be scaled digitally, broadly accelerating innovation, while lowering associated costs and environmental impacts. Additionally, embodiments of the present invention enable AI to receive and benefit from abundant sources of accurate real-time data, as described below.

With reference to the figures, embodiments of the present invention are now described in detail. First, the digital model platform (IDMP) and its digital engineering embodiment (IDEP) are explained in detail. Then, the digital splicing and threading operations enabling orchestration script generation are described in detail. Finally, multimodal methods and systems are detailed.

Terminology

Some illustrative terminologies used herein are provided at the end of this document to assist in understanding the present invention, but these are not to be read as restricting the scope of the present invention. The terms may be used in the form of nouns, verbs, or adjectives, within the scope of the definition.

An Interconnected Digital Model Platform (IDMP) Architecture

FIG. 1 shows an exemplary interconnected digital model platform (IDMP) architecture, in accordance with some embodiments of the present invention. IDEP 100 streamlines the process of product development from conception to production, by using a virtual representation or digital twin 122 of the product to optimize and refine features before building a physical prototype or physical twin 132, and to iteratively update digital twin 122 until digital twin 122 and physical twin 132 are in sync to meet the product's desired performance goals. In the context of digital engineering (DE), the IDMP 100 may be identified as an Interconnected Digital Engineering Platform (IDEP).

Specifically, a product (e.g., airplane, spacecraft, exploration rover, missile system, automobile, rail system, marine vehicle, remotely operated underwater vehicle, robot, drone, medical device, biomedical device, pharmaceutical compound, drug, power generation system, smart grid metering and management system, microprocessor, integrated circuit, building, bridge, tunnel, chemical plants, oil and gas pipeline, refinery, etc.) manufacturer may use IDEP platform 100 to develop a new product. The engineering team from the manufacturer may create or instantiate digital twin 122 of the product in a virtual environment 120, encompassing detailed computer-aided design (CAD) models and finite element analysis (FEA) or computational fluid dynamics (CFD) simulations of component systems such as fuselage, wings, engines, propellers, tail assembly, and aerodynamics. digital twin 122 represents the product's design and performance characteristics virtually, allowing the team to optimize and refine features before building a physical prototype 132 in a physical environment 130. In some embodiments, physical twin 132 may be an existing entity, while digital twin 122 is a digital instance that replicates individual configurations of physical twin 132, as-built or as-maintained. In the present disclosure, for illustrative purposes only, digital twin 122 and physical twin 132 are discussed in the context of building a new product, but it would be understood by persons of ordinary skill in the art that the instantiation of digital twin 122 and physical twin 132 may take place in any order, based on the particular use case under consideration.

Digital models (e.g., CAD models, FEA models, CFD models) used for creating digital twin 122 are shown within a model plane 180 in FIG. 1. Also shown in model plane 180 is a neural network (NN) model 184, which may provide machine-learning based predictive modeling and simulation for a DE process. A DE model such as 182 may be spliced into one or more model splices, such as 172 and 173 within a splice plane 170. Individual digital twins such as 122 are instantiated from splice plane 170 via an application plane 160. A model splice such as 172 may be linked to another model splice such as 171 by a platform script or application 162 on application plane 160 into a digital thread. Multiple digital threads such as 162 and 163 may be further linked across different stages or phases of a product life cycle, from concept, design, testing, to production. Digital threads further enable seamless data exchange and collaboration between departments and stakeholders, ensuring optimized and validated designs.

As model splicing provides input and output splice functions that can access and modify DE model data, design updates and DE tasks associated with the digital threads may be represented by scripted, interconnected, and pipelined tasks arranged in Directed Acyclic Graphs (DAGs) such as 124. A DE task DAG example is discussed in further detail with reference to FIG. 10.

To enhance the design, external sensory data 140 may be collected, processed, and integrated into application plane 160. This process involves linking data from different sources, such as physical sensors 134 on prototype 132, physical environmental sensors 136, and other external data streams such as simulation data from model plane 180. API endpoints provide access to digital artifacts from various environments (e.g., physical twin sensor 134 data) and integrate them into the spliced plane 170 for the digital twin 122. Model splices on the splice plane 170 enable autonomous data linkages and digital thread generation, ensuring digital twin 122 accurately represents the product's real-world performance and characteristics.

To validate digital twin 122's accuracy, the engineering team may build or instantiate physical twin 132 based on the same twin configuration (i.e., digital design). Physical prototype 132 may be equipped with numerous sensors 134, such as accelerometers and temperature sensors, to gather real-time performance data. This data may be compared with the digital twin's simulations to confirm the product's performance and verify its design.

Processed sensory data 144 may be used to estimate parameters difficult to measure directly, such as aerodynamic forces or tire contact patch forces. Such processed sensory data provide additional data for digital twin 122, further refining its accuracy and reliability. Processed sensory data 144 may be generated from physical environment sensors 136 with physical environment 130, and may be retrieved from other external databases 142, as discussed below.

During development, feedback from customers and market research may be collected to identify potential improvements or adjustments to the product's design. At an analysis & control plane (ACP) 150, subject matter experts (SMEs) may analyze processed sensory data 144 and external expert feedback 114, to make informed decisions on necessary design changes. Such an analysis 154 may be enhanced or entirely enabled by algorithms (i.e., static program code) or artificial intelligence (AI) modules. Linking of digital threads such as 162, physical sensors 134 and 136, processed sensory data 144, and expert feedback data 114 occurs at ACP 150, where sensor and performance data is compared, analyzed, leading to modifications of the underlying model files through digital threads.

In particular, sensory data 144 from physical environment 130 and performance data 126 from virtual environment 120 may be fed into a comparison engine 152. Comparison engine 152 may comprise tools that enable platform users to compare various design iterations with each other and with design requirements, identify performance lapses and trends, and run verification and validation (V&V) tools.

Model splicing is discussed in further detail with reference to FIGS. 7 to 9. Model splicing enables the scripting of any DE operation involving DE model files in model plane 180, where each DE model is associated with disparate and siloed DE tools. Codification of DE models and DE operations with a unified corpus of scripts enable IDEP 100 to become an aggregator where a large space of DE activities associated with a given product (e.g., airplane, spacecraft, exploration rover, missile system, automobile, rail system, marine vehicle, remotely operated underwater vehicle, robot, drone, medical device, biomedical device, pharmaceutical compound, drug, power generation system, smart grid metering and management system, microprocessor, integrated circuit, building, bridge, tunnel, chemical plants, oil and gas pipeline, refinery, etc.) may be threaded through program code. Thus, model splicing enables the linking and manipulation of all model files (e.g., 182, 184) associated with a given product within the same interconnected DE platform or DE ecosystem 100. As a consequence, the generation and training of AI modules for the purpose of manipulating DE models (e.g., 182), digital threads (e.g., 162), and digital twins (e.g., 122) become possible over the programmable and unified IDEP 100.

Virtual and Physical Feedback Loops

FIG. 1 uses letter labels "A" to "H" to denote different stages of a product's lifecycle. At each stage, IDEP 100 enables feedback loops whereby data emanating from a physical twin or a digital twin is analyzed at ACP 150, leading to the generation of a new twin configuration based on design modifications. The new twin configuration may be stored in a twin configuration set and applied through the application and splice planes, yielding modified model files that are registered on the digital thread.

A virtual feedback loop 104 starts with a decision 106 to instantiate new digital twin 122. A DAG of hierarchical tasks 124 allows the automated instantiation of digital twin 122 within virtual environment 120, based on a twin configuration applied at a process step 108 from a twin configuration set 156. digital twin 122 and/or components thereof are then tested in virtual environment 120, leading to the generation of digital twin performance data 126. Concurrently, digital twin 122 and/or components thereof may be tested and simulated in model plane 180 using DE software tools, giving rise to test and simulation performance data 174. Performance data 126 and 174 may be combined, compared via engine 152, and analyzed at ACP 150, potentially leading to the generation and storage of a new twin configuration. The eventual decision to instantiate a digital twin from the new twin configuration completes virtual feedback loop 104.

A physical feedback loop 102 starts with a decision 106 to instantiate a new physical twin 132. physical twin 132 may be instantiated in a physical environment 130 from the model files of model plane 180 that are associated with an applied twin configuration from the twin configuration set 156. physical twin 132 and/or components thereof are then tested in physical environment 132, leading to the generation of sensory data from physical twin sensors 134 and environmental sensors 136 located in physical environment 130. This sensory data may be combined with data from external databases to yield processed sensory data 144. In one exemplary embodiment, temperature readings from environmental sensors located within the physical environment are completed, adjusted (e.g., shifted), and/or calibrated using data from external temperature databases.

Data from physical twin sensors 134 may be directly added to the model files in model plane 180 by the DE software tools used in the design process of physical twin 132. Alternatively, physical twin sensor data may be added to digital thread 162 associated with physical twin 132 directly via application plane 160. In addition, processed sensory data 144 may be integrated into IDEP 100 directly via application plane 160. For example, processed sensory data 144 may be sent to ACP 150 for analysis, potentially leading to the generation and storage of a new twin configuration. The eventual decision to instantiate a physical twin from the new twin configuration completes physical feedback loop 102.

At each stage A to H of the product life cycle, the system may label one twin configuration as a current design reference, herein described as an "authoritative twin" or "authoritative reference". The authoritative twin represents the design configuration that best responds to actual conditions (i.e., the ground truth). U.S. provisional patent application No. 63/470,870 provides a more complete description of authoritative twins and their determination, and is incorporated by reference in its entirety herein.

With faster feedback loops from sensor data and expert recommendations, the system updates digital twin 122 to reflect latest design changes. This update process may involve engineering teams analyzing feedback 154 and executing the changes through IDEP 100, or automated changes enabled by IDEP 100 where updates to digital twin 122 are generated through programmed algorithms or AI modules. This iterative updating process continues until digital twin 122 and physical twin 132 are in sync and the product's performance meets desired goals. While IDEP 100 may not itself designate the authoritative reference between a digital twin or a physical twin, the platform provides configurable mechanisms such as policies, algorithms, voting schema, and statistical support, whereby agents may designate a new digital twin as the authoritative digital twin, or equivalently in what instances the physical twin is the authoritative source of truth.

When significant design improvements are made, a new physical twin prototype may be built based on the updated digital twin. This new prototype undergoes further testing and validation, ensuring the product's performance and design align with project objectives.

Once digital twin 122 and physical twin 132 have been validated and optimized, the product is ready for production. A digital thread connecting all stages of development can be queried via splice plane 170 to generate documentation as needed to meet validation and verification requirements. The use of model splicing, along with the feedback architecture shown in FIG. 1, improves the efficiency of the overall product innovation process.

Interconnected DE Platform and Product Lifecycle

In FIG. 1, letter labels "A" to "H" indicate the following major steps of a product lifecycle, according to some embodiments of the current invention:

A. Digital models reside within customer environments: a product may be originally represented by model files that are accessible via software tools located within customer environments. Model plane 180 encompasses all model files (e.g., 182) associated with the product.

B. Preparatory steps for design in the digital realm: splice plane 170 encompasses model splices (e.g., 172) generated from DE model file through model splicing. Model splicing enables the integration and sharing of DE model files within a single platform, as described in detail with reference to FIGS. 7 to 9.

C. Link threads as needed among model splices: to implement a product, model splices are linked through scripts within application plane 160. A digital twin 122 englobing as-designed product features may be generated from application plane 160 for running in virtual environment 120. The complete twin configuration of a generated digital twin is saved in twin configuration set 156 located at the analysis & control plane (ACP) 150. Features or parts of digital twin 122 may be simulated in model plane 180, with performance data 174 accessed through splice plane 170. In one embodiment, features or parts of physical twin 132 or digital twin 122 configuration may be simulated outside the platform, where performance data is received by the ACP 150 for processing, in a similar way as performance data 126 received from digital twin 122.

D. Finalize "As-designed": performance data 126 from digital twin 122 or simulation performance data 174 attained through model plane 180 and accessed through model splicing may be collected and sent to ACP 150 for analysis. Performance data from different iterations of digital twin 122 may be compared via engine 152 to design requirements. Analysis of the differences may lead to the generation of new twin configurations that are stored at twin configuration set 156. Each twin configuration in twin configuration set 156 may be applied at application plane 160 and splice plane 170 via process step 108 to instantiate a corresponding digital twin. Multiple digital twins may be generated and tested, consecutively or simultaneously, against the design requirements, through comparison engine 152 and analysis module 154. Verification and validation tools may be run on the various digital twin iterations.

E. Finalize "As-manufactured": once a digital twin 122 satisfies the design requirements, a corresponding physical twin 132 prototype may be instantiated from the spliced model files (e.g., 172). Sensor data originating from the physical twin 134 or from within the physical environment 136 may be collected, combined with other external data 142 (e.g., sensor data from other physical environments). The resulting processed sensory data 144 may be sent to the analysis & control plane 150 to be compared with performance data 126 from digital twins and simulations (e.g., 174), leading to further digital twin 122 and physical twin 132 iterations populating the twin configuration set 156. Processed sensory data 144 may also be mapped to the digital threads (e.g., 164) and model splices (e.g., 172) governing the tested physical twin 132 through the application plane 160.

F. Finalize "As-assembled": once the manufacturing process is completed for the various parts, as a digital twin and as a physical twin, the next step is to finalize the assembled configuration. This involves creating a digital representation of the assembly to ensure it meets the specified requirements. The digital assembly takes into account the dimensions and tolerances of the "as-manufactured" parts. To verify the feasibility of the digital assembly, tests are conducted using the measured data obtained from the physical assembly and its individual components. Measurement data from the physical component parts may serve as the authoritative reference for the digital assembly, ensuring alignment with the real-world configuration. The digital assembly is compared with the actual physical assembly requirements for validation of the assembled configuration. Subsequently, the digital assembly tests and configurations serve as an authoritative reference for instructions to guide the physical assembly process and ensure accurate replication. IDEP 100 components described above may be used in the assembly process. In its authoritative iteration, digital twin 122 ultimately captures the precise details of the physical assembly, enabling comprehensive analysis and control in subsequent stages of the process.

G. Finalize "As-operated": to assess the performance of the physical assembly or its individual component parts, multiple digital twins 122 may be generated as needed. These digital twins are created based on specific performance metrics and serve as virtual replicas of the physical system. Digital twins 122 are continuously updated and refined in real-time using the operational data (e.g., 144) collected from monitoring the performance of the physical assembly or its components. This data may include, but is not limited to, processed sensory data, performance indicators, and other relevant information. By incorporating this real-time operational data, digital twins 122 stay synchronized with the actual system and provide an accurate representation of its operational performance. Any changes or improvements observed via sensory data 144 during the real-world operation of the assembly are reflected in DE models within the digital twins and recorded in the twin configuration set 156. This ensures that the digital twins remain up-to-date and aligned with the current state of the physical system.

H. Predictive analytics/Future performance: The design process may continue iteratively in virtual environment 120 through new digital twin 122 configurations as the product is operated. Multiple digital twins may be created to evaluate the future performance of the physical assembly or its component parts based on specific performance metrics. Simulations are conducted with various control policies to assess the impact on performance objectives and costs. The outcome of these simulations helps in deciding which specific control policies should be implemented (e.g., tail volume coefficients and sideslip angle for an airplane product). The digital twin DE models (e.g., 182) are continuously updated and refined using the latest sensor data, control policies, and performance metrics to enhance their predictive accuracy. This iterative process ensures that the digital twins (e.g., 122, 156) provide reliable predictions of future performance and assist in making informed decisions.

The hardware components making up IDEP 100 (e.g., servers, computing devices, storage devices, network links) may be centralized or distributed among various entities, including one or more DE service providers and DE clients, as further discussed in the context of FIGS. 3 and 4. FIG. 4 shows an illustration of various potential configurations for instancing a DE platform within a customer's physical system and information technology (IT) environment, usually a virtual private cloud (VPC) protected by a firewall.

Digital Documentation through Live Digital Objects

The methods and systems described herein enable the updating and generation of digital documents using the full functionality of the IDMP shown in FIG. 1. In FIG. 1, the IDMP virtual feedback loop 104 allows the scripting of program code within a digital thread 162 for the generation, storing, and updating of digital twins 122 and twin configurations 156. Similarly, the IDMP virtual feedback loop 104 also allows the scripting of program code within a digital thread 162 for the generation, storing, and updating of digital documents. This enables the creation and maintenance of so-called live digital objects.

Live digital objects are more akin to a digital twin than a conventional static document in that they are configured, through a digital thread, to be continuously updated to reflect the most current changes within a particular twin configuration. In particular, an authoritative/trusted live digital object is configured to reflect the latest authoritative/trusted twin configuration. Specifically, live digital objects are digital objects that (1) include a digital artifact extracted from a digital model through a model representation (e.g., a model splice), where (2) a modification of the digital artifact appears in the live digital object within a predetermined delay. In various embodiments, the updates are effectively real-time or near real-time.

Live digital objects may use a document interface, yielding live digital documents, or live documents. Live digital documents may pull data from multiple model files. Preliminary design reviews may thus take the form of a live digital document.

Live digital objects may also use a dashboard interface, yielding live digital boards, or live boards. In some embodiments, a live digital board may display one or more documents and one or more applications on a two-dimensional (2D) screen rendered on a modality of a multimodal interface such as a 2D display, a two-and-a-half-dimensional (2.5D) display, and a three-dimensional (3D) semi-immersive or fully immersive display. Live digital boards may combine multiple documents through a VR/AR and/or conversational interface, into a board/screen 2D, 2.5D format. For example, a live board may combine multiple model files from a CAD software with collaboration chat rooms over a 2D screen rendered on a 2D display (traditional display), a 2.5D display, or a 3D semi immersive or fully immersive display. In one embodiment, the live board combines multiple view screens.

Finally, a live digital object may take the form of a live digital space (or live space), a 3D virtual environment or an augmented environment. In some embodiments, a live digital space displays one or more documents and one or more other applications in a virtual space rendered through a 3D spatial display. Live digital spaces may combine multiple documents through VR/AR and/or conversational interfaces into a 3D spatial representation. For example, a live space may display multiple 3D model files from a CAD software with collaboration chat rooms over a 3D semi immersive or fully immersive display spatial display.

Live digital objects may be stored and accessed through an IDMP. Specifically, live digital objects may be used to provide the background context for a given digital thread, and may specifically be used to display and organize a digital thread's associated artifacts, as described herein.

Live digital objects may hence be known as magic objects (i.e., live documents may be denoted "magic documents", live boards may be denoted "magic boards", and live spaces may be denoted "magic spaces") as changes implemented within a twin configuration (e.g., through a modification of a model file) may appear instantaneously within the relevant data fields of the live digital objects. Similarly, authoritative/trusted live digital objects may also be known as authoritative/trusted magic objects as they continuously reflect data from the authoritative twin, thus always representing the authoritative source of truth.

Given the massive quantities of data and potential modifications that are carried out during a product's lifecycle, the scripts implementing live digital objects may be configured to allow for a predefined maximum delay between the modification of a model file (e.g., the modification of a digital artifact) and the execution of the corresponding changes within a live digital object. Moreover, for similar reasons, the scripts implementing live digital objects may be restricted to operate over a specified subset of model files within a digital twin or a system, thus reflecting changes only to key parameters and configurations of the digital twin or the system.

The "printing" of a live digital document or board corresponds to the generation of a frozen (i.e., static) time-stamped version of a live digital document or board. Therefore, "printing"—for a live digital document or board—is equivalent to "instantiation" for a digital twin. Similarly, the "printing" of a live digital space may also be envisaged, yielding a frozen 3D representation of a given system or digital thread.

In one embodiment of the present invention, an IDMP script (e.g., an IDEP application) having access to model data via one or more model splices and digital document templates to create and/or update a live digital object, may dynamically update the live digital object using software-defined digital threads over an IDMP platform. In such an embodiment, the IDMP script may receive user interactions dynamically. In response to the user updating data for a model and/or a specific parameter setting (e.g., a digital artifact), the IDMP script may dynamically propagate the user's updates into the live digital object through a corresponding digital thread.

In another embodiment of the present invention, an IDEP script may instantiate a DE document with sufficient specification to generate a physical twin. In such an embodiment, the IDEP script may receive a digital twin configuration of a physical twin, generate a live digital object associated with the digital twin configuration, receive a predetermined timestamp, and generate a printed DE document (i.e., a static, time-stamped version of the live digital object at the predetermined timestamp). Such an operation may be referred to as the "printing of a digital twin".

In yet another embodiment of the present invention, an IDEP script may instantiate (i.e., "print") a DE document specifying an updated digital twin upon detecting the update. In such an embodiment, the IDEP script may detect a modification of a DE model or an associated digital thread. In response to detecting the modification, the IDEP script may update relevant data fields and sections of the live DE document based on the detected modification, and generate an updated printed DE document with the updated relevant data fields and sections based on the always-updated live DE document.

In various embodiments, a software-defined digital thread can be associated with a companion magic document (or "magic doc") that encompasses live updates for one or more core parameters of the digital thread. In one embodiment, the magic doc includes key parameters describing the implementation of a user's intent. For example, In one embodiment, a companion magic doc for a given digital thread may include key data points and key orchestration script examples illustrating a user's intent (e.g., "increase a drone's wing span by 1%"). In one embodiment, a script-generating ML model receiving as input pseudocode or detailed user instructions derived from a user's intent, is trained on prior IDEP digital threads and documents. In addition to generating a digital thread (with orchestration scripts and comments), the script-generating ML model is also configured to generate a magic doc that explains how the generated digital thread addresses the user intent.

In some embodiments, receiving user interactions with a DE model, modifications to a DE model, or modifications to an associated digital thread, may be carried out through a push configuration, where a model splicer or a script of the digital thread sends any occurring relevant updates to the IDEP script immediately or within a specified maximum time delay. In other embodiments, receiving user interactions with a DE model, modifications of a DE model, or modifications of an associated digital thread, may be carried out through a pull configuration, where a model splicer or a script of the digital thread flag recent modifications until the IDEP script queries relevant DE models (via their model splices) or associated digital threads, for flagged modification. In these embodiments, the IDEP script may extract the modified information from the modified DE models (via their model splices) or the modified digital threads, in order to update a live DE document. In yet other embodiments, receiving user interactions with a DE model, modifications of a DE model, or modifications of an associated digital thread, may be carried out through a pull configuration, where the IDEP script regularly checks relevant DE models (via their model splices) or associated digital threads, for modified data fields, by comparing the data found in the live DE document with regularly extracted model and digital thread data. In these embodiments, the IDEP script may use the modified data to update the live DE document.

Dynamic Document Updates

Some embodiments described herein center around documentation, or document preparation and update and on document management (e.g., for reviews). As discussed, some embodiments of the system allow for dynamic updates to documents, which pertain to software-defined digital threads in the IDEP platform and the accompanying documentation.

Use of an ML engine with the model data and templates to create and/or update documents almost instantaneously as a one-time action have been presented. Furthermore, the digital engineering platform interacts dynamically with the user. As the user interacts with the system and updates data for a model or a specific parameter setting, these changes may be propagated through the corresponding digital threads and to the associated documentation. The AI architectures involved include locally-instanced large language model (LLMs, for data security reasons) as well as non-LLM approaches (e.g., NLP-based), in order to create, update, or predict documentation in the form of sentences, paragraphs, and whole documents. At the same time, trying to update the entire system of digital threads for every update may be prohibitively slow and may present security risks to the system. Generating live DE documents that are updated based on a subset of a system's DE models and within a maximum time delay may therefore be more efficient.

Interconnected Digital Engineering and Certification Ecosystem

FIG. 2 shows an exemplary implementation of the IDEP as an interconnected digital engineering (DE) and certification ecosystem 200, and exemplary digitally certified products, in accordance with some embodiments of the present invention. Interconnected DE and certification ecosystem 200 may be viewed as a particular instantiation or implementation of IDEP 100 shown in FIG. 1. The IDEP may also be referred to as a "DE Metaverse."

Interconnected DE and certification ecosystem 200 is a computer-based system that links models and simulation tools with their relevant requirements in order to meet verification, validation, and certification purposes. Verification refers to methods of evaluating whether a product, service, or system meets specified requirements and is fit for its intended purpose. For example, in the aerospace industry, a verification process may include testing an aircraft component to ensure it can withstand the forces and conditions it will encounter during flight. Verification also includes checking externally against customer or stakeholder needs. Validation refers to methods of evaluating whether the overall performance of a product, service, or system is suitable for its intended use, including its compliance with regulatory requirements and its ability to meet the needs of its intended users. Validation also includes checking internally against specifications and regulations. Interconnected DE and certification ecosystem 200 as disclosed herein is designed to connect and bridge large numbers of disparate DE tools and models from multitudes of engineering domains and fields, or from separate organizations who may want to share models with each other but have no interactions otherwise. In various embodiments, the system implements a robust, scalable, and efficient DE model collaboration platform, with extensible model splices having data structures and accompanying functions for widely distributed DE model types and DE tools, an application layer that links or connects DE models via APIs, digital threads that connect live engineering model files for collaboration and sharing, digital documentation management to assist with the preparation of engineering and certification documents appropriate for verification and validation (V&V) purposes, and AI-assistance with the functionalities of the aforementioned system components.

More specifically, FIG. 2 shows an example of an interconnected DE and certification ecosystem and examples of digitally certified products 212A, 212B, and 212C (collectively referred to as digitally certified products 212). For example, in some implementations, digitally certified product 212A may be an unmanned aerial vehicle (UAV) or other aircraft, digitally certified product 212B may be a drug or other chemical or biologic compound, and the digitally certified product 212C may be a process such as a manufacturing process. In general, the digitally certified products 212 can include any product, process, or solution that can be developed, tested, or certified (partially or entirely) using DE tools such as 202. In some implementations, digitally certified products 212 may not be limited to physical products, but can include non-physical products such as methodologies, processes and software, etc. While physical and physically-interacting systems often require multiple DE tools to assess for compliance with common V&V products simply by virtue of the need for modeling and simulation (M&S), many complex non-physical systems may also require multiple DE tools for product development, testing, and/or certification. With this in mind, various other possibilities for digitally certified products will be recognized by one of ordinary skills in the art. The inclusion of regulatory and certification standards, compliances, calculations, and tests (e.g., for the development, testing, and certification of products and/or solutions) enables users to incorporate relevant regulatory and certification standards, compliances, calculations, and test data directly into their DE workflow. Regulatory and certification standards, compliances, calculations, and tests are sometimes referred to herein as "common validation and verification (V&V) products."

Digitally certified products 212 in FIG. 2 may be designed and/or certified using interconnected DE and certification ecosystem 200. Interconnected DE and certification ecosystem 200 may include a user device 206A, API 206B, or other similar human-to-machine, or machine-to-machine communication interfaces operated by a user. A user may be a human 204 of various skill levels, or artificial users such as algorithms, artificial intelligence, or other software that interface with ecosystem 200 through API 206B. Ecosystem 200 may further comprise a computing and control system 208 ("computing system 208" hereinafter) connected to and/or including a data storage unit 218, an artificial intelligence (AI) engine 220, and an application and service layer 222. In some embodiments, the artificial intelligence (AI) engine 220 is a machine learning (ML) engine. References to "machine learning engine 220" or "ML engine 220" may be extended to artificial intelligence (AI) engines 220 more generally. For the purposes of clarity, any user selected from various potential human or artificial users are referred to herein simply as the user 204. In some implementations, computing system 208 may be a centralized computing system; in some implementations, computing system 208 may be a distributed computing system. In some cases, user 204 may be considered part of ecosystem 200, while in other implementations, user 204 may be considered separately from ecosystem 200. Ecosystem 200 may include one or more DE tools 202, such as data analysis tool 202A, computer-aided design (CAD) and finite element analysis (FEA) tool 202B, simulation tool 202C, drug modeling and simulation (M&S) tools 202D-202E, manufacturing M&S tools 202F-202G, etc. Ecosystem 200 may also include a repository of common V&V products 210, such as regulatory standards 210A-210F related to the development and certification of a UAV, medical standard 210G (e.g., CE marking (Europe), FCC Declaration of Conformity (USA), IECEE CB Scheme (Europe, North America, parts of Asia & Australia), CDSCO (India), FDA (USA), etc.), medical certification regulation 210H (e.g., ISO 13485, ISO 14971, ISO 9001, ISO 62304, ISO 10993, ISO 15223, ISO 11135, ISO 11137, ISO 11607, IEC 60601, etc.), manufacturing standard 210I (e.g., ISO 9001, ISO 9013, ISO 10204, EN 1090, ISO 14004, etc.), and manufacturing certification regulation 210J (e.g., General Certification of Conformity (GCC), etc.), etc.

In FIG. 2, computing system 208 is centrally disposed within the architecture and is configured to communicate with (e.g., receive data from and transmit data to) user device 206A or API 206B such as an API associated with an artificial user, DE tools 202 via an API or software development kit (SDK) 214, and repository of common V&V products 210 via an API/SDK interface 216. For example, computing system 208 may be configured to communicate with user device 206A and/or API 206B to send or receive data corresponding to a prototype of a design, information about a user (e.g., user credentials), engineering-related inputs/outputs associated with DE tools 202, digitized common V&V products, an evaluation of a product design, user instructions (e.g., search requests, data processing instructions, etc.), and more. Computing system 208 may also be configured to communicate with one or more DE tools 202 to send engineering-related inputs for executing analyses, models, simulations, tests, etc. and to receive engineering-related outputs associated with the results. Computing system 208 may also be configured to communicate with repository of common V&V products 210 to retrieve data corresponding to one or more digitized common V&V products 210 and/or upload new common V&V products, such as those received from user 204, to repository of common V&V products 210. All communications may be transmitted and corroborated securely, for example, using methods relying on zero-trust security. In some implementations, the computing system of the ecosystem may interface with regulatory and/or certification authorities (e.g., via websites operated by the authorities) to retrieve digitized common V&V products published by the regulatory authorities that may be relevant for a product that a user is designing. In some implementations, the user may upload digitized common V&V products to the ecosystem themselves.

Computing and control system 208 may process and/or store the data that it receives to perform analysis and control functionalities, and in some implementations, may access machine learning engine 220 and/or application and service layer 222, to identify useful insights based on the data, as further described herein. The central disposition of computing system 208 within the architecture of the ecosystem has many advantages including reducing the technical complexity of integrating the various DE tools; improving the product development experience of user 204; intelligently connecting common V&V products such as standards 210A-210F to DE tools 202 most useful for satisfying requirements associated with the common V&V products; and enabling the monitoring, storing, and analysis of the various data that flows between the elements of the ecosystem throughout the product development process. In some implementations, the data flowing through and potentially stored by the computing system 208 can also be auditable to prevent a security breach, to perform data quality control, etc. Similarly, any analysis and control functions performed via computing system 208 may be tracked for auditability and traceability considerations.

Referring to one particular example shown in FIG. 2, user 204 may use the DE and certification ecosystem to produce a digitally certified UAV 212B. For example, user 204 may be primarily concerned with certifying the UAV as satisfying the requirements of a particular regulatory standard 210E relating to failure conditions of the UAV (e.g., "MIL-HDBK 516C 4.1.4—Failure Conditions"). In this usage scenario, user 204 may develop a digital prototype of the UAV on user device 206A or using API 206B and may transmit prototype data (e.g., as at least one of a CAD file, a MBSE file, etc.) to computing system 208. Along with the prototype data, user 204 can transmit, via user device 206A, additional data including an indication of the common V&V product that user 204 is interested in certifying the product for (e.g., regulatory standard 210E), user credential information for accessing one or more capabilities of computing system 208, and/or instructions for running one or more digital models, tests, and/or simulations using a subset of DE tools 202.

Referring to another example shown in FIG. 2, user 204 can use the DE and certification ecosystem to produce a digitally certified drug, chemical compound, or biologic 212A. For example, user 204 may be primarily concerned with certifying drug, chemical compound, or biologic 212A as satisfying the requirements of a particular medical standard 210G and medical certification regulation 210H. In this usage scenario, user 204 can develop a digital prototype of the drug, chemical compound, or biologic on user device 206A or using API 206B and can transmit the prototype data (e.g., as a molecular modeling file) to computing system 208. Along with the prototype data, user 204 can transmit, via user device 206A, additional data including an indication of the common V&V products that user 204 is interested in certifying the product for (e.g., medical standard 210G and medical certification regulation 210H), user credential information for accessing one or more capabilities of computing system 208, and/or instructions for running one or more digital models, tests, and/or simulations using a subset of DE tools 202 (e.g., drug M&S tools 202D-202E).

Referring to yet another example shown in FIG. 2, user 204 can use the digital engineering and certification ecosystem to produce a digitally certified manufacturing process 212C. For example, user 204 may be primarily concerned with certifying manufacturing process 212C as satisfying the requirements of a particular manufacturing standard 210I and manufacturing certification regulation 210J. In this usage scenario, user 204 can develop a digital prototype of the manufacturing process on user device 206A or using API 206B and can transmit the prototype data to computing system 208. Along with the prototype data, user 204 can transmit, via the user device 206A, additional data including an indication of the common V&V products that user 204 is interested in certifying the process for (e.g., manufacturing standard 210I and manufacturing certification regulation 210J), user credential information for accessing one or more capabilities of computing system 208, and/or instructions for running one or more digital models, tests, and/or simulations using a subset of DE tools 202 (e.g., manufacturing M&S tools 202F-202G).

In any of the aforementioned examples, computing system 208 can receive the data transmitted from user device 206A and/or API 206B and can process the data to evaluate whether the common V&V product of interest (e.g., regulatory standard 210E, medical standard 210G, medical certification regulation 210H, manufacturing standard 210I, manufacturing certification regulation 210J, etc.) is satisfied by the user's digital prototype, in the context of analysis and control plane 150 shown in FIG. 1. For example, this can involve communicating with the repository of common V&V products 210 via the API/SDK 216 to retrieve the relevant common V&V product of interest and processing the regulatory and/or certification data associated with the common V&V product to identify one or more requirements for the UAV prototype; the drug, chemical compound, or biologic prototype; the manufacturing process prototype; etc. In some implementations, repository of common V&V products 210 can be hosted by a regulatory and/or certification authority (or another third party), and retrieving the regulatory and/or certification data can involve using API/SDK 216 to interface with one or more data resources maintained by the regulatory and/or certification authority (or the another third party). In some implementations, the regulatory and/or certification data can be provided directly by user 204 via user device 206A and/or API 206B (e.g., along with the prototype data).

Evaluating whether the common V&V product of interest is satisfied by the user's digital prototype can also involve processing the prototype data received from user device 206A or API 206B to determine if the one or more identified requirements are actually satisfied. In some implementations, computing system 208 can include one or more plugins, local applications, etc. to process the prototype data directly at the computing system 208. For example, model splicing and digital threading applications are discussed in detail later with reference to FIG. 6 to 9. In some implementations, the computing system can simply pre-process the received prototype data (e.g., to derive inputs for DE tools 202) and can then transmit instructions and/or input data to a subset of DE tools 202 via API/SDK 214 for further processing.

Not all DE tools 202 are necessarily required for the satisfaction of particular regulatory and/or certification standards. Therefore, in the UAV example provided in FIG. 2, computing system 208 may determine that only a data analysis tool 202A and a finite element analysis tool 202B are required to satisfy regulatory standard 210E for failure conditions. In the drug, chemical compound, or biologic example provided in FIG. 2, computing system 208 may determine that only drug M&S tools 202D-202E are required to satisfy medical standard 210G and medical certification regulation 210H. In the manufacturing process example provided in FIG. 2, computing system 208 may determine that only manufacturing M&S tools 202F-202G are required to satisfy manufacturing standard 210I and manufacturing certification regulation 210J. In other implementations, user 204 may themselves identify the particular subset of DE tools 202 that should be used to satisfy the common V&V product of interest, provided that user 204 is a qualified subject matter expert (SME). In other implementations, user 204 may input to computing system 208 some suggested DE tools 202 to satisfy a common V&V product of interest, and computing system 208 can recommend to user 204 a modified subset of DE tools 202 for final approval by user 204, provided that user 204 is a qualified SME. After a subset of DE tools 202 has been identified, computing system 208 can then transmit instructions and/or input data to the identified subset of DE tools 202 to run one or more models, tests, and/or simulations. The results (or "engineering-related data outputs" or "digital artifacts") of these models, tests, and/or simulations can be transmitted back and received at computing system 208.

In still other implementations, user 204 may input a required DE tool such as 202F for meeting a common V&V product 210I, and the computing system 208 can determine that another DE tool such as 102G is also required to satisfy common V&V product 210I. The computing system can then transmit instructions and/or input data to both DE tools (e.g., 202F and 202G), and the outputs of these DE tools can be transmitted and received at computing system 208. In some cases, the input data submitted to one of the DE tools (e.g., 202G) can be derived (e.g., by computing system 208) from the output of another of the DE tools (e.g., 202F).

After receiving engineering-related data outputs or digital artifacts from DE tools 202, computing system 208 can then process the received engineering-related data outputs to evaluate whether or not the requirements identified in the common V&V product of interest (e.g., regulatory standard 210E, medical standard 2110G, medical certification regulation 210H, manufacturing standard 210I, manufacturing certification regulation 210J, etc.) are satisfied. For example, applications and services 222 may provide instructions for orchestrating validation or verification activities. In some implementations, computing system 208 can generate a report summarizing the results of the evaluation and can transmit the report to device 206A or API 206B for review by user 204. If all of the requirements are satisfied, then the prototype can be certified, resulting in digitally certified product 212 (e.g., digitally certified drug, chemical compound, or biologic 212A; digitally certified UAV 212B; digitally certified manufacturing process 212C, etc.). However, if some of the regulatory requirements are not satisfied, then additional steps may need to be taken by user 204 to certify the prototype of the product. In some implementations, the report that is transmitted to the user can include recommendations for these additional steps (e.g., suggesting one or more design changes, suggesting the replacement of one or more components with a previously designed solution, suggesting one or more adjustments to the inputs of the models, tests, and/or simulations, etc.). If the requirements of a common V&V product are partially met, or are beyond the collective capabilities of distributed engineering tools 202, computing systems 208 may provide user 204 with a report recommending partial certification, compliance, or fulfillment of a subset of the common V&V products (e.g., digital certification of a subsystem or a sub-process of the prototype). The process of generating recommendations for user 204 is described in further detail below.

In response to reviewing the report, user 204 can make design changes to the digital prototype locally and/or can send one or more instructions to computing system 208 via user device 206A or API 206B. These instructions can include, for example, instructions for computing system 208 to re-evaluate an updated prototype design, use one or more different DE tools 202 for the evaluation process, and/or modify the inputs to DE tools 202. Computing system 208 can, in turn, receive the user instructions, perform one or more additional data manipulations in accordance with these instructions, and provide user 204 with an updated report. Through this iterative process, user 204 can utilize the interconnected digital engineering and certification ecosystem to design and ultimately certify (e.g., by providing certification compliance information) the prototype (e.g., the UAV prototype, drug prototype, manufacturing process prototype, etc.) with respect to the common V&V product of interest. Importantly, since all of these steps occur in the digital world (e.g., with digital prototypes, digital models/tests/simulations, and digital certification), significant amount of time, cost, and materials can be saved in comparison to a process that would involve the physical prototyping, evaluation and/or certification of a similar UAV, drug, manufacturing process, etc. If the requirements associated with a common V&V product are partially met, or are beyond the collective capabilities of DE tools 202, computing system 208 may provide user 204 with a report recommending partial certification, compliance or fulfillment of a subset of the common V&V products (e.g., digital certification of a subsystem or a sub-process of the prototype).

While the examples described above focus on the use of the interconnected digital engineering and certification ecosystem by a single user, additional advantages of the ecosystem can be realized through the repeated use of the ecosystem by multiple users. As mentioned above, the central positioning of computing system 208 within the architecture of the ecosystem enables computing system 208 to monitor and store the various data flows through the ecosystem. Thus, as an increasing number of users utilize the ecosystem for digital product development, data associated with each use of the ecosystem can be stored (e.g., in storage 218), traced (e.g., with metadata), and analyzed to yield various insights, which can be used to further automate the digital product development process and to make the digital product development process easier to navigate for non-subject matter experts.

Indeed, in some implementations, user credentials for user 204 can be indicative of the skill level of user 204, and can control the amount of automated assistance the user is provided. For example, non-subject matter experts may only be allowed to utilize the ecosystem to browse pre-made designs and/or solutions, to use DE tools 202 with certain default parameters, and/or to follow a predetermined workflow with automated assistance directing user 204 through the product development process. Meanwhile, more skilled users may still be provided with automated assistance, but may be provided with more opportunities to override default or suggested workflows and settings.

In some implementations, computing system 208 can host applications and services 222 that automate or partially automate components of common V&V products; expected or common data transmissions, including components of data transmissions, from user 204; expected or common interfaces and/or data exchanges, including components of interfaces, between various DE tools 202; expected or common interfaces and/or data exchanges, including components of interfaces, with machine learning (ML) models implemented on computing system 208 (e.g., models trained and/or implemented by the ML engine 220); and expected or common interfaces and/or data exchanges between the applications and services themselves (e.g., within applications and services layer 222).

In some implementations, the data from multiple uses of the ecosystem (or a portion of said data) can be aggregated to develop a training dataset. For example, usage records 217 collected via computing system 208 may be de-identified or anonymized, before being added to the training set. Such usage records may comprise model parameters and metadata, tool configurations, common V&V product matching to specific models or tools, user interactions with the system including inputs and actions, and other user-defined or system-defined configurations or decisions in using the ecosystem for digital engineering and certification. For instance, an exemplary de-identified usage record may comprise the combination of a specific DE tool, a specific target metric, a specific quantity deviation, and a corresponding specific user update to a DE model under this configuration. Another exemplary de-identified usage record may comprise a user-identified subset of DE tools 202 that should be used to satisfy a common V&V product of interest.

This training dataset can then be used to train ML models (e.g., using ML engine 220) to learn the steps and actions for certification processes and to perform a variety of tasks including the identification of which of DE tools 202 to use to satisfy a particular common V&V product; the identification of specific models, tests, and/or simulations (including inputs to them) that should be performed using DE tools 202; the identification of the common V&V products that need to be considered for a product of a particular type; the identification of one or more recommended actions for user 204 to take in response to a failed regulatory requirement; the estimation of model/test/simulation sensitivity to particular inputs; etc. The outputs of the trained ML models can be used to implement various features of the interconnected digital engineering and certification ecosystem including automatically suggesting inputs (e.g., inputs to DE tools 202) based on previously entered inputs, forecasting time and cost requirements for developing a product, predictively estimating the results of sensitivity analyses, and even suggesting design changes, original designs or design alternatives (e.g., via assistive or generative AI) to a user's prototype to overcome one or more requirements (e.g., regulatory and/or certification requirements) associated with a common V&V product. In some implementations, with enough training data, ML engine 220 may generate new designs, models, simulations, tests, common V&V products and/or digital threads on its own based on data collected from multiple uses of the ecosystem. Furthermore, such new designs, models, simulations, tests, common V&V products and digital threads generated by ML engine 220, once approved and adjusted by a user, may be added to the training set for further fine-tuning of ML algorithms in a reinforcement learning setup.

As shall be discussed in the context of FIGS. 7 to 9, the aforementioned collection of training datasets and the training of ML and AI modules including ML engine 220 may be enabled by model splicing technologies. Model splicing, as described herein, allows the scripting of DE model operations encompassing disparate DE tools into a corpus of normative program code, and facilitates the code-defined digital threading of a large space of DE activities involving DE models across different disciplines. ML and AI techniques may be used to create scripts to carry out almost any DE task and to execute any digital thread, allowing for programmable, machine-learnable, and dynamic changes to DE model files, digital threads, and ultimately to digital or physical twins, throughout the product life cycle. For example, in the embodiment shown in FIG. 2, ML engine 220 may manage or orchestrate the interactions between spliced DE models, DE tools, and common V&V products (e.g., DE requirements), based on digital thread options specific to user's intent and input. Sample DE tasks that may be carried out by ML engine 220 include, but are not limited to, (1) aligning models/analysis to certification lifecycle requirement steps, (2) optimizing compute by determining the appropriate fidelity of each model, (3) optimizing compute resources for specific tools/models, or (4) optimizing compute resources across multiple models. ML-enabled executions of DE tasks are not limited to certification or resource optimization, but encompass the whole DE space of operations. Rather, ML engine 220 may act as an AI multiplexer for the DE platform.

In addition to storing usage data to enable the development of ML models, previous prototype designs and/or solutions (e.g., previously designed components, systems, models, simulations and/or other engineering representations thereof) can be stored within the ecosystem (e.g., in storage 218) to enable users to search for and build upon the work of others. For example, previously designed components, systems, models, simulations and/or other engineering representations thereof can be searched for by user 204 and/or suggested to user 204 by computing system 208 in order to satisfy one or more requirements associated with a common V&V product. The previously designed components, systems, models, simulations and/or other engineering representations thereof can be utilized by user 204 as is, or can be utilized as a starting point for additional modifications. This store, or repository, of previously designed components, systems, models, simulations and/or other engineering representations thereof (whether or not they were ultimately certified) can be monetized to create a marketplace of digital products, which can be utilized to save time during the digital product development process, inspire users with alternative design ideas, avoid duplicative efforts, and more. In some implementations, data corresponding to previous designs and/or solutions may only be stored if the user who developed the design and/or solution opts to share the data. In some implementations, the repository of previous designs and/or solutions can be containerized for private usage within a single company, team, organizational entity, or technical field for private usage (e.g., to avoid the unwanted disclosure of confidential information). In some implementations, user credentials associated with user 204 can be checked by computing system 208 to determine which designs and/or solutions stored in the repository can be accessed by user 204. In some implementations, usage of the previously designed components, systems, models, simulations and/or other engineering representations thereof may be available only to other users who pay a fee for a usage.

Exemplary IDEP Implementation Architecture with Services and Features

FIG. 3 shows another exemplary implementation of the IDEP illustrating its offered services and features, in accordance with some embodiments of the present invention. Specifically, an exemplary implementation architecture diagram 300 is shown in FIG. 3 to include multiple illustrative components: an IDEP enclave 302, cloud services 304, and a customer environment 310 which optionally includes an IDEP exclave 316. This exemplary architecture 300 for the IDEP is designed in accordance with zero-trust security principles and is further designed to support scalability as well as robust and resilient operations. IDEP enclave 302 and IDEP exclave 316 together instantiate IDEP 100 shown in FIG. 1, with IDEP exclave 316 implementing model splicing and splice plane 170 in some embodiments of the present invention. An enclave is an independent set of cloud resources that are partitioned to be accessed by a single customer (i.e., single-tenant) or market (i.e., multi-tenant) that does not take dependencies on resources in other enclaves. An exclave is a set of cloud resources outside enclaves managed by the IDEP, to perform work for individual customers. Examples of exclaves include virtual machines (VMs) and/or servers that the IDEP maintains to run DE tools for customers who need such services.

In particular, IDEP enclave or DE platform enclave 302 may serve as a starting point for services rendered by the IDEP, and may be visualized as a central command and control hub responsible for the management and orchestration of all platform operations. For example, enclave 302 may be implemented using computer system 208 of the interconnected DE and certification ecosystem shown in FIG. 2. DE platform enclave 302 is designed to integrate both zero-trust security models and hyperscale capabilities, resulting in a secure and scalable processing environment tailored to individual customer needs. Zero-trust security features include, but are not limited to, strict access control, algorithmic impartiality, and data isolation. Enclave 302 also supports an ML engine such as 220 for real-time analytics, auto-scaling features for workload adaptability, and API-based interoperability with third-party services. Security and resource optimization are enhanced through multi-tenancy support, role-based access control, and data encryption both at rest and in transit. DE platform enclave 302 may also include one or more of the features described below.

First, IDEP enclave 302 may be designed in accordance with zero-trust security principles. In particular, DE platform enclave 302 may employ zero-trust principles to ensure that no implicit trust is assumed between any elements, such as digital models, platform agents or individual users (e.g., users 204) or their actions, within the system. That is, no agent may be inherently trusted and the system may always authenticate or authorize for specific jobs. The model is further strengthened through strict access control mechanisms, limiting even the administrative team (e.g., a team of individuals associated with the platform provider) to predetermined, restricted access to enclave resources. To augment this robust security stance, data encryption is applied both at rest and in transit, effectively mitigating risks of unauthorized access and data breaches.

IDEP enclave 302 can also be designed to maintain isolation and independence. A key aspect of the enclave's architecture is its focus on impartiality and isolation. DE enclave 302 disallows cryptographic dependencies from external enclaves and enforces strong isolation policies. The enclave's design also allows for both single-tenant and multi-tenant configurations, further strengthening data and process isolation between customers 306 (e.g., users 204). Additionally, DE enclave 302 is designed with decoupled resource sets, minimizing interdependencies and thereby promoting system efficiency and autonomy.

IDEP enclave 302 can further be designed for scalability and adaptability, aligning well with varying operational requirements. For example, the enclave 302 can incorporate hyperscale-like properties in conjunction with zero-trust principles to enable scalable growth and to handle high-performance workloads effectively.

IDEP enclave 302 can further be designed for workflow adaptability, accommodating varying customer workflows and DE models through strict access control mechanisms.

This configurability allows for a modular approach to integrate different functionalities ranging from data ingestion to algorithm execution, without compromising on the zero-trust security posture. Platform 300's adaptability makes it highly versatile for a multitude of use-cases, while ensuring consistent performance and robust security.

IDEP enclave 302 can further be designed to enable analytics for robust platform operations. At the core of the enclave's operational efficiency is a machine learning engine (e.g., machine learning engine 220) capable of performing real-time analytics. This enhances decision-making and operational efficiency across platform 300. Auto-scaling mechanisms can also be included to enable dynamic resource allocation based on workload demand, further adding to the platform's responsiveness and efficiency.

In the exemplary embodiment shown in FIG. 3, IDEP enclave 302 includes several components as described in further detail herein.

A "Monitoring Service Cell. may provide "Monitoring Service" and "Telemetry Service." A cell may refer to a set of microservices, for example, a set of microservices executing within a kubernetes pod. These components focus on maintaining, tracking and analyzing the performance of platform 300 to ensure good service delivery, including advanced machine learning capabilities for real-time analytics. A "Search Service Cell" provides "Search Service" to aid in the efficient retrieval of information from DE platform 300, adding to its overall functionality. A "Logging Service Cell" and a "Control Plane Service Cell" provide "Logging Service," "File Service", and "Job Service" to record and manage operational events and information flow within platform 300, and are instrumental in the functioning of platform 300. A "Static Assets Service Cell," provides "Statics Service", and may house user interface, SDKs, command line interface (CLI), and documentation for platform 300. An "API Gateway Service Cell" provides "API Gateway Service," and may provide DE platform API(s) (e.g., APIs 214, 216) and act as a mediator for requests between the client applications (e.g., DE tools 202, the repository of common V&V products 210, etc.) and the platform services. In some embodiments, the API gateway service cell may receive and respond to requests from agents such as DE platform exclave 316 to provide splice functions for model splicing purposes.

As shown in FIG. 3, the architecture of DE platform 300 may also include a cloud services 304 that provide services which cannot interact with customer data but can modify the software for the orchestration of DE platform operations. In example implementations, several cloud resources provide support and foundational services to the platform. For example, in the embodiment of the DE platform 300 shown in FIG. 3, cloud services 304 includes a "Customer Identity and Access Management (IAM) Service" that ensures secure and controlled access to platform 300. Cloud services 304 also includes a "Test Service" that tests tools to validate platform operations. Cloud services 304 may also include an "Orchestration Service" that controls and manages the lifecycle of containers on the platform 300. Cloud services 304 may also include an "Artifact Service" and "Version Control and Build Services," which may be used to maintain the evolution of projects, codes, and instances in the system, while also managing artifacts produced during the product development process.

As shown in FIG. 3, the architecture of DE platform 300 may also include a customer environment 310 with an "Authoritative Source of Truth" 312, customer tools 314, and an optional DE platform exclave 316. Customer environment 310 is where customer data resides and is processed in a zero-trust manner by DE platform 300. As described previously, DE platform enclave 302, by focusing on both zero-trust principles and hyperscale-like properties, provides a robust and scalable environment for the secure processing of significant workloads, according to the customer's unique needs. In some examples, DE platform exclave 316 may be situated within customer environment 310 in order to assist the customer(s) 306 with their DE tasks and operations, including model splicing and digital threading.

When a customer 306 (e.g., user 204) intends to perform a DE task using DE platform 300 (e.g., IDEP 100), typical operations may include secure data ingestion and controlled data retrieval. Derivative data generated through the DE operations, such as updated digital model files or revisions to digital model parameters, may be stored only within customer environment 310, and DE platform 300 may provide tools to access the metadata of the derivative data. Here metadata refers to data that can be viewed without opening the original data, and may comprise versioning information, time stamps, access control properties, and the like. Example implementations may include secure data ingestion, which utilizes zero-trust principles to ensure customer data is securely uploaded to customer environment 310 through a pre-validated secure tunnel, such as Secure Socket Layer (SSL) tunnel. This can enable direct and secure file transfer to a designated cloud storage, such as a simple storage service (S3) bucket, within customer environment 310. Example implementations may also include controlled data retrieval, in which temporary, pre-authenticated URLs generated via secure token-based mechanisms are used for controlled data access, thereby minimizing the risk of unauthorized interactions. Example implementations may also include immutable derivative data, with transformed data generated through operations like data extraction being securely stored within customer environment 310 while adhering to zero-trust security protocols. Example implementations may also include tokenization utility, in which a specialized DE platform tool referred to as a "tokenizer" is deployed within customer environment 310 for secure management of derivative metadata, conforming to zero-trust guidelines.

Customer environment 310 may interact with other elements of secure DE platform 300 and includes multiple features that handle data storage and secure interactions with platform 300. For example, one element of the customer environment 310 is "Authoritative Source of Truth" 312, which is a principal repository for customer data, ensuring data integrity and accuracy. Nested within this are "Customer Buckets" where data is securely stored with strict access controls, limiting data access to authorized users or processes through pre-authenticated URL links. This setup ensures uncompromising data security within customer environment 310 while providing smooth interactions with other elements of DE platform 300.

Customer environment 310 may also include additional software tools such as customer tools 314 that can be utilized based on specific customer requirements. For example, a "DE Tool Host" component may handle necessary DE applications for working with customer data. It may include a DE Tools Command-Line Interface (DET CLI), enabling user-friendly command-line operation of DE tools (e.g., DE tools 102). A "DE platform Agent" ensures smooth communication and management between customer environment 310 and elements of DE platform 300. Furthermore, there can be another set of optional DE tools designed to assist customer-specific DE workflows. Native DE tools are typically access-restricted by proprietary licenses and end-user license agreements paid for by the customer. IDEP platform functions call upon native DE tools that are executed within customer environment 310, therefore closely adhering to the zero-trust principle of the system design. Exemplary DE tools include, but are not limited to, proprietary and open-source versions of model-based systems engineering (MBSE) tools, augmented reality (AR) tools, computer aided design (CAD) tools, data analytics tools, modeling and simulation (M&S) tools, product lifecycle management (PLM) tools, multi-attribute trade-space tools, simulation engines, requirements model tools, electronics model tools, test-plan model tools, cost-model tools, schedule model tools, supply-chain model tools, manufacturing model tools, cyber security model tools, or mission effects model tools.

In some cases, an optional "IDEP Exclave" 316 may be employed within customer environment 310 to assist with customer DE tasks and operations, supervise data processing, and rigorously adhering to zero-trust principles while delivering hyperscale-like platform performance. IDEP exclave 316 is maintained by the IDEP to run DE tools for customers who need such services. IDEP exclave 316 may contain a "DE Tool Host" that runs DE tools and a "DE Platform Agent" necessary for the operation. Again, native DE tools are typically access-restricted by proprietary licenses and end-user license agreements paid for by the customer. IDEP exclave 316 utilities and manages proprietary DE tools hosted with customer environment 310, for example, to implement model splicing and digital threading functionalities.

In some embodiments, the machine learning (ML) models and artificial intelligence (AI) assistance approaches as described herein adapt to suit different customer instances of the IDEP (see FIG. 4) and the availability of training data. In an example, a pre-trained ML or AI model (e.g., within the IDEP enclave 302) is deployed in instances where there are restrictions around sharing customer data. In another example, AI models are deployed in a federated manner adjacent to DE agents and DE tools in the customer environment (e.g., within IDEP exclave 316). In another example, an AI model deployed inside the customer environment is trained behind its firewalls. In yet another example, the customer may allow sharing of subsets of their metadata for a training database located within the IDEP enclave.

IDEP Deployment Scenarios

FIG. 4 shows potential scenarios for instantiating an IDEP in connection to a customer's physical system and IT environment, in accordance with some embodiments of the present invention. Specifically, FIG. 4 illustrates various potential configurations for instancing or instantiating an IDEP ("DE platform) 402 in connection to a customer's IT environment and physical system 404. The IT environment may be located on a virtual private cloud (VPC) protected by a firewall. The physical system may refer to a physical twin as discussed with reference to FIG. 1. In some embodiments, IDEP 402 may be instanced as an enclave such as 302 shown in FIG. 3. For example, IDEP 402 may be instanced on the cloud, possibly in a software-as-a-service (SaaS) configuration. The platform instances in these embodiments include software and algorithms, and may be described as follows:

1. External Platform Instance 410: This option showcases the IDEP as a separate platform instance. The platform interacts with the physical system through the customer's virtual environment, or a Customer Virtual Private Cloud ("Customer VPC"), which is connected to the physical system.
2. External Platform Instance with Internal Agent 420; The IDEP is instantiated as a separate platform, connected to an internal agent ("DE Agent") wholly instanced within the Customer VPC. For example, the IDEP may be instantiated as enclave 302, and the DE agent may be instantiated as exclave 316 within the Customer VPC linked to the physical system.
3. External Platform Instance with Internal Agent and Edge Computing 430: This scenario displays the IDEP as a separate instantiation, connected to an internal DE Agent wholly instanced within the Customer VPC, which is further linked to an edge instance ("DE Edge Instance") on the physical system. The DE agent is nested within the customer environment, with a smaller edge computing instance attached to the physical system.
4. Edge Instance Connection 440: This option shows the DE platform linked directly to a DE edge instance on the physical system. The DE platform and the physical system are depicted separately, connected by an edge computing instance in the middle, indicating the flow of data.
5. Direct API Connection 450: This deployment scenario shows the DE platform connecting directly to the physical system via API calls. In this depiction, an arrow extends directly from the platform sphere to the physical system sphere, signifying a direct interaction through API.
6. Air-Gapped Platform Instance 460: This scenario illustrates the IDEP being completely instanced on an air-gapped, or isolated, physical system as a DE agent. The platform operates independently from any networks or Internet connections, providing an additional layer of security by eliminating external access points and potential threats. Interaction with the platform in this context would occur directly on the physical system, with any data exchange outside the physical system being controlled following strict security protocols to maintain the air-gapped environment.

Across these deployment scenarios, the IDEP plays an important role in bridging the gap between a digital twin established through the IDEP and its physical counterpart. Regardless of how the IDEP is instantiated, it interacts with the physical system, directly or through the customer's virtual environment. The use of edge computing instances in some scenarios demonstrates the need for localized data processing and the trade-offs between real-time analytics and more precise insights in digital-physical system management. Furthermore, the ability of the platform to connect directly to the physical system through API calls underscores the importance of interoperability in facilitating efficient data exchange between the digital and physical worlds. In all cases, the DE platform operates with robust security measures.

In some embodiments, the IDEP deployment for the same physical system can comprise a combination of the deployment scenarios described above. For example, for the same customer, some physical systems may have direct API connections to the DE platform (scenario 5), while other physical systems may have an edge instance connection (scenario 4).

Multimodal User Interfaces

FIG. 5 illustrates the use of multimodal user interfaces 590 for the interconnected DE platform, which can handle various input and output modalities such as Virtual Reality (VR), Mixed Reality (MR), auditory, text, and code. These interfaces are designed to manage the complexity of data streams and decision-making processes, and provide decision support including option visualization, impact prediction, and specific decision invocation. Specifically, data streams 502 and 504 are processed in the Analysis & Control Plane (ACP) 150 of FIG. 1. The user interface may receive data streams from physical and virtual feedback loops 102 and 104, as well as external expert feedback 114, analysis module 154, and twin configuration set 156 of ACP 150.

The multimodal interfaces illustrated in FIG. 5 are configured to carry out all the DE tasks and actions described in the context of FIG. 1, by catering to both humans and bots/algorithms, handling the intricacies of data stream frequency and complexity, decision-making time scales, and latency impacts. In the case of human decision makers, the user interface may need to manage inputs and outputs while for algorithmic decision making, the user interface may need to present rationale and decision analysis to human users. Some examples of human interfaces include a dashboard-style interface 594, a workflow-based interface 596, conversational interfaces 598, spatial computer interfaces 592, and code interfaces 599.

Dashboard-style interface 594 offers a customizable overview of data visualizations, performance metrics, and system status indicators. It enables monitoring of relevant information, sectional review of documents, and decision-making based on dynamic data updates and external feedback. Such an interface may be accessible via web browsers and standalone applications on various devices.

Workflow-based interface 596 guides users through the decision-making process, presenting relevant data, options, and contextual information at each stage. It integrates external feedback and is designed as a progressive web app or a mobile app. In the context of alternative tool selection, workflow-based interface 596 may provide options on individual tools at each stage, or provide combinations of tool selections through various stages to achieve better accuracy or efficiency for the overall workflow.

Conversational interfaces 598 are based on the conversion of various input formats such as text, prompt, voice, audio-visual, etc. into input text, then integrating the resulting input text within the DE platform workflow. Outputs from the DE platform may undergo the reverse process. This enables interoperability with the DE platform, and specifically the manipulation of model splices. In the broad context of audio-visual inputs, the conversational interfaces may comprise data sonification, which involves using sound to represent data, information, or events, and using auditory cues or patterns to communicate important information to users, operators, or reviewers. Sonified alerts (e.g., alerts sent via sound, e.g., via a speaker) are especially useful when individuals need to process information quickly without having to visually focus on a screen. For example, sonified alerts can be used to notify security analysts of potential threats or breaches.

According to the latest prior art, a "conversational interface" or "conversational user interface" refers to a human-computer interaction model that enables users to interact with digital systems through natural language, either via text or voice. These interfaces utilize advanced natural language processing (NLP), machine learning, and artificial intelligence technologies to understand and respond to user inputs in a manner that mimics human conversation. Conversational interfaces can take various forms, including chatbots, voice assistants, and messaging platforms, allowing users to communicate with systems using everyday language rather than traditional graphical user interface elements. The goal of these interfaces is to provide a more intuitive, accessible, and personalized user experience by leveraging the familiar paradigm of conversation, enabling users to accomplish tasks, retrieve information, or control devices through natural dialogue without requiring specialized knowledge of complex commands or navigation structures.

FIG. 5 also illustrates the use of spatial computing interfaces 592 and code interfaces 599 in the management of digital twins and physical twins. Spatial computing interfaces allow for more immersive and intuitive user experiences, and enable real-time synchronization between digital twins and physical twins. Code interfaces allow bots and digital engineers to interact with the DE platform through scripting and code. It also allows the collection of user preference, task history, and tool usage patterns for alternative tool selection purposes.

A "spatial interface" or "spatial user interface" refers to a user interaction paradigm that leverages three-dimensional space and spatial relationships to present and manipulate digital information. This approach goes beyond traditional 2D graphical user interfaces by incorporating depth, volume, and spatial positioning to create more intuitive and immersive user experiences. Spatial interfaces often utilize technologies such as augmented reality (AR), virtual reality (VR), or mixed reality (MR) to overlay digital content onto the physical world or create entirely virtual environments. These interfaces allow users to interact with digital objects and information as if they were physical entities in space, using natural gestures, body movements, direction of audio or eye gaze, and spatial awareness to navigate, manipulate, and organize content in ways that more closely mimic real-world interactions.

Note that in the context of multimodal interfaces, "2.5 dimension" (often referred to as 2.5D) describes a visual representation that falls between traditional 2D and full 3D interfaces. It typically involves adding depth and perspective to 2D elements to create a pseudo-3D effect, without fully rendering a complete 3D environment. The 2.5D approach is typically designed to create the illusion of depth and dimensionality on flat, two-dimensional displays such as computer monitors, smartphone screens, or tablets, although it may be used within a 3D setting (e.g., 2D screens overlaid into 3D). This approach often uses techniques such as layering, parallax scrolling, or isometric projections to give the illusion of depth and volume while maintaining the simplicity and familiarity of 2D interfaces.

Digital Threads and Autonomous Data Linkages

As discussed previously, a "digital thread" is intended to connect two or more digital engineering (DE) models for traceability across the systems engineering lifecycle, and collaboration and sharing among individuals performing DE tasks. In a digital thread, appropriate outputs from a preceding digital model may be provided as the inputs to a subsequent digital model, allowing for information and process flow. That is, a digital thread may be viewed as a communication framework or data-driven architecture that connects traditionally siloed elements to enable the flow of information and actions between digital models.

FIG. 6 describes the architecture and inherent complexity of digital threads, in accordance with the examples disclosed herein. Specifically, FIG. 6 is a schematic diagram comparing exemplary digital threads 600 of various complexities that manipulate and/or connect DE models, in accordance with some embodiments of the present invention. In the most basic sense, a digital thread may "thread" together DE models into a simple daisy-chain architecture 602 where modifications in any upstream DE model will affect all DE models downstream from the modified DE model. For example, a modification of any parameter or process of a DE model B will cause changes in DE model C, which in turn will cause changes in DE model D. Cause-and-effect changes will therefore cascade downstream. As another example, diagram 604 represents a more complex digital thread where a change in one DE model may affect more than one downstream model. In both 602 and 604, digital threads are represented by a directed acyclic graph (DAG).

DAGs are frequently used in many kinds of data processing and structuring tasks, such as scheduling tasks, data compression algorithms, and more. In the context of service platforms and network complexities, a DAG might be used to represent the relationships between different components or services within the platform. In digital thread 604, different models may depend on each other in different ways. Model A may affect models B, C, and D, with models B and C affecting model E, and models D and E affecting model G. Such dependencies are denoted as a DAG, where each node is associated with a component (e.g., a model), and each directed edge represents a dependency.

A major issue with dealing with interdependent DE models is that graph consistencies can be polynomial, and potentially exponential, in complexity. Hence, if a node fails (e.g., a model is unreliable), this can have a cascading effect on the rest of the digital thread, disrupting the entire design. Furthermore, adding nodes or dependencies to the graph does not yield a linear increase in complexity because of the interdependencies between models. If a new model is added that affects or depends on several existing models, the resulting increase in graph complexity is multiplicative in nature, hence potentially exponential. The multiplicative nature of digital thread consistencies is compounded by the sheer number of interconnected models, which may number in the hundreds or thousands. Diagram 606 is a partial representation of a real-world digital thread, illustrating the complexity of digital threads and its multiplicative growth.

FIG. 6 further shows special cases 603, 605, 607, 608, and 609 of exemplary simple digital threads. Diagram 607 represents a degenerate digital thread where data is shared from a single DE model. Diagram 608 represents a model-to-document digital thread where data (e.g., system attributes, performance attributes) extracted from a single DE model may be used to generate or update a text-based document (e.g., a Capability Development Document (CDD)). Diagrams 603 and 605 are generalized from 608 to represent cases where data extracted from a single model may be used to update multiple models, or vice versa. Specifically, diagram 605 may represent the dynamic updates of live or magic documents discussed in the context of FIG. 1. Here, the logic to connect the DE models shown is clear: data are extracted from multiple DE models A, B, and C to update a document model D. There are no interactions between the extracted data. Furthermore, diagram 609 shows a special case of a digital thread where data is loaded to and extracted from only a single model A. For example, as discussed in the context of FIG. 7 next, input splice functions of the model A shown in 609 may be executed to update the model, and output splice functions of model A shown in 609 may be executed to produce digital artifacts for sharing. For these special simple threads, the IDEP may provide a GUI-based interface to the user to connect the models and execute the digital threads. For complex threads such as 606, a code-based interface may be necessary.

Model Splicing for Digital Threading and Digital Twin Generation

As disclosed herein, model splicing encapsulates and compartmentalizes digital engineering (DE) model data and model data manipulation and access functionalities. As such, model splices provide access to selective model data within a DE model file without exposing the entire DE model file, with access control to the encapsulated model data based on user access permissions. Model splicing also provides the DE model with a common, externally-accessible Application Programming Interface (API) for the programmatic execution of DE models. Model splices thus generated may be shared, executed, revised, or further spliced independently of the native DE tool and development platform used to generate the input digital model. The standardization of DE model data and the generalization of API interfaces and functions allow the access of DE model type files outside of their native software environments, and enable the linking of different DE model type files that may not previously be interoperable. Model splicing further enables the scripting and codification of DE operations encompassing disparate DE tools into a corpus of normative program code, facilitating the generation and training of artificial intelligence (AI) and machine learning (ML) models for the purpose of manipulating DE models through various DE tools across different stages of a DE process, DE workflow, or a DE life cycle.

Digital threads are created through user-directed and/or autonomous linking of model splices. A digital thread is intended to connect two or more DE models for traceability across the systems engineering life cycle, and collaboration and sharing among individuals performing DE tasks. In a digital thread, appropriate outputs from a preceding digital model are provided as inputs to a subsequent digital model, allowing for information flow. That is, a digital thread may be viewed as a communication framework or data-driven architecture that connects traditionally siloed elements to enable the flow of information between digital models. The extensibility of model splicing over many different types of DE models and DE tools enables the scaling and generalization of digital threads to represent each and every stage of the DE life cycle.

A digital twin is a real-time virtual replica of a physical object or system, with bi-directional information flow between the virtual and physical domains, allowing for monitoring, analysis, and optimization. Model splicing allows for making individual DE model files into executable splices that can be autonomously and securely linked, thus enabling the management of a large number of DE models as a unified digital thread. Such a capability extends to link previously non-interoperable DE models to create digital threads, receive external performance and sensor data streams (e.g., data that is aggregated from DE models or linked from physical sensor data), calibrate digital twins with data streams from physical sensors outside of native digital twin environments, and receive expert feedback that provides opportunity to refine simulations and model parameters.

Unlike a digital twin, a virtual replica, or simulation, is a mathematical model that imitates real-world behavior to predict outcomes and test strategies. Digital twins use real-time data and have bidirectional communication, while simulations focus on analyzing scenarios and predicting results. In other words, a digital twin reflects the state of a physical system in time and space. A simulation is a set of operations done on digital models that reflects the potential future states or outcomes that the digital models can progress to in the future. A simulation model is a DE model within the context of the IDEP as disclosed herein.

When testing different designs, such as variations in wing length or chord dimensions, multiple digital twins (sometimes numbering in 100s to 1,000s) may be created, as a bridge between design specifications and real-world implementations of a system, allowing for seamless updates and tracking of variations through vast numbers of variables, as detailed in the context of FIG. 1. As an example, if three variations of a system are made, each one would have its own digital twin with specific measurements. These digital twins may be accessed and updated via API function scripts, which allow for easy input of new measurements from the physical parts during the manufacturing process. By autonomous linking with appropriate data, a digital twin may be updated to reflect the actual measurements of the parts, maintaining traceability and ensuring accurate data representation through hundreds or thousands of models.

Exemplary Model Splicing Setup

FIG. 7 is a schematic showing an exemplary model splicing setup, according to some embodiments of the present invention. Specifically, FIG. 7 is a schematic showing an embedded CAD model splicing example.

In the present disclosure, a "model splice", "model wrapper", or "model graft" of a given DE model file comprises locators to or copies of (1) DE model data or digital artifacts extracted or derived from the DE model file, including model metadata, and (2) splice functions (e.g., API function scripts) that can be applied to the DE model data. A model splice may take on the form of a digital file or a group of digital files. A locator refers to links, addresses, pointers, indexes, access keys, Uniform Resource Locators (URL) or similar references to the aforementioned DE digital artifacts and splice functions, which themselves may be stored in access-controlled databases, cloud-based storage buckets, or other types of secure storage environments. The splice functions provide unified and standardized input and output API or SDK endpoints for accessing and manipulating the DE model data. The DE model data are model-type-specific, and a model splice is associated with model-type-specific input and output schemas. One or more different model splices may be generated from the same input DE model file, based on the particular user application under consideration, and depending on data access restrictions. In some contexts, the shorter terms "splice", "wrapper", and/or "graft" are used to refer to spliced, wrapped, and/or grafted models.

Model splicing is the process of generating a model splice from a DE model file. Correspondingly, model splicers are program codes or uncompiled scripts that perform model splicing of DE models. A DE model splicer for a given DE model type, when applied to a specific DE model file of the DE model type, retrieves, extracts, and/or derives DE model data associated with the DE model file, generates and/or encapsulates splice functions, and instantiates API or SDK endpoints to the DE model according to input/output schemas. In some embodiments, a model splicer comprises a collection of API function scripts that can be used as templates to generate DE model splices. "Model splicer generation" refers to the process of setting up a model splicer, including establishing an all-encompassing framework or template, from which individual model splices may be deduced.

Thus, a DE model type-specific model splicer extracts or derives model data from a DE model file and/or stores such model data in a model type-specific data structure. A DE model splicer further generates or enumerates splice functions that may call upon native DE tools and API functions for application on DE model data. A DE model splice for a given user application contains or wraps DE model data and splice functions that are specific to the user application, allowing only access to and enabling modifications of limited portions of the original DE model file for collaboration and sharing with stakeholders of the given user application.

Additionally, a document splicer is a particular type of DE model splicer, specific to document models. A "document" is an electronic file that provides information as an official record. Documents include human-readable files that can be read without specialized software, as well as machine-readable documents that can be viewed and manipulated by a human with the help of specialized software such as word processor and/or web services. Thus, a document may contain natural language-based text and/or graphics that are directly readable by a human without the need of additional machine compilation, rendering, visualization, or interpretation. A "document splice", "document model splice" or "document wrapper" for a given user application can be generated by wrapping document data and splice functions (e.g., API function scripts) that are specific to the user application, thus revealing text at the component or part (e.g., title, table of contents, chapter, section, paragraph) level via API or SDK endpoints, and allowing access to and enabling modifications of portions of an original document or document template for collaboration and sharing with stakeholders of the given user application, while minimizing manual referencing and human errors.

In the CAD model splicing example shown in FIG. 7, a CAD model file diesel-engine.prt 704 proceeds through a model splicing process 710 that comprises a data extraction step 720 and a splice function generation step 730. This input DE model 704 is in a file format (.prt) native to certain DE tools. Data extraction may be performed via a DE model crawling agent implemented as model crawling scripts within a model splicer to crawl through the input DE model file and to distill model data with metadata 722. Metadata are data that can be viewed without opening the entire input DE model file, and may include entries such as file name, file size, file version, last modified date and time, and potential user input options as identified from a user input 706. Model data are extracted and/or derived from the input DE model, and may include but are not limited to, parts (e.g., propeller, engine cylinder, engine cap, engine radiator, etc.), solids, surfaces, polygon representation, and materials, etc. When a model splicer crawls through the model file, it determines how model data may be organized and accessed, as fundamentally defined by a DE tool 702 that is being used in splicing the DE model, and establishes a model data schema. This data schema describes the structure and format of the model data, some of which are translated into, or used to create input/output API endpoints with corresponding input/output schemas. In some embodiments, model data with metadata 722 may be stored in an access-restricted storage 726, such as the "customer buckets" 312 within customer environment 310 in FIG. 3, so that model splices such as 742, 744, and 746 may be generated on-demand once an input DE model 704 has been crawled through.

The model splicer further generates splice functions (e.g., API function scripts) 732 from native APIs 702 associated with the input CAD model. In the present disclosure, "native" and "primal" refer to existing DE model files, functions, and API libraries associated with specific third-party DE tools, including both proprietary and open-source ones. Native API 702 may be provided by a proprietary or open-source DE tool. For example, the model splicer may generate API function scripts that call upon native APIs of native DE tools to perform functions such as: HideParts (parts_list), Generate2DViewo, etc. These model-type-specific splice functions may be stored in a splice function database 736, again for on-demand generation of individual model splices. A catalog or specification of splice functions provided by different model splices supported by the IDEP, and orchestration scripts that link multiple model splices, constitutes a Platform API. This platform API is a common, universal, and externally-accessible platform interface that masks native API 702 of any native DE tool integrated into the IDEP, thus enabling engineers from different disciplines to interact with unfamiliar DE tools, and previously non-interoperable DE tools to interoperate freely.

Next, based on user input or desired user application 706, one or more model splices or wrappers 742, 744, and 746 may be generated, wrapping a subset or all of the model data needed for the user application with splice functions or API function scripts that can be applied to the original input model and/or wrapped model data to perform desired operations and complete user-requested tasks. In various embodiments, a model splice may take on the form of a digital file or a group of digital files, and a model splice may comprise locators to or copies of the aforementioned DE digital artifacts and splice functions, in any combination or permutation. Any number of model splices/wrappers may be generated by combining a selective portion of the model data such as 722 and the API function scripts such as 732. As the API function scripts provide unified and standardized input and output API endpoints for accessing and manipulating the DE model and DE model data, such API handles or endpoints may be used to execute the model splice and establish links with other model splices without directly calling upon native APIs. Such API endpoints may be formatted according to an input/output scheme tailored to the DE model file and/or DE tool being used, and may be accessed by orchestration scripts or platform applications that act on multiple DE models.

In some embodiments, when executed, an API function script inputs into or outputs from a DE model or DE model splice. "Input" splice functions or "input nodes" such as 733 are model modification scripts that allow updates or modifications to an input DE model. For example, a model update may comprise changes made via an input splice function to model parameters or configurations. "Output" splice functions or "output nodes" 734 are data/artifact extraction scripts that allow data extraction or derivation from a DE model via its model splice. An API function script may invoke native API function calls of native DE tools. An artifact is an execution result from an output API function script within a model splice. Multiple artifacts may be generated from a single DE model or DE model splice. Artifacts may be stored in access-restricted cloud storage 726, or other similar access-restricted customer buckets.

One advantage of model splicing is its inherent minimal privileged access control capabilities for zero-trust implementations of the IDEP as disclosed herein. In various deployment scenarios discussed with reference to FIG. 4, and within the context of IDEP implementation architecture discussed with reference to FIG. 3, original DE input model 704 and model data storage 726 may be located within customer buckets 312 in customer environment 310 of FIG. 3. Splice functions 732 stored in database 736 call upon native APIs 702. The execution or invocation of splice functions 732 may rely on job-specific authentication or authorization via proprietary licenses of DE tools (e.g., residing within customer environment 310 of FIG. 3 and/or information security clearance levels of the requesting user. Thus, model splicing unbundles monolithic access to digital model-type files as whole files and instead provides specific access to a subset of functions that allow limited, purposeful, and auditable interactions with subsets of the model-type files built from component parts or atomic units that assemble to parts.

Digital Threading of DE Models via Model Splicing

FIG. 8 is a schematic showing digital threading of DE models via model splicing, according to some embodiments of the present invention. A digital thread is intended to connect two or more DE models for traceability across the systems engineering lifecycle, and collaboration and sharing among individuals performing DE tasks.

Linking of model splices generally refers to jointly accessing two or more DE model splices via API endpoints or splice functions. For example, data may be retrieved from one splice to update another splice (e.g., an input splice function of a first model splice calls upon an output splice function of a second model splice); data may be retrieved from both splices to generate a new output (e.g., output splice functions from both model splices are called upon); data from a third splice may be used to update both a first splice and a second splice (e.g., input splice functions from both model splices are called upon). In the present disclosure, "model linking" and "model splice linking" may be used interchangeably, as linked model splices map to correspondingly linked DE models. Similarly, linking of DE tools generally refers to jointly accessing two or more DE tools via model splices, where model splice functions that encapsulate disparate DE tool functions may interoperate and call each other, or be called upon jointly by an orchestration script to perform a DE task.

Thus, model splicing allows for making individual digital model files into model splices that can be autonomously and securely linked, enabling the management of a large number of digital models as a unified digital thread written in scripts. Within the IDEP as disclosed herein, a digital thread is a platform script that calls upon the platform API to facilitate, manage, or orchestrate a workflow through linked model splices. Model splice linking provides a communication framework or data-driven architecture that connects traditionally siloed elements to enable the flow of information between digital models via corresponding model splices. The extensibility of model splicing over many different types of digital models enables the scaling and generalization of digital threads to represent each and every stage of the DE lifecycle and to instantiate and update digital twins as needed.

In the particular example shown in FIG. 8, an orchestration script 894 is written in Python code and designed to interact via API endpoints such as 892 to determine if a CAD model meets a total mass requirement. API endpoint 892 is an output splice function and part of a platform API 890. Platform API 890 comprises not only splice functions but also platform scripts or orchestration scripts such as 894 itself.

Orchestration script 894 is divided into three main steps:

1. Get Data From a CAD Model Splice: A POST request may be sent via the IDEP platform API to execute a computer-aided design (CAD) model splice 871. This model splice provides a uniform interface to modify and retrieve information about a CAD model 881. The parameters for the CAD model, such as hole diameter, notch opening, flange thickness, etc., may be sent in the request and set via an input splice function. The total mass of the CAD model may be derived from model parameters and retrieved via an output splice function. The response from the platform API includes the total mass of CAD model 881, and a Uniform Resource Identifier/Locator (URL) for the CAD model. The response may further comprise a URL for an image of the CAD model.

2. Get Data From a SysML Model Splice: Another POST request may be sent via the IDEP platform API to execute a Systems Modeling Language (SysML) model splice 872. SysML is a general-purpose modeling language used for systems engineering. Output function 892 of model splice 872 retrieves the total mass requirements for the system from a SysML model 882. The response from the platform API includes the total mass requirement for the system.
3. Align the Variables and Check If Requirement Met: The total mass from CAD model 881 is compared with the total mass requirement from SysML model 882. If the two values are equal, a message is printed indicating that the CAD model aligns with the requirement. Otherwise, a message is printed indicating that the CAD model does not align with the requirement.

In short, orchestration script 894, which may be implemented in application plane 160 of IDEP 100 shown in FIG. 1, links digital models 881 and 882 via model splice API calls. Orchestration script 894 is a scripted platform application that modifies a CAD model, retrieves the total mass of the modified CAD model, retrieves the total mass requirement from a SysML model, and compares the two values to check if the CAD model meets the requirement. In some embodiments, a platform application within IDEP 100 utilizes sets of functions to act upon more than one DE model.

Model Splice Plane

FIG. 9 is a schematic illustrating the linking of DE model splices in a splice plane and comparing digital threading with and without model splicing, according to some embodiments of the present invention. The bottom model plane 180 demonstrates current digital threading practices, where each small oval represents a DE model, and the linking between any two DE models, such as models 982 and 984, requires respective connections to a central platform 910, and potential additional linkages from every model to every other model. The central platform 910 comprises program code that is able to interpret and manipulate original DE models of distinct model types. For example, platform 910 under the control of a subject matter expert may prepare data from digital model 982 into formats that can be accessed by digital model 984 via digital model 984's native APIs, thus allowing modifications of digital model 982 to be propagated to digital model 984. Any feedback from digital model 984 to digital model 982 would require similar processing via platform 910 so that data from digital model 984 are converted into formats that can be accessed by digital model 982 via digital model 982's native APIs. This hub-and-spoke architecture 934 is not scalable to the sheer number (e.g., hundreds or thousands) of digital models involved within typical large-scale DE projects, as model updates and feedback are only possible through central platform 910.

In contrast, once the DE models are spliced, each original model is represented by a model splice including relevant model data, unified and standardized API endpoints for input/output, as shown in the upper splice plane 170. Splices within splice plane 170 may be connected through scripts (e.g., python scripts) that call upon API endpoints or API function scripts and may follow a DAG architecture, as described with reference to FIG. 1 and FIG. 6. Note that in FIG. 1, only a set of generated splices is shown within splice plane 170, while in FIG. 9, scripts that link model splices are also shown for illustrative purposes within the splice plane. Such scripts are referred to as orchestration scripts or platform scripts in this disclosure, as they orchestrate workflow through a digital thread built upon interconnected DE model splices. Further note that while splice plane 170 is shown in FIG. 1 as part of IDEP 100 for illustrative purposes, in some embodiments, splice plane 170 may be implemented behind a customer firewall and be part of an agent of the DE platform, as discussed in various deployment scenarios shown in FIG. 4. That is, individual API function scripts generated via model splicing by a DE platform agent may be tailored to call upon proprietary tools the customer has access to in its private environment. No centralized platform 910 with proprietary access to all native tools associated with all individual digital models shown in FIG. 9 is needed. Instead, orchestration scripts call upon universal API function scripts that may be implemented differently in different customer environments.

Hence, model splicing allows model splices such as model splice 972 from digital model 982 and model splice 974 from digital model 984 to access each other's data purposefully and directly, thus enabling the creation of a model-based "digital mesh" 944 via platform scripts and allowing autonomous linking without input from subject matter experts.

An added advantage of moving from the model plane 180 to the splice plane 170 is that the DE platform enables the creation of multiple splices per native model (e.g., see FIG. 7), each with different subsets of model data and API endpoints tailored to the splice's targeted use. For example, model splices may be used to generate multiple digital twins (digital twins) that map a physical product or process or object design into the virtual space. Two-way data exchanges between a physical object and its digital object twin enable the testing, optimization, verification, and validation of the physical object in the virtual world, by choosing optimal digital model configuration and/or architecture combinations from parallel digital twins built upon model splices, each reacting potentially differently to the same feedback from the physical object.

Supported by model splicing, digital threading, and digital twining capabilities, the IDEP as disclosed herein connects DE models and DE tools to enable simple and secure collaboration on digital engineering data across engineering disciplines, tool vendors, networks, and model sources such as government agencies and institutions, special program offices, contractors, small businesses, Federally Funded Research and Development Centers (FFRDC), University Affiliated Research Centers (UARC), and the like. An application example 950 for the IDEP is shown on the right side of FIG. 9, illustrating how data from many different organizations may be integrated to enable cross-domain collaboration while maintaining data security, traceability, and auditability. Here DE models from multiple vendors or component constructors are spliced or wrapped by IDEP agents, and data artifacts are extracted with data protection. Turning DE models into data artifacts enables cross-domain data transfer and allows for the protection of critical information, so that model owners retain complete control over their DE models using their existing security and IT stack, continue to use DE tools that best fit their purposes, and also preserve the same modeling schema/ontology/profile that best fit their purposes. The IDEP turns DE models into micro-services to provide minimally privileged data bits that traverse to relevant stakeholders without the DE models ever leaving their home servers or being duplicated or surrogate. The IDEP also provides simple data access and digital threading options via secure web applications or secure APIs.

DAG Representation of Threaded Tasks

Model splicing provides a unified interface among DE models, allowing model and system updates to be represented by interconnected and pipelined DE tasks. FIG. 10 shows an exemplary directed acyclic graph (DAG) representation 1000 of pipelined DE tasks related to digital threads, in accordance with some embodiments of the present invention. In diagram 1000, tasks performed through a digital thread orchestration script (e.g., 894) are structured as nodes within a DAG. Actions are therefore interconnected and carried out in a pipeline linking the DE model splices with a range of corresponding parameter values. Therefore, a digital thread can be created by establishing, via interpretable DE platform scripts, the right connections between any model splices for their corresponding models at the relevant endpoints.

Referring to FIGS. 1 and 8, DAGs of threaded tasks are built from digital threads and are part of the DE platform's application plane 160. Different DAGs may target different DE actions. For example, in FIG. 1, building or updating a digital twin 122 in the virtual environment 120 has its own DAG 124. Model splicing turns DE models into data structures that can be accessed via API, thus enabling the use of software development tools, from simple python scripts to complex DAGs, in order to execute DE actions. A digital thread of model splices eliminates the scalability issue of digital thread management, and speeds up the digital design process, including design updates based on external feedback.

Following the above description of the basic elements and core aspects of the IDMP/IDEP as disclosed herein, the systems and methods for interacting with a live digital object are described in detail next.

Multimodal Interface for Interacting with Digital Model Files

FIG. 11 is an exemplary system diagram showing a process for interacting with a live digital object in an interconnected digital model platform (IDMP), in accordance with some embodiments of the present invention. Specifically, FIG. 11 provides a schematic representation of a system enabling the interaction of a user 1102 with various multimodal interface modules and data 1120 over the IDMP through a multimodal interface 1104, in accordance with some embodiments of the present invention. In FIG. 11, the multimodal interface 1104 allows the user 1102 to access a live digital object 1150A through an IDMP application 1122, where the live digital object 1150A may include a digital artifact 1140A.

The system may include at least one hardware processor 1112 responsible for executing program code 1114 to implement the modules 1120 described below. The system may include access to at least one non-transitory physical storage medium 1110, accessible by the at least one hardware processor 1112, which may store the program code 1114 that is executable by the hardware processor 1112. The program code may be stored and distributed among two or more non-transitory physical storage media, and may be executed by two or more processors.

The system may include a multimodal interface 1104 for receiving input from the user 2002. The embodiment of FIG. 11 shows the user 1102 equipped with a virtual reality (VR) or augmented reality (AR) headset 1106. In practice, the multimodal interface may include AR/VR headsets, interactive gloves, cameras, as well as any spatial or conversational peripheral enabling the interaction of the user with data provided by the IDMP application 1122.

The system may include an API interface 1138, representing the common, externally-accessible Application Programming Interface (API) through which the digital artifact 1140A is retrieved from a model splice 1134. The model splice 1134 (or, more generally, model representation) may be generated from a model file 1130 using a model splicer 1132. The model splice 1134 may be configured to provide selective access to model data located within the model file 1130, such as the digital artifact 1140A.

The system may include an access control mechanism 1136 which may be part of the model splice 1134. The access control mechanism 1136 may provide access to the retrieved digital artifact 1140A based on the access permissions of the user 1102 (e.g., based on the user's security level), thus ensuring secure and controlled data retrieval.

The IDMP application 1122 may generate and maintain a live digital object 1150A allowing access to the retrieved digital artifact 1140B. In some embodiments, the IDMP application 1122 also performs the role of an update engine that is capable of updating the live digital object 1150A based on input from one or more users or software agents. This includes reflecting any changes made to the digital artifact 1140A into the live digital object 1150A. The IDMP application 1122 enables the methods described herein by orchestrating user interactions through the multimodal interface 1104 as well as enabling access to the digital artifact 1140A through the live digital object 1150A.

In one exemplary scenario, the IDMP application 1122 may receive the live digital object 1150A, which may include the digital artifact 1140B extracted from the model file 1130 through a model representation (e.g., the model split 1134) including model-type-specific locators to digital model data and metadata. The IDMP application 1122 may initiate a connection to a multimodal interface 1104 that is configured to receive input from (and output to) at least two different modalities, including a conversational modality and a spatial modality.

The IDMP application 1122 may receive the security level of the user 1102 and determine their permission to access (i.e., "access permission") and/or modify (i.e., "modification permission") the digital artifact, based on their security level.

The IDMP application 1122 may also determine an accessible portion 1150B of the live digital object 1150B based on the security level of the user 1102. In FIG. 11, the accessible portion of the live digital object 1150B is shown in a solid line, whereas the remainder (inaccessible) portion of the live digital object 1150C is shown in dashed lines. The IDMP application 1122 may output the digital artifact 1140C to the multimodal interface based on the user's 1102 access permission. In FIG. 11, the digital artifact 1140C is shown to be accessible and part of the accessible portion of the live digital object 1150B.

The IDMP application 1122 may also receive from the multimodal interface a conversational input and a spatial input from the user related to the digital artifact 1140C. Based on the user's modification permission to modify the digital artifact 1140C, the IDMP application 1122 may also generate a modified digital artifact from the digital artifact 1140A via the digital model representation (e.g., the model splice 1134).

FIG. 11 therefore illustrates the flow of data and interactions between the multimodal interface modules and data 1120, starting from the user 1102 input to the generation of a modified digital artifact and/or live digital object through a multimodal interface 1104.

FIG. 12 shows an example workflow illustrating how different user interfaces may enable specific user operations within a digital engineering platform, in accordance with example embodiments of the present invention. In various aspects, to be further described below, FIG. 12 shows various user interface options that can be conversational interfaces and spatial computing interfaces, each providing different capabilities for users. In some respects, module 1202 shows a conversational interface 1204, which can further include an IVR and/or a chatbot submodule. In one embodiment, a user can upload a digital engineering (DE) module and use the conversational interface 1204 to iterate on a particular use case. In another embodiment, module 1212 includes a spatial computing interface 1214 which can further include direct interactions 1216, contextual input 1218, and/or shared tactile mechanism(s) 1220. In one embodiment, a user can create a new DE model and/or manage a digital twin simulation with the physical world as a reference. As further indicated in the diagram, the user can interact with the platform on the input side, and/or the user can interact with the platform on the output side.

Digital Engineering Through AI-Assisted Script Generation

In various embodiments, an approach is proposed for AI-enabled program code generation for DE tools, where the scripts in the IDEP are translated into embeddings, then used to train one or more transformers to generate a script that carries out a DE task. Customer data sovereignty considerations are discussed in detail in PCT application No. PCT/US24/38878.

Many of the scripts used on the IDEP fall into one of the two following categories:

1. API scripts manipulate model splices at the splicing plane (see FIG. 1). They use the APIs of a specific digital engineering tool (e.g., CAD, CFD, FEA, etc.).
2. Orchestration scripts that manipulate digital threads and digital twins at the application plane or the control/analysis plane (see FIG. 1). They are capable of calling API scripts via microservices (see PCT applications No. PCT/US24/18278 and No. PCT/US24/27898 or DAG tasks (see FIG. 10) to coordinate multiple different DE tools.

FIG. 13 shows a generalized AI-assisted design process over a digital engineering platform, in accordance with one embodiment of the present invention. In the embodiment of FIG. 13, the three major building blocks used for AI-assisted digital design are:

3. Context AI model (1304):

The IDEP receives access to a context AI model (1304) and runs it to satisfy an input prompt (1302). The input prompt 1302 is usually a prompt from a user of the IDMP (e.g., a human user or a software agent). The context AI model may be based on one or more large transformers or LLMs (e.g., the context AI model (1304) may be a closed-source LLM such as GPT4). Its task is to identify the steps and associated subsystems (1306) related to a DE task. It may receive a user's input DE prompt (1302) and may generate a selection of choices of one or more trained syntax AI models, along with a corresponding listing of steps and subsystems that need to be carried out by the selected syntax AI model(s) to satisfy the DE prompt (1306). In one embodiment, the context AI may identify steps and subsystems to carry out a workflow task associated with and satisfying the prompt, whereas the user may select the corresponding syntax AI model.

In various embodiments, a DE prompt (1302) is a request by the user to carry out a DE task involving access to a model splice. Examples of DE prompts include the following:

a. High-level user prompt: "Make a gear with 20 teeth, 50 mm pitch diameter and 3-year service life operating within a max torque of 20 Nm"
   b. Lower-level user prompt: "Use an open source tool to conduct static and dynamic analyses for a 3D CAD model of a spur gear consistent with the dimensions provided. Evaluate gear operations for 3 materials (e.g., sintered iron, injection molded nylon, and 3D printed ABS)."

4. Syntax AI model (1308):

The trained syntax AI model may be selected by the context AI model or by a user based on suggestions from the context AI model. It receives the listing of steps and subsystems that need to be carried out to satisfy the DE prompt (1306), and generates one or more scripts to implement DE steps that satisfy the DE prompt (1310), where these scripts include variables for parameters to be substituted. A syntax AI model may be based on open-source transformers or LLMs, and may be trained to generate API scripts or orchestration scripts. Hence, in one embodiment, the trained syntax AI model generates template scripts including API and/or splicing scripts, where a template script includes a variable (i.e., a placeholder for a parameter related to the digital task). The generation of variable parameter scripts (i.e., template scripts) enables the anonymization of enterprise-confidential parameters through the use of variable "parameter placeholders", a process that may be referred to as "placeholder anonymization". This process enables customer data sovereignty, as discussed below. A script database (1326) may be provided by the IDEP for training, fine-tuning, or providing runtime contextual information to the syntax AI model, as discussed below. The Syntax AI model may also be trained (1330) on platform API documentation and multimodal interface API documentation such as spatial and conversational API documentation pertaining to peripherals (e.g., MICROSOFT HoloLens, APPLE VISIONPRO, etc.).

5. Parameter Substitution Process (1312):

The parameter substitution process receives the script(s) generated by the syntax AI model (1310), and replaces the variables identified by the syntax AI model with enterprise-confidential parameters (1314). In some embodiments, the received scripts are template scripts and include placeholder variables. The parameter substitution process (1312) generates parameter-substituted scripts (e.g., orchestration scripts) to implement design steps associated with the DE prompt (1302), with script placeholder variables substituted with parameters (1314). The enterprise-confidential parameters usually originate from enterprise documentation (1328) and may be:

a. inserted by the user, or selected by the user from a list extracted from enterprise documentation,
   b. selected by the user from a list generated by an enterprise AI module from enterprise documentation, c. inserted by an algorithm from a parameter table, or
d. inserted by an enterprise AI module.

In some embodiments, the parameter substitution process maps variables with corresponding software tool documents within the customer environment, where software tool documents may include operation manuals, programming or scripting functions and function listings/manuals, APIs, specification files, requirement files, certification files, enterprise documentation, or any combination of the above. In some embodiments, the parameter substitution process maintains and regularly updates a variable mapping table, denoting a table of variables and corresponding (i.e., mapped) software tool documents within the customer environment. In one embodiment, in order to determine the value of a placeholder variable, the parameter substitution process may look it up in the mapped software tool document. In another embodiment where the parameter substitution process uses a substitution machine learning (ML) model, the variable-document pairs in the variable mapping table may be used to train the substitution ML model.

In one embodiment, the parameter substitution process 1312 uses a substitution machine learning (ML) model, as disclosed herein. In one embodiment, the script (1310) generated by the syntax AI model may not include a variable (i.e., a placeholder for a parameter value), and may hence be output as parameter-substituted scripts (1314) without undergoing the parameter substitution process (1312). Once the scripts are ready (1314), they may be executed (1316), where the resulting designs are output (1318) into the IDEP or customer environment.

In some implementations, the syntax AI model and/or the substitution ML model can be trained using either a Retrieval Augmented Generation (RAG)-based or a Low-Rank Adaptation (LoRA) approach. The RAG-based approach leverages a knowledge base of code examples, document examples, or platform API. The RAG-based approach augments the syntax AI model's (and/or the substitution ML model's) generative capabilities with retrieved contextually relevant information for the digital task requested, to enhance accuracy and detail. Technically, RAG includes a retrieval mechanism that fetches relevant documents to inform the generation process at inference, making it suitable for tasks requiring extensive knowledge bases. The Retrieval-Augmented Generation (RAG) framework and methodology are introduced in more detail in Lewis et al., "*Retrieval-Augmented Generation for Knowledge-Intensive NLP Tasks*", arXiv:2005.11401, 2020, hereby incorporated by reference in its entirety herein.

In contrast, the LoRA approach focuses on fine-tuning the syntax AI model (and/or the substitution ML model) for specific digital tasks or workflows by introducing low-rank updates, which significantly reduce computational and memory requirements while maintaining efficiency. LoRA works by adding low-rank decomposition matrices to the existing weights of the model, rather than modifying the original weights directly. This approach allows for task-specific adaptations with minimal additional parameters, thus reducing the computational resources required for fine-tuning, but also enabling faster adaptation to new tasks or domains without the need to retrain the entire model.

LoRA fine-tuning uses a data set that is task-specific and smaller than the original training data set of the base model, and includes examples that are representative of the target digital task. The data is usually required to be carefully curated to avoid introducing biases or errors. Therefore, a syntax AI model may be fine-tuned using a data set including sample contextual data and template script pairs that are specific to a digital task such as generating a budget audit report, a digital engineering certification report, etc. Similarly, a substitution ML model may be fine-tuned using a data set including sample template and orchestration script pairs that are specific to a digital task. In practice, the LoRA fine-tuning data sets may include sample template scripts, orchestration scripts, platform APIs, software tool documents, and enterprise documents. The Low-Rank Adaptation (LoRA) technique is introduced in more detail in Hu et al., "*LoRA: Low-Rank Adaptation of Large Language Models*", arXiv:2106.09685, 2021, hereby incorporated by reference in its entirety herein.

LoRA is a fine-tuning technique that focuses on making the syntax AI model more efficient to update and specialize, while RAG aims to expand the syntax AI model's effective knowledge by providing it with contextual information at runtime. Therefore, LoRA is particularly advantageous for environments with limited resources or for highly specialized workflows, as it adapts the model using fewer parameters. While RAG excels in scenarios needing broad and detailed information retrieval, LoRA is ideal for efficiently generating orchestration scripts for specific digital processes. In some implementations, the syntax AI model operations can include a group of RAG-based LLM agents or a group of LoRA adapters with LLM agents, to customize for a collection of specific digital tasks.

In some implementations, the parameter substitution process (1312) may include the generation of scripts having dummy parameters (1310) that are then substituted with enterprise-confidential parameters, as discussed below. Various options related to the implementation of the parameter substitution process are disclosed in PCT application No. PCT/US24/38878.

Exemplary parameters are listed below in the context of API and orchestration scripts. Once the variables are substituted with parameters, the generated script(s) may be executed over the IDEP to satisfy the user's input DE prompt.

User Feedback

Multiple user input and feedback modalities may be implemented within the AI-assisted script generation pipeline. The embodiment of FIG. 13 shows the following user interactions.

At step 1302, the user may initiate with a simple task request such as "Design a gear with 20 teeth . . . " or "I want to create a plastic chair . . . ".

At step 1320, the user may interact with a Reinforcement Learning Human Feedback (RLHF) loop to approve or reject workflow steps or tools within the described digital thread. For example, the user may decide on the suggested material selection or simulation models.

At step 1322, the user may thoroughly review the digital thread offered by the system. The user reviews the proposed steps and their parameters. The user may update them, if necessary. The modifications may include changes to potential models or DE tools, their individual parameters, and giving updates on these parameter values. For instance, the user adapts software tools or machining parameters and provides updates on Finite Element Analysis (FEA) models.

At step 1324, within the RLHF loop, the user may review, select, or reject proposed algorithm scripts. For example, the user analyzes coding algorithms or machine learning models, then decides to accept or reject them.

FIG. 13 shows the data flow through the platform and, in addition to the user interactions shown in this flow and discussed above, there are additional options for user input to the platform over several iterations. In some embodiments, the user may go through the following interactive steps:

1. uploading a model,
2. selecting a function in the digital engineering platform (in the application plane or the splicing plane—see FIG. 1),
3. changing a function in the digital engineering platform (in the application plane—see FIG. 1), and
4. implicitly assessing whether a digital model meets certification requirements (e.g., by inserting the digital model into a certification document without further changing it). The implicit assessment described here is an important user feedback element.

Script Types

For generating API scripts, the main building blocks may have the following specific features:

1. Context AI Model (1304): The context AI model generates the objective of the code to be generated, the tool it interacts with, and the broader engineering task it belongs to, such as aircraft design. This data helps frame the task and provides a high-level understanding of the steps to be carried out. This context data is usually hard to infer purely from the DE prompt. Consequently, transformers such as large language models (LLMs) can be particularly effective as they can process large amounts of data and extract high-level themes and concepts.
2. Syntax AI Model (1308): The transformers or LLMs comprised within the syntax AI model are trained to generate the actual code that interfaces with the APIs of any specific DE tool. These transformers or LLMs may be trained on a dataset of similar API interactions, so they capture the nuances of how these APIs operate. Although API scripts are tool-specific by definition, a syntax AI model trained to generate an API script may be trained on the native API of multiple specific tools. Although tool-specialization is possible, in general, the syntax AI model is trained on API scripts within the digital engineering platform, across a mix of native APIs and in addition, platform APIs that implement business logic and further, their related orchestration scripts.
3. Parameter Substitution Process (1312): API script parameters are highly specific to each use-case and may include the dimensions of a component (e.g., an aircraft wing), the viscosity of a fluid (e.g., for a CFD simulation), or the material properties of an FEA model. Since they are deterministic and customer-specific, they may be provided directly by the user or a highly reliable method, and should be incorporated into the code in a deterministic, consistent way (e.g., via a templating system such as the one described in PCT application No. PCT/US24/35885).

For generating microservice or DAG task scripts, the main building blocks may have the following specific features:

1. Context AI Model: The context AI model may provide a workflow to carry out the target DE task and would identify the different required DE tools.
2. Syntax AI Model: Transformers may be responsible for generating the code that calls the various required API scripts, ensuring the correct order, dependencies, error handling, etc. across the various manipulated DE model files. These scripts could be seen as orchestrating the overall workflow of the engineering task.
3. Parameter Substitution Process: Parameters here may include the specific ordering of tasks, any necessary waiting periods between tasks, the handling of any outputs or error messages, etc. They may be provided directly and inserted into the scripts in a deterministic way. Alternatively, they may be inserted by an enterprise AI module.

To generate the scripts that carry out DE tasks, FIG. 13 thus represents a pipeline where the cascaded context and syntax AI models generate the program code, and the parameter substitution process inserts the parameters in a reliable fashion. This setup allows the generation of highly complex, tool-specific code in a very flexible way, whilst still ensuring the right level of control and specificity.

Parameter Substitution as a Zero-Knowledge Measure

In one embodiment, a zero-knowledge (ZK) architecture for the IDMP is implemented where the IDMP's Software Development Kit (SDK) prevents any customer data that is deemed sensitive from being sent through an IDMP API. This ZK objective is achieved through a process of cryptographic tokenization. Cryptographic tokenization identifies sensitive data (e.g., through customer input) and maps each sensitive data element (e.g., digital model, digital artifact, document) with a cryptographic token and a cryptographic identifier. Each cryptographic token includes metadata describing the data element. In cryptographic tokenization, metadata from the cryptographic tokens, rather than the data elements themselves, are used to train the syntax AI models. A syntax AI model training data set may hence include a customer data sovereignty-preserving training data set that consists of sample contextual data associated with sample digital tasks, and corresponding sample template scripts. The generation of each sample template script includes the steps of receiving an orchestration script implementing an associated digital task, identifying sensitive data elements within the orchestration script, and replacing each sensitive data element with its mapped metadata.

Cryptographic tokenization replaces sensitive data with the cryptographic identifier when a data element is to be used outside the customer environment, and exchanges the cryptographic token back for the mapped data elements for use within the customer environment, in a process step called cryptographic de-tokenization. The ZK architecture hence stores the sensitive data elements within the customer's environment (e.g, on the customer's network).

Parameter substitution is a further component of the ZK architecture. Specifically, the parameter substitution process contributes to the ZK architecture by mapping generic parameter names or generic API function details (e.g., function names, inputs, outputs) to specific software tool resources or software tool functions within a customer environment. Consequently, the orchestration scripts generated by the syntax AI model support the ZK architecture by requiring an explicit parameter substitution step within the customer environment.

Multimodal Access of Live Digital Objects

Integrating VR/AR technology within live documents, live boards, and live spaces presents several challenges that need to be addressed to enhance user interaction, collaboration, and efficiency. These challenges are categorized into four primary areas:

1. Navigation and Finding: Users face difficulties in navigating and finding the correct elements within a live document or live board due to the vast amount of data artifacts and their intricate connections. This complexity makes it hard for users to locate the necessary information quickly. Traditional 2-dimensional directory-style listings or graph layouts of parent-child relationships present a starting point for users to begin navigating to find every potential data artifact and every possible version of the artifact before commencing the sorting process for down-selection to those most appropriate.

2. Sorting: Navigating and finding data artifacts in a 2D browser or screen interface is already challenging. Efficiently sorting through various data artifacts in such a 2D environment presents additional challenges so as not to overwhelm the user, while the IDMP platform can provide the user with additional details. When a user selects a single data artifact, such an artifact may already be part of various digital threads that the user is authorized to access in a zero-trust manner. The user then needs to sort through and select the version of the artifact that is most appropriate for their decision-making. When presented with necessary and useful additional context, users need to filter and prioritize relevant information rapidly, which can be cumbersome without an effective system.
3. Display: Ensuring that the correct data artifacts are displayed to users based on their zero-trust security permissions and available dynamic digital threaded context in a dynamic and secure manner within a 3D environment is complex. The display must update in real-time and respect user permissions to prevent unauthorized access to sensitive information.
4. Real-Time Collaboration: Enabling multiple users to collaborate in real-time within a live space (a virtual environment that extends the context for various digital models along with the physical environment) presents challenges in ensuring that changes are synchronized and permissions are respected. This requires robust tools to manage simultaneous interactions and updates. Displaying the correct data artifacts becomes more challenging when multiple users, each with unique credentials, collaborate on a single live document or Magic Dashboard.

Exemplary Multimodal Interface Solutions

1. Navigation and Finding: Multimodal interfaces with the IDMP can implement a fast, dynamic navigation mechanism, similar to a Rolodex, allowing users to quickly spin through and locate necessary data artifacts. While the IDMP's enclave orchestrates this process, the multi-modal UX/UI navigation offers dynamic interaction and contextual information, beyond merely navigating a 2D graph. This mechanism will use intuitive gestures and visual cues to enhance navigation, leveraging the capabilities of current VR/AR and spatial computing interfaces.
2. Sorting: The IDMP can implement advanced sorting algorithms using machine learning models trained on user workflows, metadata, and the platform's universal API. These algorithms will work with visual representations utilizing multi-modal capabilities from various commercial off-the-shelf (COTS) multimodal (AR/VR or spatial computing) devices. This approach will categorize and prioritize data artifacts based on user preferences and historical usage patterns. For example, similar artifacts to a selected one will appear closer to the user's view, while unrelated ones will be positioned further away. Additionally, gesture-based controls will enable quick sorting and selection, adapting in real-time as users interact with the data. In other examples, spatial audio controls can assist a user with the sorting steps with directional cues, or variations in pitch that alert users to similar or dissimilar artifacts.
3. Display: Multi-modal interfaces can create personalized views for each user, dynamically updating the display based on permissions. Secure access controls and encryption will ensure that sensitive information is only visible to authorized users. Features to mask or block unauthorized views will maintain privacy. Multiple collaborators on the same live document can have unique, custom views, while being aware that other collaborators may have access to different artifacts. Users might not know about the presence of certain artifacts unless authorized or may see partial subsets of hidden artifacts on a 'need-to-know' basis. The secure breakout rooms discussed below, as well as steps 1410 and 1436 in FIG. 14, present examples of personalized displays.
4. Real-Time zero-trust multi-modal collaboration: The IDMP can orchestrate digital threads across multiple authorized users for real-time synchronization, ensuring that all changes are instantly reflected across all users' views. By linking with multi-modal interfaces, the IDMP will support zero-trust collaboration, allowing users to see each other's actions and updates in real-time while maintaining permission-based access controls. In some implementations, the IDMP will perform these actions in a zero-knowledge fashion, using tokenized data to create digital threads with relevant artifacts and functions, ensuring only authorized users can access the data within their environment.

Real-time collaboration using live documents and similar dashboards presents several challenges, primarily revolving around securely managing and sharing complex data operations without sharing entire files or digital models. Users often need to perform intricate calculations, data transformations, and digital model-specific functions and processes. Exposing underlying functions or algorithms to all collaborators can lead to security risks and unauthorized access to sensitive data and is not consistent with zero trust principles. Additionally, the complexity of these operations can overwhelm users, making collaboration inefficient. In some implementations, a solution is presented by the use of Magic functions that act as black boxes that allow collaborators to input data artifacts and receive necessary output data artifacts without revealing the internal workings of the functions. This abstraction secures sensitive algorithms while enabling full functionality, streamlining collaboration, enhancing security, and maintaining efficiency.

5. AR/VR Interactions on the Digital Thread: The IDMP benefits from every user action and interaction becoming part of digital threads on the platform. Similar to how users place sections of a live document with text or Magic Links to specific artifacts, or arrange digital artifacts on a live board as a dashboard, the IDMP linked with multi-modal interfaces can remember locations and user views in virtual or augmented settings. This capability augments the real world by placing virtual objects in specific physical spaces whenever similar use is anticipated, enhancing user experience by maintaining consistent spatial context.

Navigation and Sorting

FIG. 14 shows a flowchart that illustrates the navigation and sorting of data artifacts in a multimodal interface, in accordance with the examples disclosed herein. The navigation process for creating a live document, live board, or live space begins with the user initiating the navigation step (1402). The user then proceeds to create a new live document, Board, or Space (1404) and accesses a repository of data artifacts (1406). The system filters these artifacts based on user and network permissions (1408) and categorizes them using machine learning models (1410). Authorized artifacts are displayed using a dynamic visualization mechanism, such as a rolodex or carousel (1412). The user selects the desired data artifacts using gestures (1414) and grabs and drops them into the live document, Board, or Space (1416). The user then reviews and confirms the artifacts, ensuring contextual clarity with reference to parent models (1418). After finalizing the artifacts added to the live document, Board, or Space (1420), the user saves the document, board, or space (1422). Finally, the system stores the live document, Board, or Space and authorizes access based on the initial selection of artifacts (1424). Navigation alone can complete a live document if the user has already sequenced the artifacts. Multimodal interfaces linked with the IDMP enable users to manage their cognitive load and to provide contextual clarity as they identify the right digital artifacts they are authorized to view and select.

The real-time zero trust collaboration is brought through step 1408 where users interacting on the same live document may only see artifacts they are individually authorized. For artifacts that users are not authorized for, in different implementations, they may be able to request access or be provided a Magic function that provides necessary output data without any further detail on the redacted artifact. In some implementations users can request access to redacted features using a gesture rather than clicking on a button. Step 1410 brings about the use of machine learning models that categorize artifacts to help users navigate to subsets based on their input and intended live document. Steps 1414 and 1416 enhance the user interactions with digital models and digital workflows by replacing Copy-Paste instead with Grab & Drop mechanisms, enhancing user experience. Step 1418 enhances the user's ability to understand the context to a specific data artifact by helping them navigate to the parent digital model, or related versions of the data artifacts to help confirm that the data artifact selected is suitable for the live document. In some implementations of 1418 with multimodal interfaces, a user may be able to select and slide or double-tap or double-click a data artifact to reveal the parent model related to it. Such gestural mechanisms help the user quickly understand the most pertinent contextual information for the artifacts they are reviewing.

In one embodiment, if a user loses access to a specific artifact or his\her permissions changes, the user may see a box indicating they don't have permission to see the artifact, or a cube in case of a live space, where potentially the user may request access or use custom gestures such as knocking on the hidden artifact.

The sorting process begins after navigation with the user initiating the sorting step (1432) and using the selected set of data artifacts from the navigation step (1434). The system categorizes these artifacts based on priority, relevance, and dependency using both human expertise and machine learning models (1436). Sorting tools and dynamic visualization mechanisms are employed to display the priority and sequence order of the artifacts, such as through relative sizes or near vs. far placement (1438). The user sorts and sequences the data artifacts using gestures (1440) and then grabs and drops the artifacts in the revised order into the live document, Board, or Space (1442). The user reviews and organizes the artifacts with additional context, such as parent models and dependencies (1444). After finalizing the sequence of artifacts (1446), the user saves the live document, Board, or Space (1448). Finally, the system stores and authorizes access to the live document, Board, or Space with the sequenced set of artifacts (1450).

In the Sorting stage, similarly, step 1436 brings the user of machine learning models to help users manage the prioritization of data artifacts and Steps 1440 and 1442 enhance the user interactions with digital models and digital workflows by replacing Copy-Paste instead with Grab & Drop mechanisms or reordering mechanisms. Step 1444 enhances the user's ability to organize specific data artifacts further by providing them additional context such as the parent digital model, or dependencies to related versions of the data artifacts to help confirm that the data artifact selected is suitable for the live document. In some implementations of 1444 with multimodal interfaces, a user may be able to select and slide a data artifact to reveal the parent model related to it. The user may also select the entire sequence of artifacts within a live document and slide or double-tap or double-click it gesturally to reveal the sequence of digital models that provide the artifacts. Such gestural interactions help the user review the sequence of artifacts with the context of the sequence of associated digital models and help their decision making be intuitive.

Visual Commenting

In some implementations of multimodal interfaces with IDMP, users can utilize visual commenting in addition to text-based comments. Visual commenting in a virtual environment allows users to interact with and annotate data artifacts using a combination of audio, motion, and visual cues, significantly enhancing collaboration and contextual clarity. This feature enables users to use their avatars to provide comments, not only through text but also through gestures and actions within the virtual space. For example, a user can record a comment by interacting with a CAD design, such as picking a specific part, pointing to a detail, and explaining their thoughts through both audio and hand motions. This approach extends traditional commenting methods by incorporating dynamic interactions, allowing collaborators to demonstrate issues or suggestions more intuitively. Visual commenting can also include zooming in on parts, comparing elements, and showing contextual relationships, all within the virtual environment. This method provides a richer, more interactive way to convey feedback, making it easier for collaborators to understand and address specific points, ultimately improving the efficiency and effectiveness of the collaborative process. In exemplary implementations of simulations with spatial computing interfaces, visual commenting or spatial audio commenting can be recording simultaneously with specific runs or time-points in the simulation that further enhance the context for other collaborators to understand the commentary.

An additional example of visual commenting involves running a fluid simulation on a digital thread while providing visual comments. For instance, in a virtual environment, a user examining an airfoil can run a simulation to visualize airflow in 3D space. As the simulation runs, the user can highlight changes to the airflow and explain these changes in real-time, with both the simulation and the commentary recorded in sync. The user's commentary can be additionally recorded with spatial audio so the user's virtual avatar may itself be within 3D space of the airflow and the spatial audio can further capture the direction the user is pointing within the simulation. This synchronized recording enhances the ability to convey complex information, making it easier for collaborators to grasp the nuances of the simulation and the implications of the observed changes. This type of visual commenting provides a comprehensive and interactive way to review and discuss simulations, leading to more informed decision-making and improved collaborative outcomes.

Voice-to-Gear Example

FIG. 15 shows an exemplary generation and execution of an orchestration script through a voice/conversational interface, in accordance with one embodiment of the present invention. The first steps show user interface data processing. At step 1502, the user submits a voice command for the task, including specific modeling and simulation parameters. At step 1504, the system stores the audio file with the user input into a database. At step 1506, the system converts the user input into audio-to-text commands, and identifies the parameters within them using a machine learning model. For example, transformer-based language models such as LaMDA ("Language Model for Dialogue Applications") may be used for this step. LaMDA is introduced in Collins et al., "*LaMDA: our breakthrough conversation technology*" (2021), available at blog(dot)google(dot)com and hereby incorporated by reference in its entirety herein.

At step 1508, a context AI based on an LLM (1512) generates an inference of the digital thread (1508) based on the user input, then generates a prompt for the syntax AI (1510).

In one embodiment, prompt engineering (1510) for the context AI is performed first, then the context AI uses the LLM defined system (1512) to infer the digital thread (1508). With fine tuning, the context AI presents the user input in a standard format featuring a sequence of DE tasks, each associated with a model/tool. For example, the inferred digital thread may be "Verify requirements in a SysML model with both qualitative and quantitative requirements, against a CAD model of an airplane wing and a static and dynamic analysis using an FEA tool in a low-res simulation mesh".

At step 1514, the syntax AI develops scripts for every digital model in the identified digital thread, with associated parameters. In some embodiments, the parameters are hidden from the syntax AI and added subsequently by a software module (e.g., python script) or a separate LLM.

The last three steps occur at the application plane of the DE platform (see FIG. 1). At step 1516, the generated scripts, fitted with the design parameters, are executed, to generate a new CAD design. At step 1518, the generated CAD design is saved. Finally, at step 1520, the saved CAD design can be viewed.

Spatial Computing Example

FIG. 16 shows an exemplary generation and execution of an orchestration script through a spatial computing interface, in accordance with one embodiment of the present invention.

The first steps show user interface data processing. At step 1602, the user gestures, points to real objects, or selects virtual objects in the user interface (UI). At step 1604, the system interprets the user inputs into specific commands. The user may provide feedback to fine-tune the system's interpretation process. At step 1606, the system converts the user input to text commands and identifies the parameters within them, using a machine learning (ML) model.

At step 1608, a context AI based on an LLM or on a transformer (1612) generates an inference of the digital thread (1608) based on the user input, then generates a prompt for the syntax AI (1610).

In one embodiment, prompt engineering (1610) for the context AI is performed first, then the context AI uses the LLM defined system (1612) to infer the digital thread (1608). With fine tuning, the context AI presents the user input in a standard format featuring a sequence of DE tasks, each associated with a model/tool. For example, the inferred digital thread may be "Verify requirements in a SysML model with both qualitative and quantitative requirements, against a CAD model of an airplane wing and a static and dynamic analysis using an FEA tool in a low-res simulation mesh".

In another implementation example, the context AI (1612) converts user input into a format that the syntax AI can process, such as tokenized representation or vectors that encode the input for use and subsequent interpretation. In such implementations, the representation captures the intent from the user without relying on an intermediate transformer-mediated prompt generation such as (1610). The aim is to encode the user input in a manner that makes it easier for subsequent stages of the AI toolchain to interpret and process.

At step 1614, the syntax AI develops scripts for every digital model in the identified digital thread, with associated parameters. In some embodiments, the parameters are hidden from the syntax AI and added subsequently by a software module (e.g., python script) or a separate LLM.

The last three steps occur at the application plane of the DE platform (see FIG. 1). At step 1616, the generated scripts, fitted with the design parameters, are executed, to generate a new CAD design. At step 1618, the generated CAD design is saved. Finally, at step 1620, the saved CAD design can be viewed.

Code Interface for Bot User Interactions

As further shown and described below and in connection with FIG. 17, a bot communication interface (1700) integrates several modules to streamline and secure data exchanges. These modules handle TCP/IP and UDP communications (1702), socket-based communications (1704), and API requests, whether textual (like JSON, Code, XML) (1706) or embedding-based (1708). The system also facilitates VoIP communications (1710).

Key implementation steps include incorporating a Learning Management System (LMS) for text processing. For Voice over IP (VoIP) communications, the system processes audio streams and converts them into text. The system also maintains continuous listening for messages across both TCP and UDP protocols.

Incoming web requests are handled effectively, and the system includes the implementation of webhooks to trigger specific responses to these requests.

Finally, security measures are paramount. The system implements Attribute-Based Access Control (ABAC) to regulate access to its resources. It also maintains auditability, keeping a reliable record of operations and activities for tracking and review. Together, these features create a robust, secure, and efficient communication interface for bots.

The bot interface 1700 implementation steps may include the following:

1. Defining Communication Channels:
   - Develop interfaces for each type of communication channel. This includes APIs (RESTful), Voice over IP, text messages, sockets, and other potential mediums.
2. Data Processing:
   1. Implement a Language Model (LLM) that can process different types of data including JSON, Code, XML. Implement Natural Language Understanding (NLU) or Natural Language Processing (NLP) capabilities to handle multiple dialects.

2. For text data, add an extra layer of processing with an LLM with specific approaches such as punctuation handling or sentiment analysis.
3. For Voice over IP, implement a feature to handle audio streams, convert the audio to text and process it using timestamps.

3. Protocol Implementations:
   a. Create different communication protocols to handle different types of messages. Implement TCP for situations where order matters and UDP for cases where order isn't critical.
   b. Include HTTPS for secure communication
4. Handling Connections:
   1. Implement socket connections for real-time interactions. The interface for this should keep the connection open and continually listen for messages.
   2. For APIs, create standard request-response interactions.
5. Request Handling:
   Implement functionalities to handle GET requests and manage webhooks. For more direct interactions with the model, provide an interface that supports interactions using embeddings.
6. System Adaptability and Security:
   a. Create a system interface that can adapt to different dialects for flexibility in bot communication.
   b. Error detection and recovery
   c. Implement robust security measures, such as encryption for data in transit and at rest, secure user authentication, and regular security audits.
7. Testing:
   Incorporate comprehensive unit tests and integration tests, load testing and stress tests, to ensure all parts of the system are functioning as expected and to identify any potential security vulnerabilities.

The key components of a code interface may include the following:

1. Communication Channels
   a. APIs
   b. Voice over IP
   c. Text messages
   d. Sockets
   e. Other common mediums
2. Handling Different Data Types
   a. JSON, Code, XML: Processed using a Language Model (LLM) that can handle multiple languages
   b. Text: An additional LLM box can be added for processing text
   c. Audio: Voice over IP involves handling the stream, converting audio to text, and then processing it using timestamps
3. Protocol Options
   a. TCP: Guarantees the order of the messages, suitable for certain use cases
   b. UDP: Doesn't guarantee the order of the messages, can be used for other specific use cases
4. Connection Types
   a. Sockets: Ideal for real-time connections as they provide an open, continuous connection
   b. APIs: Typical for non-real time, standard request-response interactions
5. Request Handling
   a. GET requests: Require handling requests and managing webhooks
   b. Direct Interaction: Possible with the model using embeddings
6. Adaptability and security
   The system's ability to adapt to different dialects provides flexibility in bot communication and each interaction is authenticated and tracked for auditability.

As discussed above, FIG. 17 shows an example flow chart illustrating aspects of the operation of the disclosed systems for multimodal communications for code interfaces, in accordance with example embodiments of the present invention. In some aspects, the diagram of FIG. 17 represents various manners in which a bot communication interface can integrate several modules to streamline and secure data exchanges. In particular, these modules can include a TCP/IP and UDP communications module (1702) to handle TCP/IP and UDP communications, a socket-based communications module (1704) to handle socket-based communications, and a Textual based API module (1706) to handle API requests, whether textual (like JSON, Code, XML) or embedding-based requests via an embeddings based request module (1708). The system also includes a VoIP module (1710) to facilitate VoIP communications.

The various modules discussed above may be managed through a digital engineering platform (1712) such as the IDEP, or more generally a digital platform such as the IDMP, enabling additional capabilities such as the various machine-learning enhancements as well as the security and data privacy measures disclosed herein. For example, the various modules mentioned above can include implementation functionality that include incorporating a Learning Management System (LMS) for text processing. In some aspects, for Voice over IP (VoIP) communications, the system may process one or more audio streams and convert them into text. The system also maintains continuous listening for messages across various protocols such as TCP and UDP protocols.

In other aspects, incoming web requests are handled, for example, by a system implementation of webhooks to trigger specific responses to these requests.

Finally, the system includes specific security measures as part of its overall structure. For example, the system implements Attribute-Based Access Control (ABAC) to regulate access to its resources. Further the disclosed systems can also maintain auditability by keeping a reliable record of operations and activities for tracking and review. Together, these features create a robust, secure, and efficient communication interface, for example, for bots to communicate over.

Exemplary GUI/API Interface: AI-Assisted Requirements Verification

FIG. 18 shows an illustrative flow diagram for an exemplary use case where a GUI/API interface is used in an AI-assisted requirements verification process, according to some embodiments of the present invention.

In this illustrative example, a user may upload 1802 a digital model file (e.g., CAD file for an airplane seat) into the IDEP via a GUI or an API interface. The CAD file may be in .zip format with the entire seat assembly included, and a 3-dimensional (3D) view of the design may be displayed via the GUI for the user to confirm that the correct file has been uploaded. The same GUI may receive further user input/instructions for seat requirements verification 1804.

Next, the user may upload the requirements file 1806. For example, the user may click on an "Upload requirements" icon to initiate the upload process, then choose an excel requirements document to upload. The DE system may convert the excel file into CSV format. Requirements describe the necessary functions and features of the system when designed, implemented, and operated. As such, requirements set constraints and goals in the design space and the objective space, trading off design characteristics or limitations such as performance, schedule, cost, and life-cycle properties.

Once processed, a list of requirements as extracted from the requirements file may be displayed to the user for a walk through 1808, where the user may make any corrections to individual requirements as needed. In some embodiments, the DE platform may display an error message to the user if any potential errors or conflicts are detected automatically.

Next, the user may interact with the GUI to start 1812 the AI-assisted requirements verification process 1810. A workflow of the verification process may be displayed to the user to monitor the verification progress, allowing the user or a human expert to review correctly verified items, review error list examples, and provide feedback 1814 to the system if needed.

A report 1816 may be generated automatically by the DE platform once verification is completed. The DE platform may further provide functions for tracking/archiving verification histories, and for sharing the report via a downloadable link.

Exemplary Interfaces for Voice Control

FIG. 19 shows an example workflow illustrating aspects of the operation of the disclosed systems in connection with interfaces for voice control, in accordance with example embodiments of the disclosure. In some respects, the flow represents some aspects of user interactions with a CAD model using various interfaces (e.g., VR/AR/voice/text interface, and/or the like). At step 1902, the user can upload a model (e.g., a seat CAD model) in an DE app. In some aspects, the user can upload a particular file type such as a zip file with assembly (code) included. In other aspects, the system may provide a 3D view of the model represented by the file in a graphical user interface (GUI) to confirm to the user that the correct file has been selected before uploading.

At step 1904, the user can view the CAD model using VR/AR. In particular, the user can connect the VR glasses to the platform and activate them. Then the user can select the model to view in VR. The system may display the selected model along with relevant information extracted from the file.

At step 1906, the user can provide voice or chat input via the user interface. In particular, the system may display a menu of command options, available as audio or text. Then the user can choose and submit their preferred command, either vocally or via text.

At step 1908, the voice command processing tool initiates and functions. In particular, the commands are converted to text and shown to the user for approval. Further, the system may use an AI model that generates and presents user suggestions that are associated with the command and/or the model for user consideration.

At step 1910, the system may walk through (e.g., describe in sequence) one or more requirements' use cases for a particular design. In some respects, this can be performed, for example, through VR, text, or audio. In particular, the system lists the total number of requirements, with some of them being qualitative requirements. Furthermore, the user can make any corrections to the requirements as needed.

At step 1912, the system may start a generation process to create updated outputs. In particular, the system may use AI to assist in generating better outputs as compared to an unassisted case (by way of comparison against predetermined conditions). In particular, this generation process can begin by the user making a selection (e.g., clicking a 'start' button).

At step 1914, the system may display outputs on the screen or other display. As noted, the system may use AI to assist in generating better outputs as compared to an unassisted case (by way of comparison against predetermined conditions). Further, the system may provide updated outputs available in a downloadable link. Additional features of the system may exhibit in this step include, but are not limited to, a history viewing, an archiving capability, and/or the like.

At step 1916, the system may be configured to permit the user to see and compare the new output with the previous version. In particular, the user can view all updated information, including model sizes and dimensions.

FIG. 20 shows another example workflow illustrating aspects of the operation of the disclosed systems in connection with interfaces for voice control, in accordance with example embodiments of the disclosure. In some respects, the flow further represents some aspects of user interactions with a CAD model using various interfaces (e.g., VR/AR/voice/text interface). In general, as detailed below, the user connects VR glasses to the platform and chooses a display model; the system shows the model in VR, using both requirement and CAD file data. Further, while interacting with the 3D model, the user receives system highlights for any discrepancies or errors along with suggested fixes. At step 2002, the user can upload a model (e.g., a seat CAD model) in a DE app. In particular, the user can upload a file of a predetermined type (e.g., a zip file with assembly included). The system may show a 3D view in GUI to confirm that the correct file was selected.

At step 2004, the user can upload requirements. In particular, the user can click the 'upload requirements' button, choose a document (e.g., an excel document) of requirements, and convert files to a particular format (e.g., to CSV format).

At step 2006, the system may receive voice and/or chat inputs. In particular, the user can input voice or chat commands via the UI. The system may then present potential voice and text responses to the user. Further, the user can send their chosen voice or text command via the interface.

At step 2007, the user can view a CAD model using VR/AR. In particular, the user connects the VR glasses to the DE platform and selects the VR display model. Then, the system presents the model in VR, complete with its associated information. Thereafter, the user can interact with the system, using voice commands to request changes or perform cross-checks between files.

At step 2008, the system may include a voice command processing tool that initiates and functions. In particular, the voice commands are converted to text and shown to the user for approval. Further, the AI model generates and presents user suggestions.

At step 2010, the system may walk the user through one or more requirement use cases. In some respects, the system may list a total number of requirements, with some of them qualitative. Further, the system may allow the user to make any corrections to requirements as needed.

At step 2012, the system may start a verification process. In particular, the system may permit the user to click a 'verification' button, select CAD model, select all corresponding requirements, and click a 'verify Selected' button to initiate verification.

At step 2014, the system may enable a verification process with human expert feedback. In particular, the user can watch progress of the workflow, review correctly verified items, and review error list examples.

At step 2016, the system may provide a report with a digital signature. In particular, the system may provide a report describing what was performed and make the report available in a downloadable link format. The system may further include additional features such as history, archiving capabilities, and the like.

At step 2018, the system may allow the user to view the CAD model's updated output through VR/AR and can crosscheck the CAD model updated output against the requirements.

In one or more aspects of the above steps, the user connects VR glasses to the platform and chooses a display model. The system shows the model in VR, using both requirement and CAD file data. While interacting with the 3D model, the user receives system highlights for any discrepancies or errors along with suggested fixes.

AI-Assisted Conversational Interfaces

Requirements Verification Example

FIG. 21 shows an illustrative flow diagram of an exemplary AI-assisted requirements verification process using a conversational interface, according to some embodiments of the present invention. In particular, transformers or Language Learning Models (LLMs) may be employed as well to analyze an input requirement file. Before running the AI-assisted requirement verification process, pre-processing 2102 may be completed to add embeddings from reference requirements documentation (e.g., MIL-HDBK-516C Airworthiness Certification Criteria, for all manned and unmanned, fixed and rotary wing air systems) to the LLM.

Upon initiation of the AI-assisted requirement verification process, a requirements file (e.g., in excel or CSV format) and a corresponding digital model file (e.g., CAD) to be verified against the requirements may be uploaded 2104.

The requirements file may be spliced 2106 into a Model Splice R, using a dedicated Requirements Model Splicer, to extract the individual requirements, which may be quantitative or qualitative. Model Splice R may be further processed to assess, classify, or categorize qualitative and quantitative requirements, using the pre-processed LLM.

Next, the user gives instructions in conversation (voice/text) 2108 targeting a specific requirement. In response, the LLM suggests actions based on the user input 2110. The user may then select the recommended action or deliver further instructions 2112. Since the LLM was trained on embeddings from prior reference requirements documentation as well as prior feedback from other users, this feedback loop with the user leads to a refining of the LLM suggested actions.

For every selected action, Model Splice R is processed 2114 based on user instructions on specific requirements. For every selected requirement, the input CAD model may be spliced accordingly into Model Splice M to implement the user selected action on the specific requirements 2116, thus initiating an AI-assisted requirement verification process. If Model Splice M already exists, Model Splice M may be updated based on the user selected action on the specific requirements.

Next, Model Splice R and Model Splice M may be linked appropriately, such that each corresponding requirement from splice R is evaluated with the corresponding model parameters from splice M, to check against requirement and output satisfiability 2118. A human expert may review, validate, and approve each requirement verification result 2120, and a verification report 2122 may be generated once all requirements have been considered.

Digital Thread Modification Example

FIG. 22 shows an example workflow illustrating aspects of the operation of the disclosed systems in connection with AI-assisted conversational interfaces, in accordance with example embodiments of the disclosure. At step 2202, the system is configured to permit a user 2230 to upload digital models through the GUI or via API calls. At step 2204, the system is configured to create appropriate model splices. At step 2206, the system is configured to receive user input (voice/text) in an analysis/control plane.

At step 2208, the system processes user inputs as voice and text via an algorithm. As part of this step, the system may receive speech to text/sentiment analysis.

At step 2210, the system is configured to provide a menu of platform specific actions that can be taken by the user. As part of this step, the system may receive and provide digital thread descriptions and digital engineering (DE) tool-specific actions for users to view and take, respectively. Further, the user can interact with the system via an interactive voice response (IVR) and/or chatbot and the results of the interaction can be fed back into the user input at step 2206.

At step 2212, the system is configured to create orchestration scripts based on user input. As part of this step, the system may receive software-tool-specific scripts and can receive parameter substitutions. The software-tool-specific scripts can be received via a syntax AI module 2224. The parameter substitutions can be received via a context AI module 2222.

At step 2214, the system is configured to execute one or more corresponding orchestration scripts. These scripts can serve to automate the execution of relevant tasks and subtasks to achieve a particular output demanded by the request/command. At step 2216, the system is configured to report, with digital signature of user input and executed actions. In particular, the system may provide a report describing what was performed and make the report available in a downloadable link format. The system may further include additional features such as history, archiving capabilities, and the like.

Exemplary Graphical User Interfaces

Exemplary GUI for Digital Artifacts in a Digital Thread

FIG. 23 shows a screenshot of an exemplary graphical user interface (GUI) used to operate a digital thread over the IDEP, according to one embodiment of the present invention. The GUI provides the user of the interconnected digital engineering platform (IDEP) with the ability to select and view digital artifacts that they are authorized to access, including the initial version, most recent version, and any intermediate versions. FIG. 23 shows a browser window header 2302 which includes a digital thread link for easy navigation. Below the header, a domain and security level banner 2304 displays the domain, platform software version, and security level, ensuring that users are aware of the domain they are operating in and the security protocols in place. The security level indicator 2306 displays the user's maximum security access level within the platform (e.g., "Level 1"). The security level indicator is interchangeably referred to as "info security tag", "infosec tag" or "info see tag", herein.

The interface also includes a search bar 2312, allowing the user to carry out comprehensive cross-platform searches through the IDEP for digital engineering models, files, and documents, thus facilitating efficient retrieval of information across the platform. Adjacent to this, the user & domain field 2310 provides information on the user's domain (e.g., client name). The user and domain field may allow the user to login and to access user profile and subscription information.

The top menu of the GUI offers additional functionalities. For example, the digital artifact name field 2320 displays the digital model or document's name, and may include its version. In addition, the digital thread artifact field 2326 displays the digital artifact name. The digital artifact security level indicator 2322 displays the security level (e.g., "Level 1") of the digital artifact being accessed. In one embodiment, using an expandable security level menu adjacent to the digital artifact security level indicator 2322, the user may select the digital artifact's target security access level "view", thus filtering only the parts of the digital artifact accessible through a given security level. In other embodiments, the user may also use the digital artifact security level indicator 2322 to down-select the security level while sharing the digital artifact, thus sharing portions of the digital artifact that correspond to the specified security level. Only security access levels below the user's security level (e.g., "Level 1" in FIG. 23) would be available for the user to view and share. The user interface buttons 2324 include options to copy the digital artifact link, open a comment section, access digital artifact information, manage sharing access, and export the digital artifact.

In some embodiments, the granular dynamic info security tags (e.g., 2306 and 2322, and the like), are important elements of the digital thread and live digital object generation/display system and its associated GUI. The model splicer and the IDEP system enable the granular dynamic information security tags 2306 and 2322. In some embodiments, the digital thread system in the IDEP uses metadata of DE models or documents to cross-reference against authorizations, licenses, or regulations to update. In some embodiments, the granular dynamic information security tags 2306 and 2322 are dynamic, and are refreshed ahead of any digital thread updates to confirm the right authenticated user has the right authorized access to the digital artifacts and data to perform or view the updates.

At the center of FIG. 23, the digital artifact viewer 2340 displays the digital artifact that the user is authorized to access at the right info sec level. Lastly, on the right of FIG. 23, the version pane 2350 exhibits the version history of the digital artifact within the digital thread. In the exemplary GUI of FIG. 23, the version card 2352 shows that the user is viewing the 'Most Recent' version of a digital artifact shown in the viewer. The version card 2354 shows the option to select the 'Initial' version of the digital artifact. In some embodiments, all versions of the artifact that the user is allowed to view at their infosec level are accessible through a versions menu in the version pane 2350.

Revisions of digital artifacts are highly likely during the course of execution of a digital thread associated with complex DE tasks. The Versioning GUI illustrated in FIG. 23 presents an example of how the IDEP can provide users with the ability to track versions with the right security controls and access controls.

Exemplary GUI for Orchestration Scripts in Digital Threads

FIG. 24 shows a screenshot of another exemplary graphical user interface (GUI) used to operate a digital thread over the IDEP, according to one embodiment of the present invention. The GUI provides the user of the interconnected digital engineering platform (IDEP) with the digital thread creation capabilities described herein. FIG. 24 shows a browser window header 2402 which includes a digital thread link for easy navigation. Below the header, a domain and security level banner 2404 displays the domain, platform software version, and security level, ensuring that users are aware of the domain they are operating in and the security protocols in place. The security level indicator 2406 displays the user's maximum security access level within the platform (e.g., "Level 1").

The interface also includes a search bar 2412, allowing the user to carry out comprehensive cross-platform searches through the IDEP for digital engineering models, files, digital threads and documents, thus facilitating efficient retrieval of information across the platform. Adjacent to this, the user & domain field 2410 provides information on the user's domain (e.g., client name). The user and domain field may allow the user to login and to access user profile and subscription information.

The top menu of the GUI offers additional functionalities. For example, the digital thread name field 2420 displays the digital thread's name, and may include its version. The digital thread security level indicator 2422 displays the security level (e.g., "Level 1") of the digital thread being accessed. In one embodiment, using an expandable security level menu adjacent to the digital thread security level indicator 2422, the user may select the digital thread's target security access level "view", thus filtering only the parts of the digital thread accessible through a given security level. In other embodiments, the user may also use the digital thread security level indicator 2422 to down-select the security level while sharing the digital thread or an associated live document for the digital thread, thus sharing portions of the digital thread that correspond to the specified security level. Only security access levels below the user's security level (e.g., "Level 1" in FIG. 24) would be available for the user to view and share. The user interface buttons 2424 include options to copy the digital thread link, open a comment section, access digital thread information, manage sharing access, and export the digital thread.

In some embodiments, the granular dynamic info security tags (e.g., 2406 and 2422, and the like) are an important element of the digital thread and live doc system, as well as its associated GUI. The model splicer and the IDEP system enable the granular dynamic information security tags 2406 and 2422. In various embodiments, the digital thread system in the IDEP uses metadata of DE models or documents to cross-reference against authorizations, licenses, or regulations to update. In some embodiments, the granular dynamic information security tags 2406 and 2422 are dynamic, and are refreshed ahead of any digital thread updates to confirm the right authenticated user has the right authorized access to the digital artifacts and data to perform or view the updates.

As discussed above, digital threads are a set of orchestration scripts to orchestrate the selective exchange of data among documents and DE model files. Digital threads therefore link all the resources relevant to accomplishing a given DE task, including the various sections of an orchestration script, the relevant DE models, as well as relevant context information and metadata.

For a secure digital thread organization and navigation, the illustrative GUI of FIG. 24 features a digital thread outline viewer 2430 on the left of FIG. 24, providing links to the digital thread's individual sections, including code blocks that may carry out individual subtasks within the orchestration script, text blocks that may provide contextual, parametric, requirement-related, and/or certification-related information on linked DE models. Text blocks may also include text paragraphs and/or orchestration code comments and data sources. Within the digital thread outline viewer 2430, a digital thread detailed viewer 2432 shows sections of the secure digital thread along with the linked digital engineering (DE) model(s), the associated live documents, the source IT domain, and the last update timestamp, each tagged with the appropriate information security level (e.g., "L1" or "Level 1"). In some embodiments, the information security tag on a code block indicates a restriction on executing the code block. That is, a code block may only be run by an user entity with an equal or higher information security level. In some embodiments, the information security tag may indicate a viewing privilege, so the code block is only presented and viewable by an user entity with an equal or higher information security level.

In some embodiments, if sections of a secure digital thread contain content requiring a higher security level for viewing, the user may be presented with an option to request access. Were the user to request such access, an authorized user with access at a higher security level is notified for their review. In other embodiments, if sections of a digital thread contain content requiring a higher security level for viewing, such sections will not be shown for display, nor will the user be provided with any prompt for requesting access.

At the center of FIG. 24, the section viewer 2440 displays the content of each secure digital thread section and ensures that every orchestration script code, code comment, and text block is updated based on the data of the DE models that are linked to it. The model data and associated security access may be provided through model splicing, as discussed previously. Lastly, on the right of FIG. 24, the comment pane 2450 exhibits the digital thread comments and may include functionalities for comment sharing and resolution.

Exemplary Live Board Operations

FIG. 25 shows an exemplary graphical user interface (GUI) used to generate or update a live suite or collaboration board over the IDMP, according to one embodiment of the present invention. Specifically, FIG. 25 shows a browser window header 2502 which includes a live board link for easy navigation. Below the header, a domain and security level banner 2504 displays the domain, platform software version, and security level, ensuring that users are aware of the domain they are operating in and the security protocols in place. The security level indicator 2506 displays the user's maximum security access level within the platform (e.g., "Level 1").

The interface also includes a search bar 2512, allowing the user to carry out comprehensive cross-platform searches through the IDEP for digital engineering models, files, digital threads and documents, thus facilitating efficient retrieval of information across the platform. Adjacent to this, the user & domain field 2510 provides information on the user's domain (e.g., client name). The user and domain field may allow the user to login and to access user profile and subscription information.

The top menu of the GUI offers additional functionalities. For example, the live board name field 2520 displays the live board's name, and may include its version. The live board security level indicator 2522 displays the security level (e.g., "Level 1") of the live board being accessed. In one embodiment, using an expandable security level menu adjacent to the live board security level indicator 2522, the user may select the live board's target security access level "view", thus filtering only the parts of the live board accessible through a given security level. In other embodiments, the user may also use the live board security level indicator 2522 to down-select the security level while sharing the live board or an associated live document for the live board, thus sharing portions of the live board that correspond to the specified security level. Only security access levels below the user's security level (e.g., "Level 1" in FIG. 25) would be available for the user to view and share. The user interface buttons 2524 include options to copy the live board link, open a comment section, access live board information, manage sharing access, and export the digital thread.

In some embodiments, the granular dynamic info security tags (e.g., 2506 and 2522, and the like) are an important element of the live board and live doc system, as well as its associated GUI. The model splicer and the IDEP system enable the granular dynamic information security tags 2506 and 2522. In various embodiments, the digital thread system in the IDEP uses metadata of DE models or documents to cross-reference against authorizations, licenses, or regulations to update. In some embodiments, the granular dynamic information security tags 2506 and 2522 are dynamic, and are refreshed ahead of any live board updates to confirm the right authenticated user has the right authorized access to the digital artifacts and data to perform or view the updates.

FIG. 25 illustrates live, or magic, chips (individual artifacts as a tile) on a live/magic suite collaboration board. Magic chips can also be called from other 3rd party software tools such as Google Suite, Slack, etc.

As discussed above, live boards represent data managed through digital threads that orchestrate the selective exchange of data among documents and DE model files. Digital threads therefore link all the resources relevant to accomplishing a given DE task, including the various sections of an orchestration script, the relevant DE models, as well as relevant context information and metadata.

Live/Magic Links and Live/Magic Chips

Within an exemplary live suite or collaboration board, or within a live doc, a magic link (or live link) refers to a hyperlink that points to an artifact. In Magic Docs, links are used to dynamically connect artifacts inside of the document. In a collaboration board, one or more magic links can be used as live links to digital artifacts within the customer data storage. These links enable updates, and contextual information to be displayed directly in the document, ensuring that users always access the most current information.

When the live links are executed, they can be presented in a tiled format, called live chips or magic chips as shown in FIG. 25. FIG. 25 shows a magic chip for a vehicle performance artifact 2540, a body block diagram 2542, and an isometric view 2544.

Magic Links are also represented as blocks inside of Magic Docs or within a Magic Suite collaboration board. Through a magic link in the IDMP, the actual content of the artifact is not saved but rather a link to the digital artifact itself is provided so that security, access and content are updated whenever the document or collaboration board is loaded. An example representation of Magic Link data inside of the Magic Doc is shown in Table 1.

TABLE 1

Example Representation of Magic Link Data Inside of Magic Doc

```
{
"id": "efb9f19f-1864-42b8-efa3-f87e90f615e9",
"type": "magicLink",
"data": {
    "link": "https://file-service-eks.dev.istari.app/api/model/70be60b5-5814-4114-a591-80b4ade33472/artifact/bd95649c-6360-485e-b903-545eed4b3273",
    "meta": {
        "artifact_name": "named_cells",
        "artifact_id": "bd95649c-6360-485e-b903-545eed4b3273",
        "model_name": "Model Name Placeholder",
        "model_id": "70be60b5-5814-4114-a591-80b4ade33472",
        "artifact_extension": "json",
        "last_updated": "2024-04-03T18:53:03.268966",
        "asset_url": "https://s3.us-east-1.amazonaws.com/istari-file-service-auth-dev/46bb6004-bc23-45b9-b026-b3ec4f56f4be?X-Amz-Algorithm=AWS4-HMAC-SHA256&X-Amz-Credential=AKIAYKVZV47CU4P6Y7II%2F20240422%2Fus-east-1%2Fs3%2Faws4_request&X-Amz-Date=20240422T190045Z&X-Amz-Expires=30&X-Amz-SignedHeaders=host&X-Amz-Signature=452b14a033009cf9e160f9aa5fa37ec41f9773e5bdea7b9319e70fa8f0ce1da1",
        "url": "https://file-service-eks.dev.istari.app/api/model/70be60b5-5814-4114-a591-80b4ade33472/artifact/bd95649c-6360-485e-b903-545eed4b3273"
        }
    }
}
```

In a related embodiment, magic chips can be implemented as portable components that authenticates the user and renders artifacts, similar to magic link, within a 3rd party software such as Google suite, Slack, JIRA, etc. Magic Chips can operate outside of the normal IDMP platform and inside of other platforms only if there is authentication of the user on both ends (within 3rd party software and seamlessly linked to IDMP) to access the data.

In related embodiments, the Fyber platform can connect seamlessly with other online platforms (e.g., Google Suite, Slack) using 3-legged OAuth (OAuth 2.0) authentication. This method allows users to grant the Fyber platform access to their data on other platforms without sharing their credentials, and vice versa. Additionally, users may authorize other platforms to access some of their data or functions through the Fyber platform.

Here's a simplified overview of the process for linking Fyber with other platforms and allowing Fyber to access user's data on other platforms. It will be apparent that reversing the process steps would allow the user to grant 3rd party platforms the ability to access their data on Fyber platform:

A. Registration: The Fyber platform registers with the OAuth provider (e.g., Google) to get a client ID and secret.

B. Authorization Request: The Fyber platform directs the user to the OAuth provider's authorization page to grant access.

C. Authorization Code Exchange: After the user grants access, the OAuth provider redirects them back to the Fyber platform with an authorization code. The Fyber platform then exchanges this code for an access token.

D. API Requests: The Fyber platform uses the access token to request and perform data operations (consistent with the permissions of the access token) from the OAuth provider on behalf of the user.

In some embodiments, such a process can be implemented within a plugin (e.g., a browser plugin), handling the OAuth flow, token management, and API requests. This integration allows seamless and secure data access linked to trusted sources using the Fyber platform across multiple platforms.

Secure Breakout Rooms for ZT Collaboration

In some implementations of the Integrated Digital Model Platform (IDMP), a multimodal interface facilitates zero-trust (ZT) collaboration within the same live space, Doc, or Board through the use of breakout rooms or secure compartments. This is achieved by dynamically controlling access to data artifacts and associated communications among collaborators based on user and security network permissions. This secure compartment or breakout feature allows multiple users to work concurrently on shared live documents or live spaces while ensuring that sensitive information remains restricted to authorized individuals. For example, when a digital model or artifact is in focus, users without the requisite permissions are automatically excluded from viewing or hearing any related content. This exclusion can be implemented by muting the audio channel for unauthorized users or visually masking the artifact. Similar to traditional breakout rooms, this concept ensures seamless and secure collaboration within a virtual environment using the IDMP. Users can interact with the shared space with the assurance that their access to sensitive data is meticulously managed. This functionality enhances collaborative efforts by maintaining security and privacy, allowing users to concentrate on their tasks without worrying about unauthorized data exposure.

Illustrative Embodiments of Multimodal Operations

FIG. 26 illustrates the use of a multimodal interface to access data through a virtual live board, in accordance with the examples disclosed herein. Specifically, FIG. 26 illustrates a scene set in a virtual space called live space, where a human user 2602 is wearing a virtual reality (VR) headset, an augmented reality (AR) headset, or a spatial computing headset 2604 to interact with the design and simulations of an aircraft and its engine through the Integrated Digital Model Platform (IDMP). The user 2602 has invited two collaborators, depicted as virtual avatars (2606 and 2608), into this immersive environment. Surrounding the human user are two virtual walls of artifacts (e.g., 2610). The virtual wall behind the user features navigation panes of artifacts 2614 that can be selected and brought into view for collaboration with the two virtual avatars (2606 and 2608). In addition, the virtual wall behind the user features sorting panes of artifacts 2615 that can be grabbed and dropped into the live space or any of the virtual spaces available to the user 2602. Note that virtual environments may exhibit the use of multiple virtual spaces that can be minimized, maximized, toggled, and swapped by the user. These include but are not limited to virtual 3D spaces, virtual 2D walls, virtual 2D screens, virtual windows, and virtual desks (e.g., 2612).

At the top, the human user 2602 uses hand gestures 2630 that may be captured using spatial computing headset 2604, a virtual reality (VR) glove 2632, a camera (not shown in FIG. 26) or a spatial computing headset, to interact with a 3D model of an airplane 2616 linked through the IDMP. This 3D model 2616 is displayed in the virtual space against the backdrop of a dashboard, referred to as the live board 2618, which contains various digital artifacts and separately a Magic Document 2620 with a digital thread of specific reviews performed by the team, including the user and the collaborators (2606 and 2608). In one embodiment, the fact that the 3D model of the airplane 2616 is selected is apparent to the user through a visual differentiation such as a thick contour, as illustrated in FIG. 26. In one embodiment, other collaborators (not shown in FIG. 26) may collaborate to the team work conversationally.

In FIG. 26, the team is engaged in a discussion about models and simulations of an aircraft design. FIG. 26 shows a visualization of the airflow around the engine from a CFD analysis 2622 and a data artifact, such as a line trace of the lift coefficient 2624, both linked to the simulation model. An instance of the simulation model 2626 may also be displayed on the live board. The data artifacts for the line trace 2624 and the airflow visualization 2622 are both derived from the same simulation model 2626, providing a comprehensive view of the aircraft's performance.

As the human user 2602 reviews the aircraft's performance, the virtual avatars (2606 and 2608) are actively reviewing additional aspects of the engine design, adding commentary, and checking against their review checklist. The virtual avatar on the right 2608 may not have authorization to view the engine designs that the virtual avatar on the left 2606 sees. That access restriction may be conveyed to the human user 2602 through the graying out of the virtual avatar 2608 when a digital artifact, model, thread, or document for which they do not have access is selected by the human user, as shown in FIG. 26. To the collaborator with reduced access to elements of the viewed data 2608, digital artifacts, models, threads, or documents that are not within their security level are grayed out or obstructed from their virtual walls, spaces, windows, and live digital objects. The user 2602 may also be unauthorized to view some of the digital artifacts or digital models belonging to the systems the user 2602 is manipulating, such as the artifacts on the navigation panes 2614 or the sorting panes 2615. In some embodiments, the platform may indicate to the user 2602 the artifacts, models, sub-systems, and systems that the user 2602 is unauthorized to access or manipulate through graying out, dashing, shading, censoring, coloring, or any other obfuscation means.

FIG. 26 shows that such a collaborative setup using multimodal interfaces enables a detailed and interactive review process in a zero-trust environment, facilitating effective communication and decision-making among the team members, even when some of them are not authorized to view all artifacts or information about the design.

FIG. 27 shows a flowchart that details a process for interacting with a live digital object, in accordance with the examples disclosed herein. The process begins in step 2720, where the system receives a live digital object. The live digital object may include a digital artifact extracted from a digital model file through a model representation. The model representation may include model-type-specific locators to digital model data and metadata. Next, in step 2730, the system initiates a connection to a multimodal interface. The multimodal interface may be configured to receive input from, and provide output to, at least two different modalities. The at least two different modalities may include at least a conversational modality and a spatial modality. In step 2740, the system receives a security level of a first user. In step 2750, the system determines an access permission of the first user to access the digital artifact and a modification permission of the first user to modify the digital artifact, based on the security level of the first user. In step 2760, the system outputs to the multimodal interface, through the connection, the digital artifact based on the access permission of the first user to access the digital artifact. In step 2770, the system receives from the multimodal interface, through the connection, one or more inputs. The inputs may include a conversational input and a spatial input from the first user related to the digital artifact. Finally, in step 2780, the system generates a modified digital artifact from the digital artifact via the digital model representation, based on the modification permission of the first user to modify the digital artifact, and based on the one or more inputs. This completes the process. Although the flowchart of FIG. 27 is described with respect to conversational and spatial interfaces, analogous methods may be applied to any modality described herein and are also within the scope of the current invention.

FIG. 28 shows a flowchart that details a process for digital engineering via a multimodal interface, in accordance with the examples disclosed herein. At step 2802, the system receives, through a multimodal interface, a first input of a first type and a second input of a second type. The first type and second type may be different modalities. At step 2804, the system modifies, based on either first input or the second input, a digital model representation representing at least a portion of a digital object in a digital model platform. In some embodiments, the digital object is a live digital object. In other embodiments, the digital object is a digital twin. In one embodiment, the digital object is a digital twin associated with a physical twin. Finally, at step 2806, the system provides feedback to a user based on the modifying.

Exemplary Conversational Interface Embodiments

One embodiment of the present disclosure pertains to a system and method for providing a conversational interface to a digital engineering, or digital model, platform. This system and method enable users to interact with the digital engineering platform using text (natural language) and/or voice commands, thereby enhancing user experience and efficiency. The disclosed system and method are merely illustrative of the numerous and varied other embodiments that may constitute applications of the principles of the disclosure.

A first embodiment of the conversational interface to a digital engineering platform is a software application that can be installed on a computing device. The software application includes a voice recognition module, a natural language processing module, and an interface module. The voice recognition module is configured to receive and interpret voice commands from a user. The natural language processing module is configured to understand the intent of the user's voice commands and translate them into commands that the digital engineering platform can understand. The interface module is configured to communicate these commands to the digital engineering platform and receive responses from the platform.

The operation of the first embodiment begins when a user issues a voice command to the software application. The voice recognition module receives and interprets the voice command. The natural language processing module then understands the intent of the voice command and translates it into a command for the digital engineering platform. The interface module communicates this command to the digital engineering platform and receives a response from the platform. The response is then communicated back to the user in a conversational manner. This embodiment provides the advantage of allowing users to interact with the digital engineering platform in a more natural and intuitive manner compared to existing methods, such as typing complex commands or using a graphical user interface.

In some embodiments, the voice commands can be typed as plain text in a natural language interface, similar to a chatbot.

A second embodiment of the conversational interface to a digital engineering platform is a hardware device that includes a microphone, a speaker, a processor, and a memory. The microphone is configured to receive voice commands from a user. The speaker is configured to communicate responses from the digital engineering platform to the user. The processor is configured to execute a software application stored in the memory. The software application includes a voice recognition module, a natural language processing module, and an interface module, similar to the first embodiment.

The operation of the second embodiment begins when a user issues a voice command to the hardware device. The microphone receives the voice command and the processor executes the software application to interpret the voice command, understand the intent of the voice command, translate it into a command for the digital engineering platform, communicate the command to the digital engineering platform, and receive a response from the platform. The speaker then communicates the response back to the user in a conversational manner. This embodiment provides the advantage of being a standalone device that can be used to interact with the digital engineering platform without the need for a cloud connection to a separate computing device.

A third embodiment of the conversational interface to a digital engineering platform is a cloud-based system. This system includes a voice recognition module, a natural language processing module, and an interface module, similar to the first embodiment. The cloud-based system allows for the processing and interpretation of voice commands to be performed remotely, reducing the computational load on the user's device.

The operation of the third embodiment begins when a user issues a voice command to the cloud-based system. The voice recognition module receives and interprets the voice command. The natural language processing module then understands the intent of the voice command and translates it into a command for the digital engineering platform. The interface module communicates this command to the digital engineering platform and receives a response from the platform. The response is then communicated back to the user in a conversational manner. This embodiment provides the advantage of reducing the computational load on the user's device, allowing for more complex operations to be performed.

The disclosed systems and methods provide several advantages over existing conversational and voice interfaces. Firstly, they are specifically designed for digital engineering platforms, allowing for the execution of complex operations and the use of technical language. Secondly, they provide a more intuitive and efficient way for users to interact with their digital models and software tools, enhancing user experience and productivity. Thirdly, they are adaptable, capable of learning from the user's voice and speech patterns to improve accuracy and efficiency over time.

FIG. 29 is an exemplary flow chart showing a process for digital engineering via a conversational interface, in accordance with some embodiments of the present invention. At step 2902, the system engages in a dialogue with a user using natural language, based on interpreted voice or text commands via a conversational interface module. At step 2904, the system executes actions on a digital model platform based on the dialogue with the user via a digital model platform interface module. The execution of the actions on the digital model platform may include modifying a digital model representation representing at least a portion of a digital object. Finally, at step 2906, the system controls the conversational interface module and the digital model platform interface module via a processor. Note that conversational interfaces may be combined with any other multimodal modality, and that such combinations are also within the scope of the present invention, as described herein.

Alternative Embodiments

Various alternative embodiments are described next. In one aspect or in one embodiment, a system for interacting with a live digital object is provided herein, the system including at least one processor and at least one memory storing program code, the program code executable by the at least one processor to cause the at least one processor to execute a process for interacting with the live digital object, the program code including code to perform the aforementioned steps.

In one embodiment, a process for digital review is provided, where the program code further includes code to send a modified digital artifact (modified by a first user) to a second user, receive an instruction from the second user (e.g., an approval or a denial), and further modify the modified digital artifact based on the instruction from the second user.

In one embodiment, the program code further includes code to send the modified digital artifact to a second user, receive a second security level from the second user, determine a second modification permission for the second user, receive a modification instruction from the second user, and generate a second modified digital artifact from the modified digital artifact based on the modification instruction and the second modification permission.

In one embodiment, modifications or modification suggestions may be exchanged between the first and second users involving more than one digital artifact. In this embodiment, the live digital object may thus include a second digital artifact accessed through a second model representation. The program code may further include code to receive a second user input on the live digital object from the second user, where the second user input is conversational or spatial. The program code may include code to further modify, based on the second user input, the second digital artifact to generate a second modified digital artifact.

In some embodiments, the system is configured to learn from a given user's voice and speech patterns to improve accuracy and efficiency over time. In such embodiments, a voice recognition module may further be configured to adapt to the given user's voice and speech patterns over time.

In some embodiments, the live digital object is a live digital space displaying one or more documents and one or more applications over a 3D spatial display.

In some embodiments, the digital thread controlling a live digital object that is ZT-compliant may include instructions to regularly verify (within frequent time intervals) that the user access and/or modification permission is current. The digital thread may also include instructions to condition any update of the digital artifact to such a verification of the current access and/or modification permission. Furthermore, the digital thread may also include instructions to display a redacted version of the digital artifact if a user permission is no longer current. In other embodiments, a generic live digital object may update without permission verification.

In some embodiments, the system provides feedback to the first user based on their modification of the digital artifact. In some embodiments, the feedback may include a message indicating that the digital thread is broken or dysfunctional, or that the artifact may not be modified for permission reasons or other reasons. In one embodiment, the feedback from the system comprises an error associated with the digital model and a solution to the error.

In some embodiments, a first user receives a comment from a second user regarding a digital artifact.

In one embodiment, the NLP module is further configured to provide feedback to the user regarding the execution of an action on the digital platform.

In one embodiment, a ML model with access to the communication between a user and the digital platform is further configured to learn from the dialogue with the user to improve the execution of actions over the digital platform.

In one embodiment, the interconnected digital platform includes a chatbot module configured to receive and interpret text prompts from a user.

In one embodiment, the program code further includes code to receive and interpret text prompts from a user.

In various embodiments, a digital thread may include a first and a second orchestration script, where the first orchestration script is generated, modified, and/or run by a first remote user while the second orchestration script is simultaneously generated, modified, and/or run by a second remote user.

Machine Learning (ML) and Neural Networks

Machine learning (ML) algorithms are characterized by the ability to improve their performance at a task over time without being explicitly programmed with the rules to perform that task (i.e., learn). An ML model is the output generated when a ML algorithm is trained on data. As described herein, embodiments of the present invention use one or more artificial intelligence (AI) and ML algorithms to interact with the live digital object or perform multimodal operations, including script, twin, or model updates. Various exemplary ML algorithms are within the scope of the present invention. The following description describes illustrative ML techniques for implementing various embodiments of the present invention.

Neural Networks

A neural network is a computational model including interconnected units called "neurons" that work together to process information. It is a type of ML algorithm that is particularly effective for recognizing patterns and making predictions based on complex data. Neural networks are widely used in various applications such as image and speech recognition and natural language processing, due to their ability to learn from large amounts of data and improve their performance over time. FIG. 30 describes neural network operation fundamentals, according to exemplary embodiments of the present invention.

FIG. 30 shows a single-layered neural network, also known as a single-layer perceptron. The operation of a single-layered neural network involves the following steps:

1. Input: Receiving a DE input vector v 3004 with elements $v_j$, with $j \in [1, n]$ representing the $j^{th}$ DE input, and where each element of the vector corresponds to an element 3006 in the input layer. For an exemplary neural network model trained to update an IDEP script for multimodal operations, the DE input vector v 3004 may take the form of a user prompt. A DE input can be a user prompt, a DE document, a DE model, DE program code, system data from the IDEP, and/or any useful form of data in digital engineering.
2. Transfer Function: Multiplying each element of the DE input vector by a corresponding weight $w_j$ 3008. These weighted inputs are then summed together as the transfer function, yielding the net input to the activation function $$\sum_{j=1}^{n} v_j \cdot w_j 3010.$$

Each neuron in a neural network may have a bias value 3012, which is added to the weighted sum of the inputs to that neuron. Both the weights and bias values are learned during the training process. The purpose of the bias is to provide every neuron with a trainable constant value that can help the model fit the data better. With biases, the net input to the activation function is $$\sum_{j=1}^{n} \{v_j \cdot w_j\} + b.$$

In the exemplary neural network model described above (e.g., to implement a script-updating ML model), the value of the transfer function 3010 may represent the probability that a given script update will be output.

3. Activation Function: Passing the net input through an activation function 3014. The activation function a determines the activation value o 3018, which is the output of the neuron. It is typically a non-linear function such as a sigmoid or ReLU (Rectified Linear Unit) function. The threshold θ 3016 of the activation function is a value that determines whether a neuron is activated or not. In some activation functions, such as the step function, the threshold is a specific value. If the net input is above the threshold, the neuron outputs a constant value, and if it's below the threshold, it outputs a zero value. In other activation functions, such as the sigmoid or ReLU (Rectified Linear Unit) functions, the threshold is not a specific value but rather a point of transition in the function's curve.

In the exemplary neural network model described above, the activation function σ 3014 may be a ReLU that is activated at a threshold θ 3016 representing the minimum probability for a given script update to be implemented. Hence, the activation function 3014 will yield the given script update when the implementation likelihood exceeds the threshold θ 3016.

4. Output: The activation value o 3018 is the output of the activation function. This value is what gets passed on to the next layer in the network or becomes the final DE output in the case of the last layer. In the exemplary neural network model described above (e.g., to implement a script-updating ML model), multiple activation values o 3018 from multiple layers of a neural network may be combined to generate a text variable representing the script update that has the highest likelihood of satisfying a given DE input 3004. A DE output can also be an updated twin configuration, digital twin, physical twin, DE document, DE model, DE program code, or any useful form of data in digital engineering.

In the exemplary neural network discussions of FIG. 30, examples are provided with respect to a particular script-updating ML model implementation using neural networks. Analogous approaches can be used to implement model-updating ML models, feedback ML models, and any other NN-based components of the systems and subsystems described herein.

FIG. 31 shows an overview of an IDEP neural network training process, according to exemplary embodiments of the present invention.

The training of the IDEP neural network involves repeatedly updating the weights and biases 3110 of the network to minimize the difference between the predicted output 3104 and the true or target output 3106, where the predicted output 3104 is the result produced by the network when a set of inputs from a dataset is passed through it. The predicted output 3104 of an IDEP neural network 3102 corresponds to the DE output 3018 of the final layer of the neural network. The true or target output 3106 is the true desired result. The difference between the predicted output and the true output is calculated using a loss function 3108, which quantifies the error made by the network in its predictions.

The loss function is a part of the cost function 3108, which is a measure of how well the network is performing over the whole dataset. The goal of training is to minimize the cost function 3108. This is achieved by iteratively adjusting the weights and biases 3110 of the network in the direction that leads to the steepest descent in the cost function. The size of these adjustments is determined by the learning rate 3108, a hyperparameter that controls how much the weights and biases change in each iteration. A smaller learning rate means smaller changes and a slower convergence towards the minimum of the cost function, while a larger learning rate means larger changes and a faster convergence, but with the risk of overshooting the minimum.

For an IDEP neural network model 3102 based on the exemplary neural network model (e.g., to implement a script-updating ML model) discussed above in the context of FIG. 30, and trained to determine whether a given script update is to be implemented for multimodal operations:

the weights and biases 3110 are the IDEP neural network's hyperparameters that get updated at each iteration of the training process, as discussed in the context of FIG. 30, the predicted output 3104 is the binary prediction on whether a given script update is to be implemented based on a sample multimodal requirement, (or a normalized score ranking prioritizing the order of script updates to be displayed to the user), the true/target output 3106 is the correct decision (i.e., sample ground truth output) on whether to implement the given script update based on the sample multimodal requirement, the loss function 3108 is the difference between the evaluation and the true output (e.g., a binary error indicating whether the IDEP neural network's decision was correct), the cost function 3108 is the average of all errors over a training dataset including sample multimodal requirements and corresponding implementations of the given script update, and the learning rate 3108 is the rate at which the cost function 3108 in consecutive training epochs approaches a pre-specified tolerable cost function.

Neural network training combines the processes of forward propagation and backpropagation. Forward propagation is the process where the input data is passed through the network from the input layer to the output layer. During forward propagation, the weights and biases of the network are used to calculate the output for a given input. Backpropagation, on the other hand, is the process used to update the weights and biases 3110 of the network based on the error (e.g., cost function) 3108 of the output. After forward propagation through the IDEP neural network 3102, the output 3104 of the network is compared with true output 3106, and the error 3108 is calculated. This error is then propagated back through the network, starting from the output layer and moving towards the input layer. The weights and biases 3110 are adjusted in a way that minimizes this error. This process is repeated for multiple iterations or epochs until the network is able to make accurate predictions.

The neural network training method described above, in which the network is trained on a labeled dataset (e.g., sample pairs of input user prompts and corresponding output recommendations), where the true outputs are known, is called supervised learning. In unsupervised learning, the network is trained on an unlabeled dataset, and the goal is to discover hidden patterns or structures in the data. The network is not provided with the true outputs, and the training is based on the intrinsic properties of the data. Furthermore, reinforcement learning is a type of learning where an agent learns to make decisions from the rewards or punishments it receives based on its actions. Although reinforcement learning does not typically rely on a pre-existing dataset, some forms of reinforcement learning can use a database of past actions, states, and rewards during the learning process. Any neural network training method that uses a labeled dataset is within the scope of the methods and systems described herein, as is clear from the overview below.

FIG. 32 provides additional details on the training process or an IDEP machine learning model, according to exemplary embodiments of the present invention.

Transformer Model Architecture

The transformer architecture is a neural network design that was introduced in the paper "*Attention is All You Need*" by Vaswani et al. published in June 2017 (available at arxiv(dot)org), and incorporated herein by reference as if fully set forth herein. Large Language Models (LLMs) heavily rely on the transformer architecture.

The architecture (see FIG. 1 in Vaswani et al.) is based on the concept of "attention", allowing the model to focus on different parts of the input sequence when producing an output. Transformers consist of an encoder and a decoder. The encoder processes the input data and the decoder generates the output. Each of these components is made up of multiple layers of self-attention and point-wise, fully connected layers.

The layers of self-attention in the transformer model allow it to weigh the relevance of different parts of the input sequence when generating an output, thereby enabling it to capture long-range dependencies in the data. On the other hand, the fully connected layers are used for transforming the output of the self-attention layers, adding complexity and depth to the model's learning capability.

The transformer model is known for its ability to handle long sequences of data, making it particularly effective for tasks such as machine translation and text summarization. In the transformer architecture, positional encoding is used to give the model information about the relative positions of the words in the input sequence. Since the model itself does not have any inherent sense of order or sequence, positional encoding is a way to inject some order information into the otherwise order-agnostic attention mechanism.

The Embeddings Vector Space

In the context of neural networks, tokenization refers to the process of converting the input and output spaces, such as natural language text or programming code, into discrete units or "tokens". This process allows the network to effectively process and understand the data, as it transforms complex structures into manageable, individual elements that the model can learn from and generate.

In the training of neural networks, embeddings serve as a form of distributed word representation that converts discrete categorical variables (i.e., tokens) into a continuous vector space (i.e., embedding vectors). This conversion process captures the semantic properties of tokens, enabling tokens with similar meanings to have similar embeddings. These embeddings provide a dense representation of tokens and their semantic relationships. Embeddings are typically represented as vectors, but may also be represented as matrices or tensors.

The input of a transformer typically requires conversion from an input space (e.g., the natural language token space) to an embeddings space. This process, referred to as "encoding", transforms discrete inputs (tokens) into continuous vector representations (embeddings). This conversion is a prerequisite for the transformer model to process the input data and understand the semantic relationships between tokens (e.g., words). Similarly, the output of a transformer typically requires conversion from the embeddings space to an output space (e.g., natural language tokens, programming code tokens, etc.), in a process referred to as "decoding". Therefore, the training of a neural network and its evaluation (i.e., its use upon deployment) both occur within the embeddings space.

In this document, the processes of tokenization, encoding, decoding, and de-tokenization may be assumed. In other words, the processes described below occur in the "embeddings space". Hence, while the tokenization and encoding of training data and input prompts may not be represented or discussed explicitly, they may nevertheless be implied. Similarly, the decoding and de-tokenization of neural network outputs may also be implied.

Training and Fine-Tuning Machine Learning (ML) Modules

FIG. 32 is an illustrative flow diagram showing the different phases and datasets involved in training an IDEP ML model, according to exemplary embodiments of the present invention.

The training process starts at step 3210 with DE data acquisition, retrieval, assimilation, or generation. At step 3220, acquired DE data are pre-processed, or prepared. At step 3230, the IDEP ML model is trained using training data 3225. At step 3240, the IDEP ML model is evaluated, validated, and tested, and further refinements to the IDEP ML model are fed back into step 3230 for additional training. Once its performance is acceptable, at step 3250, optimal IDEP ML parameters are selected.

Training data 3225 is a dataset containing multiple instances of system inputs (e.g., user inputs, user prompts, digital twin/physical twin performance data, simulation data, and/or certification/requirement documents, etc.) and correct outcomes (e.g., updated script, DE model, twin configuration, digital twin, physical twin, etc.). It trains the IDEP ML model to optimize the performance for a specific target task, such as the prediction of a specific target output data field within a specific target document. In FIG. 32, training data 3225 may also include subsets for validating and testing the IDEP ML model, as part of the training iterations 3230 and 3240. For an NN-based ML model, the quality of the output may depend on (a) NN architecture design and hyperparameter configurations, (b) NN coefficient or parameter optimization, and (c) quality of the training data set. These components may be refined and optimized using various methods. For example, training data 3225 may be expanded via a document database augmentation process.

In some embodiments, an additional fine-tuning 3260 phase including iterative fine-tuning 3260 and evaluation, validation, and testing 3270 steps, is carried out using fine-tuning data 3255. Fine-tuning in machine learning is a process that involves taking a selected 3250 pre-trained model and further adjusting or "tuning" its parameters to better suit a specific task or fine-tuning dataset 3255. This technique is particularly useful when dealing with deep learning models that have been trained on large, general training datasets 3225 and are intended to be applied to more specialized tasks or smaller datasets. The objective is to leverage the knowledge the model has already acquired during its initial training (often referred to as transfer learning) and refine it so that the model performs better on a more specific task at hand.

The fine-tuning process typically starts with a model that has already been trained on a large benchmark training dataset 3225, such as ImageNet (available at image-net(dot) org) for image recognition tasks. The model's existing weights, which have been learned from the original training, serve as the starting point. During fine-tuning, the model is trained further on a new fine-tuning dataset 3255, which may contain different classes or types of data than the original training set. This additional training phase allows the model to adjust its weights to better capture the characteristics of the new fine-tuning dataset 3255, thereby improving its performance on the specific task it is being fine-tuned for.

In some embodiments, additional test and validation 3280 phases are carried out using DE test and validation data 3275. Testing and validation of a ML model both refer to the process of evaluating the model's performance on a separate dataset 3275 that was not used during training, to ensure that it generalizes well to new unseen data. Validation of a ML model helps to prevent overfitting by ensuring that the model's performance generalizes beyond the training data.

While the validation phase is considered part of ML model development and may lead to further rounds of fine-tuning, the testing phase is the final evaluation of the model's performance after the model has been trained and validated. The testing phase provides an unbiased assessment of the final model's performance that reflects how well the model is expected to perform on unseen data, and is usually carried out after the model has been finalized to ensure the evaluation is unbiased.

Once the IDEP ML model is trained 3230, selected 3250, and optionally fine-tuned 3260 and validated/tested 3280, the process ends with the deployment 3290 of the IDEP ML model. Deployed IDEP ML models 3295 usually receive new DE data 3285 that was pre-processed 3280.

In machine learning, data pre-processing 3220 is tailored to the phase of model development. During model training 3230, pre-processing involves cleaning, normalizing, and transforming raw data into a format suitable for learning patterns. For fine-tuning 3260, pre-processing adapts the data to align with the distribution of the specific targeted task, ensuring the pre-trained model can effectively transfer its knowledge. Validation 3280 pre-processing mirrors that of training to accurately assess model generalization without leakage of information from the training set. Finally, in deployment 3290, pre-processing ensures real-world data matches the trained model's expectations, often involving dynamic adjustments to maintain consistency with the training and validation stages.

Machine Learning Algorithms

Various exemplary ML algorithms are within the scope of the present invention. Such machine learning algorithms include, but are not limited to, random forest, nearest neighbor, decision trees, support vector machines (SVM), Adaboost, gradient boosting, Bayesian networks, evolutionary algorithms, various neural networks (including deep learning networks (DLN), convolutional neural networks (CNN), and recurrent neural networks (RNN)), etc.

ML modules based on transformers and Large Language Models (LLMs) are particularly well suited for the tasks described herein. The online article "*Understanding Large Language Models—A Transformative Reading List*", by S. Raschka (posted Feb. 7, 2023, available at sebastianraschka (dot)com), describes various LLM architectures that are within the scope of the methods and systems described herein, and is hereby incorporated by reference in its entirety herein as if fully set forth herein.

The input to each of the listed ML modules is a feature vector including the input data described above for each ML module. The output of the ML module is a feature vector including the corresponding output data described above for each ML module.

Prior to deployment, each of the ML modules listed above may be trained on one or more respective sample input datasets and on one or more corresponding sample output datasets. The input and output training datasets may be generated from a database containing a history of input instances (e.g., user inputs, user prompts, digital twin/physical twin performance data, simulation data, and/or certification/requirement documents) and output instances (e.g., updated scripts, DE models, twin configurations, digital twins, physical twins), or may be generated synthetically by subject matter experts.

Exemplary System Architecture

An exemplary embodiment of the present disclosure may include one or more servers (management computing entities), one or more networks, and one or more clients (user computing entities). Each of these components, entities, devices, and systems (similar terms used herein interchangeably) may be cloud-based, and in direct or indirect communication with, for example, one another over the same or different wired or wireless networks. All of these devices, including servers, clients, and other computing entities or nodes may be run internally by a customer (in various architecture configurations including private cloud), internally by the provider of the IDEP (in various architecture configurations including private cloud), and/or on the public cloud.

FIG. 33 provides illustrative schematics of a server (management computing entity) 3310 connected via a network 3320 to a client (user computing entity) 3330 used for documentation within an interconnected digital engineering platform (IDEP), according to some embodiments of the present invention. While FIG. 33 illustrates the various system entities as separate, standalone entities, the various embodiments are not limited to this particular architecture. Additionally, the terms "client device", "client computing entity", "edge device", and "edge computing system" are equivalent and are used interchangeably herein.

Exemplary Management Computing Entity

An illustrative schematic is provided in FIG. 33 for a server or management computing entity 3310. In general, the terms computing entity, computer, entity, device, system, and/or similar words used herein interchangeably may refer to, for example, one or more cloud servers, computers, computing entities, desktop computers, mobile phones, tablets, phablets, notebooks, laptops, distributed systems, gaming consoles, watches, glasses, iBeacons, proximity beacons, key fobs, radio frequency identification (RFID) tags, earpieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, crawling, displaying, storing, determining, creating/generating, monitoring, evaluating, and/or comparing (similar terms used herein interchangeably). In one embodiment, these functions, operations, and/or processes can be performed on data, content, and/or information (similar terms used herein interchangeably), as they are used in a digital engineering process.

In one embodiment, management computing entity 3310 may be equipped with one or more communication interfaces 3312 for communicating with various computing entities, such as by exchanging data, content, and/or information (similar terms used herein interchangeably) that can be transmitted, received, operated on, processed, displayed, stored, and/or the like. For instance, management computing entity 3310 may communicate with one or more client computing devices such as 3330 and/or a variety of other computing entities. Network or communications interface 3312 may support various wired data transmission protocols including, but not limited to, Fiber Distributed Data Interface (FDDI), Digital Subscriber Line (DSL), Ethernet, Asynchronous Transfer Mode (ATM), frame relay, and data over cable service interface specification (DOCSIS). In addition, management computing entity 3310 may be capable of wireless communication with external networks, employing any of a range of standards and protocols, including but not limited to, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High-Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

As shown in FIG. 33, in one embodiment, management computing entity 3310 may include or be in communication with one or more processors 3314 (also referred to as processors and/or processing circuitry, processing elements, and/or similar terms used herein interchangeably) that communicate with other elements within management computing entity 3310, for example, via a bus. As will be understood, processor 3314 may be embodied in a number of different ways. For example, processor 3314 may be embodied as one or more complex programmable logic devices (CPLDs), microprocessors, multi-core processors, co-processing entities, application-specific instruction-set processors (ASIPs), graphical processing units (GPUs), microcontrollers, and/or controllers. The term circuitry may refer to an entire hardware embodiment or a combination of hardware and computer program products. Thus, processor 3314 may be embodied as integrated circuits (ICs), application-specific integrated circuits (ASICs), field-programmable gate arrays (FPGAs), programmable logic arrays (PLAs), hardware accelerators, other circuitry, and/or the like. As will therefore be understood, processor 3314 may be configured for a particular use or configured to execute instructions stored in volatile or non-volatile (or non-transitory) media 3316 and 3318, or otherwise accessible to processor 3314. As such, whether configured by hardware or computer program products, or by a combination thereof, processor 3314 may be capable of performing steps or operations according to embodiments of the present disclosure when configured accordingly.

In one embodiment, management computing entity 3310 may further include or be in communication with non-transitory memory 3318 (also referred to as non-volatile media, non-volatile storage, non-transitory storage, physical storage media, memory, memory storage, and/or memory circuitry—similar terms used herein interchangeably). In one embodiment, the non-transitory memory or storage may include one or more non-transitory memory or storage media, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile (or non-transitory) storage or memory media may store cloud storage buckets, databases, database instances, database management systems, data, applications, programs, program modules, scripts, source code, object code, byte code, compiled code, interpreted code, machine code, executable instructions, and/or the like. The term database, database instance, and/or database management system (similar terms used herein interchangeably) may refer to a collection of records or data that is stored in a computer-readable storage medium using one or more database models, such as a hierarchical database model, network model, relational model, entity-relationship model, object model, document model, semantic model, graph model, and/or the like.

In one embodiment, management computing entity 3310 may further include or be in communication with volatile memory 3316 (also referred to as volatile storage, memory, memory storage, memory and/or circuitry—similar terms used herein interchangeably). In one embodiment, the volatile storage or memory may also include one or more volatile storage or memory media, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, processor 3314. Thus, the cloud storage buckets, databases, database instances, database management systems, data, applications, programs, program modules, scripts, source code, object code, byte code, compiled code, interpreted code, machine code, executable instructions, and/or the like may be used to control certain aspects of the operation of management computing entity 3310 with the assistance of processor 3314 and an operating system.

Although not shown, management computing entity 3310 may include or be in communication with one or more input elements, such as a keyboard input, a mouse input, a touch screen/display input, motion input, movement input, audio input, pointing device input, joystick input, keypad input, and/or the like. Management computing entity 3310 may also include or be in communication with one or more output elements, also not shown, such as audio output, visual output, screen/display output, motion output, movement output, spatial computing output (e.g., virtual reality or augmented reality), and/or the like.

As will be appreciated, one or more of the components of management computing entity 3310 may be located remotely from other management computing entity components, such as in a distributed system. Furthermore, one or more of the components may be combined and additional components performing functions described herein may be included in management computing entity 3310. Thus, management computing entity 3310 can be adapted to accommodate a variety of needs and circumstances. As will be recognized, these architectures and descriptions are provided for exemplary purposes only and are not limited to the various embodiments.

Exemplary User Computing Entity

A user may be a human individual, a company, an organization, an entity, a department within an organization, a representative of an organization and/or person, an artificial user such as algorithms, artificial intelligence, or other software that interfaces, and/or the like. FIG. 33 further provides an illustrative schematic representation of a client user computing entity 3330 that may be used in conjunction with embodiments of the present disclosure. In various embodiments, computing device 3330 may be a general-purpose computing device with dedicated modules for performing digital engineering-related tasks. It may alternatively be implemented in the cloud, with logically and/or physically distributed architectures.

As shown in FIG. 33, user computing entity 3330 may include a power source 3331, an antenna 3370, a radio transceiver 3332, a network and communication interface 3334, and a processor unit 3340 that provides signals to and receives signals from the network and communication interface. The signals provided to and received may include signaling information in accordance with air interface standards of applicable wireless systems. In this regard, user computing entity 3330 may be capable of operating with one or more air interface standards, communication protocols, modulation types, and access types. More particularly, user computing entity 3330 may operate in accordance with any of a number of wireless communication standards and protocols, such as those described above with regard to management computing entity 3310. Similarly, user computing entity 3330 may operate in accordance with multiple wired communication standards and protocols, such as those described above with regard to management computing entity 3310.

Via these communication standards and protocols, user computing entity 3330 may communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). User computing entity 3330 may also download changes, add-ons, and updates, for instance, to its firmware, software (e.g., including executable instructions, applications, program modules), and operating system.

In some implementations, processing unit 3340 may be embodied in several different ways. For example, processing unit 3340 may be embodied as one or more complex programmable logic devices (CPLDs), microprocessors, multi-core processors, co-processing entities, application-specific instruction-set processors (ASIPs), graphical processing units (GPUs), microcontrollers, and/or controllers. Further, processing unit 3340 may be embodied as one or more other processing devices or circuitry. The term circuitry may refer to an entirely hardware embodiment or a combination of hardware and computer program products. Thus, processing unit 3340 may be embodied as integrated circuits, application specific integrated circuits (ASICs), field programmable gate arrays (FPGAs), programmable logic arrays (PLAs), hardware accelerators, other circuitry, and/or the like. As will therefore be understood, processing unit 3340 may be configured for a particular use or configured to execute instructions stored in volatile or non-volatile media or otherwise accessible to the processing unit. As such, whether configured by hardware or computer program products, or by a combination thereof, processing unit 3340 may be capable of performing steps or operations according to embodiments of the present invention when configured accordingly.

In some embodiments, processing unit 3340 may comprise a control unit 3342 and a dedicated arithmetic logic unit (ALU) 3344 to perform arithmetic and logic operations. In some embodiments, user computing entity 3330 may comprise a graphics processing unit (GPU) 3346 for specialized parallel processing tasks, and/or an artificial intelligence (AI) module or accelerator 3348, also specialized for applications including artificial neural networks and machine learning. In some embodiments, processing unit 3340 may be coupled with GPU 3346 and/or AI accelerator 3348 to distribute and coordinate digital engineering related tasks.

In some embodiments, computing entity 3330 may include a user interface, including an input interface 3350 and an output interface 3352, each coupled to processing unit 3340. User input interface 3350 may comprise any of a number of devices or interfaces allowing computing entity 3330 to receive data, such as a keypad (hard or soft), a touch display, a mic/speaker for voice/speech/conversation, a camera for motion or posture interfaces, and appropriate sensors for spatial computing interfaces. User output interface 3352 may comprise any of a number of devices or interfaces allowing computing entity 3330 to provide information to a user, such as through the touch display, or a speaker for audio outputs. In some embodiments, output interface 3352 may connect computing entity 3330 to an external loudspeaker or projector, for audio and/or visual output. In some embodiments, user interfaces 3350 and 3352 integrate multimodal data in an interface that caters to human users. Some examples of human interfaces include a dashboard-style interface, a workflow-based interface, conversational interfaces, and spatial-computing interfaces. As shown in FIG. 5, computing entity 3330 may also support bot/algorithmic interfaces such as code interfaces, text-based API interfaces, and the like.

User computing entity 3330 can also include volatile and/or non-volatile storage or memory 3360, which can be embedded and/or may be removable. For example, the non-volatile or non-transitory memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile (or non-transitory) storage or memory 3360 may store an operating system 3362, application software 3364, data 3366, databases, database instances, database management systems, data, applications, programs, program modules, scripts, source code, object code, byte code, compiled code, interpreted code, machine code, executable instructions, and/or the like to implement functions of user computing entity 3330. As indicated, this may include a user application that is resident on the entity or accessible through a browser or other user interface for communicating with management computing entity 3310 and/or various other computing entities.

In some embodiments, user computing entity 3330 may include one or more components or functionalities that are the same or similar to those of management computing entity 3310, as described in greater detail above. As will be recognized, these architectures and descriptions are provided for exemplary purposes only and are not limited to the various embodiments.

In some embodiments, computing entities 3310 and/or 3330 may communicate to external devices like other computing devices and/or access points to receive information such as software or firmware, or to send information from the memory of the computing entity to external systems or devices such as servers, computers, smartphones, and the like.

In some embodiments, two or more computing entities such as 3310 and/or 3330 may establish connections using a network such as 3320 utilizing any of the networking protocols listed previously. In some embodiments, the computing entities may use network interfaces such as 3312 and 3334 to communicate with each other, such as by communicating data, content, information, and/or similar terms used herein interchangeably that can be transmitted, received, operated on, processed, displayed, stored, and/or the like.

Additional Hardware & Software Implementation Details

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them.

Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The terms "processor", "computer," "data processing apparatus", and the like encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, code, program code, and the like) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto optical disks, or optical disks. However, a computer need not have such devices. Devices suitable for storing computer program instructions and information/data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a backend component, e.g., as an information/data server, or that includes a middleware component, e.g., an application server, or that includes a frontend component, e.g., a client computer having a graphical user interface or a web browser through which a user can interact with an implementation of the subject matter described herein, or any combination of one or more such back end, middleware, or front end components. The components of the system may be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship with each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

In general, the method executed to implement the embodiments of the invention, may be implemented as part of an operating system or a specific application, component, program, object, module, or sequence of instructions referred to as "program code," "computer program(s)", "computer code(s)," and the like. The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually affect the distribution. Examples of computer-readable media include but are not limited to recordable type media such as volatile and non-volatile (or non-transitory) memory devices, floppy and other removable disks, hard disk drives, optical disks, which include Compact Disk Read-Only Memory (CD ROMS), Digital Versatile Disks (DVDs), etc., as well as digital and analog communication media.

Terminology

Some illustrative terminologies used with the IDMP/IDEP are provided below to assist in understanding the present invention, but these are not to be read as restricting the scope of the present invention. The terms may be used in the form of nouns, verbs, or adjectives, within the scope of the definition.

- Digital engineering (DE): According to the Defense Acquisition University (DAU) and the Department of Defense (DOD) Digital Engineering Strategy published in 2018, digital engineering is "an integrated digital approach to systems engineering, using authoritative sources of systems' data and models as a continuum across disciplines to support lifecycle activities from concept through disposal." Digital engineering incorporates digital technological innovations into an integrated, model-based approach that empowers a paradigm shift from the traditional design-build-test methodology of systems engineering to a new model-analyze-build methodology, thus enabling systems design, prototyping, and testing all in a virtual environment.
- DE data: Digital engineering (DE) data comprises project management, program management, product management, design review, and/or engineering data.
- DE data field: A data field for DE data, for example, in a DE document template.
- Phases: The stages within a DE product lifecycle, including but not limited to, stakeholder analysis, concept studies, requirements definition, preliminary design and technology review, system modeling, final design, implementation, system assembly and integration, prototyping, verification and validation on system, subsystem, and component levels, and operations and maintenance.

DE model: A computer-generated model that represents characteristics or behaviors of a complex product, system, or process. A DE model can be created or modified using a DE tool, and a DE model may be represented by one or more DE model files. A DE model file is the computer model file created or modified using the DE tool. In the present disclosure, the terms "digital model", "DE model" and "DE model file" may be used interchangeably, as the context requires. A DE model within the IDEP as disclosed herein refers to any digital file uploaded onto the platform, including documents that are appropriately interpreted, as defined below. For example, a computer-aided design (CAD) file, a Systems Modeling Language (SysML) file, a Systems Requirements Document (SDR) text file, and a Neural Network Model JSON file may each be considered a DE model, in various embodiments of the present invention. A DE model may be machine-readable only, may be human-readable as well but written in programming codes, or may be human-readable and written in natural language-based texts. For example, a word-processing document including a technical specification of a product, or a spreadsheet file including technical data about a product, may also be considered a DE model. A DE model is a type of digital model, defined below. In general, any reference to a DE model in the specification and drawings may be considered equivalent to a reference to a digital model, and vice versa.

Interconnected Digital Engineering Platform (IDEP), also referred to as a "Digital Engineering and Certification Ecosystem": According to the DAU, a "DE ecosystem" is the "interconnected infrastructure, environment, and methodology (process, methods, and tools) used to store, access, analyze, and visualize evolving systems' data and models to address the needs of the stakeholders." Embodiments of the IDEP as disclosed herein comprise software platforms running on hardware to realize the aforementioned capabilities under zero-trust principles. Specifically, an embodiment of the IDEP is a software platform that interconnects a plurality of spliced DE model files through one or more software-defined digital threads (see FIGS. 1-4). A DE and certification ecosystem performs verification and validation tasks, defined next. An IDEP may be considered a type of Interconnected Digital Model Platform (IDMP) when one or more of the digital models are engineering or science related, the IDMP being defined below. In general, any reference to an IDEP in the specification and drawings can be considered equivalent to a reference to an IDMP, and vice versa, and any feature, embodiment, or description in relation to one applies analogously to the other. The terms "Interconnected" and "Integrated" are used interchangeably herein.

Verification: According to the DAU, verification "confirms that a system element meets design-to or build-to specifications. Through the system's life cycle, design solutions at all levels of the physical architecture are verified through a cost-effective combination of analysis, examination, demonstration, and testing." Verification refers to evaluating whether a product, service, or system meets specified requirements and is fit for its intended purpose, checking externally against customer or stakeholder needs. For example, in the aerospace industry, a verification process may include testing an aircraft component to ensure it can withstand the forces and conditions it will encounter during flight.

Validation: According to the DAU, validation is "1) the review and approval of capability requirement documents by a designated validation authority. 2) The process by which the contractor (or as otherwise directed by the DoD component procuring activity) tests a publication/technical manual for technical accuracy and adequacy. 3) The process of evaluating a system or software component during, or at the end of, the development process to determine whether it satisfies specified requirements." Thus, validation refers to evaluating whether the overall performance of a product, service, or system is suitable for its intended use, including its compliance with regulatory requirements, and its ability to meet the needs of its intended users, checking internally against specifications and regulations. For example, for an industrial product manufacturing, a validation process may include consumer surveys that inform product design, modeling and simulations for validating the design, prototype testing for failure limits and feedback surveys from buyers.

Common Verification & Validation (V&V) products: Regulatory and certification standards, compliances, calculations, and tests (e.g., for the development, testing, and certification of products and/or solutions) are referred to herein as "common V&V products."

DE tool: A tool or DE tool is a DE application software (e.g., a CAD software), computer program, and/or script that creates or manipulates a DE model during at least one stage or phase of a product lifecycle. A DE tool may comprise multiple functions or methods.

Application Programming Interface (API): A software interface that provides programmatic access to services by a software program, thus allowing application software to exchange data and communicate with each other using standardized requests and responses. It allows different programs to work together without revealing the internal details of how each works. A DE tool is typically provided with an API library for code-interface access.

Script: A computer-executable sequence of instructions that is interpreted and run within or carried out by another program, without compilation into a binary file to be run by itself through a computer processor without the support of other programs.

API scripts: Scripts that implement particular functions available via the IDMP/IDEP as disclosed herein. An API script may be an API function script encapsulated in a model splice, or an "orchestration script" or "platform script" that orchestrates a workflow through a digital thread built upon interconnected model splices.

Platform API or IDMP/IDEP API: A library of API scripts available on the IDMP/IDEP as disclosed herein.

API function scripts, "splice functions," "splice methods," "ISTARI functions," or "function nodes": A type of API scripts. When executed, an API function script inputs into or outputs from a DE model or DE model splice. An "input" function, input method, or "input node" allows updates or modifications to an input DE model. An "output" function, output method, or "output node" allows data extraction or derivation from an input DE model via its model splice. An API function script may invoke native API function calls of native DE tools, where the terms "native" and "primal" may refer to existing DE model files, functions, and API libraries associated with specific third-party DE tools, including both proprietary and open-source ones.

Endpoints: an endpoint in the context of software and networking is a specific digital location or destination where different software systems communicate with each other. It enables external systems to access the features or data of an application, operating system, or other services. An API endpoint is the point of interaction where APIs receive requests and return data in response. A software development kit (SDK) endpoint or SDK-defined endpoint similarly provides a service handle for use with an SDK. References to API endpoints in the present disclosure are equally applicable to SDK endpoints.

Artifact: According to the DAU, a digital artifact is "an artifact produced within, or generated from, a DE ecosystem" to "provide data for alternative views to visualize, communicate, and deliver data, information, and knowledge to stakeholders." In the present disclosure, a "digital artifact" or "artifact" is an execution result from an output API function script within a model splice. Multiple artifacts may be generated from a single DE model or DE model splice. In some embodiments, as a matter of design choice, a digital artifact is atomic and indivisible in terms of security levels, so that permissions for users to access and/or modify the digital artifact apply to the digital artifact as a whole, and may not apply to segments of the digital artifact. In other embodiments, a digital artifact includes segments that may have different access (e.g., viewing) and modification (e.g., updating) security levels. Consequently, for a given user, an "authorized artifact" for access is an artifact for which all segments fall under an access security level that allows the given user to access (e.g., view) it. Similarly, for a given user, an "authorized artifact" for modification is an artifact for which all segments fall under a modification security level that allows the given user to modify (e.g., update) it.

Model splice: Within the present disclosure, a "model splice", "model wrapper", or "model graft" of a given DE model file comprises locators to or copies of (1) DE model data or digital artifacts extracted or derived from the DE model file, including model metadata, and (2) splice functions (e.g., API function scripts) that can be applied to the DE model data. The splice functions provide unified and standardized input and output API endpoints for accessing and manipulating the DE model data. The DE model data are model-type-specific, and a model splice is associated with model-type-specific input and output schemas. One or more different model splices may be generated from the same input DE model file(s), based on the particular user application under consideration, and depending on data access restrictions. In some contexts, the shorter terms "splice", "wrapper", and/or "graft" are used to refer to spliced, wrapped, and/or grafted DE models.

Model representation: Within the present disclosure, "model representation" of a given DE model includes any embodiment of the engineering model in the form of DE model file(s), model splices, or collections of digital artifacts derived from the DE model. In some embodiments, a DE model representation comprises model-type-specific locators to DE model data and metadata, potentially including standardized input and output API endpoints for accessing and manipulating the DE model data. Discussions related to the usage of model splices in the present disclosure are applicable to any other forms of model representation as well.

Model splicing or DE model splicing: A process for generating a model splice from a DE model file. DE model splicing encompasses human-readable document model splicing, where the DE model being spliced is a human-readable text-based document.

Model splicer: Program code or script (uncompiled) that performs model splicing of DE models. A DE model splicer for a given DE model type, when applied to a specific DE model file of the DE model type, retrieves, extracts, or derives DE model data associated with the DE model file, generates and/or encapsulates splice functions and instantiates API endpoints according to input/output schemas.

Model splice linking: Generally, model splice linking refers to jointly accessing two or more DE model splices via API endpoints or splice functions. For example, data may be retrieved from one splice to update another splice (e.g., an input splice function of a first model splice calls upon an output splice function of a second model splice); data may be retrieved from both splices to generate a new output (e.g., output splice functions from both model splices are called upon); data from a third splice may be used to update both a first and a second splice (e.g., input splice functions from both model splices are called upon). In the present disclosure, "model linking" and "model splice linking" may be used interchangeably, as linked model splices map to correspondingly linked DE models.

Digital thread, Software-defined digital thread, Software-code-defined digital thread, or Software digital thread: According to the DAU, a digital thread is "an extensive, configurable and component enterprise-level analytical framework that seamlessly expedites the controlled interplay of authoritative technical data, software, information, and knowledge in the enterprise data-information-knowledge systems, based on the digital system model template, to inform decision makers throughout a system's lifecycle by providing the capability to access, integrate, and transform disparate data into actionable information." Within the IDEP as disclosed herein, a digital thread is a platform script that calls upon the platform API to facilitate, manage, or orchestrate a workflow through linked model splices to provide the aforementioned capabilities. That is, a digital thread within the IDEP is a computer-executable script that connects data from one or more DE models, data sources, or physical artifacts to accomplish a specific mission or business objective, and may be termed a "software-defined digital thread" or "software digital thread" that implements a communication framework or data-driven architecture that connects traditionally siloed DE models to enable seamless information flow among the DE models via model splices. In various embodiments, a digital thread associated with a digital twin is configured to execute a scripted workflow associated with the digital twin.

Tool linking: Similar to model splice linking, tool linking generally refers to jointly accessing two or more DE tools via model splices, where model splice functions that encapsulate disparate DE tool functions are called upon jointly to perform a DE task.

Zero-trust security: An information security principle based on the assumption of no implicit trust between any elements, agents, or users. Zero trust may be carried out by implementing systematic mutual authentication and least privileged access, typically through strict access control, algorithmic impartiality, and data isolation. Within the IDEP as disclosed herein, least privileged access through strict access control and data isolation may be implemented via model splicing and the IDEP system architecture.

Hyperscale capabilities: The ability of a system architecture to scale adequately when faced with massive demand.

IDEP enclave or DE platform enclave: A central command hub responsible for the management and functioning of DE platform operations. An enclave is an independent set of cloud resources that are partitioned to be accessed by a single customer (i.e., single-tenant) or market (i.e., multi-tenant) that does not take dependencies on resources in other enclaves.

IDEP exclave or DE platform exclave: A secondary hub situated within a customer environment to assist with customer DE tasks and operations. An exclave is a set of cloud resources outside enclaves managed by the IDEP, to perform work for individual customers. Examples of exclaves include virtual machines (VMs) and/or servers that the IDEP maintains to run DE tools for customers who may need such services.

Digital twin: According to the DAU, a digital twin is "a virtual replica of a physical entity that is synchronized across time. Digital twins exist to replicate configuration, performance, or history of a system. Two primary sub-categories of digital twin are digital instance and digital prototype." A digital instance is "a virtual replica of the physical configuration of an existing entity; a digital instance typically exists to replicate each individual configuration of a product as-built or as-maintained." A digital prototype is "an integrated multi-physical, multiscale, probabilistic model of a system design; a digital prototype may use sensor information and input data to simulate the performance of its corresponding physical twin; a digital prototype may exist prior to realization of its physical counterpart." Thus, a digital twin is a real-time virtual replica of a physical object or system, with bi-directional information flow between the virtual and physical domains. In some embodiments, a digital twin is a digital replica configured to run in a virtual environment and instantiated through a scripted digital thread, where the digital thread accesses data (e.g., digital artifacts) from a set of digital models through splicing. A digital twin may be instantiated, run, or executed, through a digital thread. Updating a digital twin may include the actions of modifying, deleting, and/or adding data to its twin configuration, to an associated digital thread, or to an associated digital model associated with the updated digital twin. In one embodiment, digital twins may be ephemeral and may have in-built time and space restrictions (see "twin configuration" definition below). In various embodiments, a physical twin is a physical object instantiated in a physical environment based on a set of model files through an MBSE manufacturing and/or prototyping process. In various embodiments, digital twins can be created for both physical products and physical processes. They are not limited to tangible items like machinery or vehicles; they can also simulate complex physical processes, such as manufacturing workflows or supply chain logistics, to improve efficiency and predict outcomes. This flexibility allows digital twins to be applied across various industries and scenarios.

Authoritative twin: A reference design configuration at a given stage of a product life cycle. At the design stage, an authoritative twin is the twin configuration that represents the best design target. At the operational stage, an authoritative twin is the twin configuration that best responds to the actual conditions on the ground or "ground-truths".

Admins or Administrators: Project managers or other authorized users. Admins may create templates in the documentation system and have high-level permissions to manage settings in the IDEP.

Requesters: Users who use the platform for the implementation of the modeling and simulations towards certification and other purposes, and who may generate documentation in the digital documentation system, but do not have admin privileges to alter the required templates, document formats, or other system settings.

Reviewers/Approvers: Users who review and/or approve templates, documents, or other system data.

Contributors: Users who provide comments or otherwise contribute to the IDEP.

Digital Model: A computer-generated model that represents characteristics or behaviors of a complex product, system, or process. Digital models include DE models but are not limited to the field of digital engineering. For example, digital models include medical model files used to build digital twins of patients (e.g., digital patients), such as clinical documentation, laboratory results, physiological test results, psychological test results, patient communications and reports, patient medical data, health records, remote monitoring data, and the like. Digital models also include the financial models used to build digital twins of financial assets, such as enterprise data, business financial data, process data (e.g., manufacturing, logistics, sales, supply chain), research results, etc. Other examples of digital models are also within the scope of the present invention, for example, scientific models, geophysical models, climate models, biological models, biochemical models, chemical models, drug models, petrochemical models, oceanographic models, business process models, management science models, economic models, econometric models, sociological models, population dynamics models, socioeconomic models, planetary science models, mining models, mineral models, metallurgical models, supply chain logistics models, manufacturing models, and so on. Digital models include one or more digital artifacts, where each digital artifact is accessible with a security network. A model file can be created or modified using a software tool. A model file within the IDMP as disclosed herein refers to any digital file uploaded onto the platform. All the terms and concepts defined above and included herein, including model splicing, model splices, and software-defined digital threads, apply in the context of the digital model and within the context of the IDMP.

Interconnected Digital Model Platform (IDMP): Embodiments of the IDMP as disclosed herein include interconnected infrastructure, environment, and methodology (process, methods, and tools) used to store, access, analyze, visualize, and modify data and digital models associated with a product or system. In some embodiments, IDMPs include software platforms running on hardware to realize the aforementioned capabilities under zero-trust principles. Specifically, an embodiment of the IDMP is a software platform that interconnects a plurality of spliced model files through one or more software-defined digital threads. The expressions "Interconnected Digital Model Platform" and "Integrated Digital Model Platform" are used interchangeably herein. Any feature, embodiment, or description disclosed in relation to the IDEP, applies equally to the IDMP, and vice versa.

Security Network: A set of networked resources having identical access control restrictions (e.g., a security level), where each networked resource provides access to one or more digital model files.

Information security networks are security networks that are configured to maintain the confidentiality, integrity, and availability of digital information (e.g., digital model data) through cybersecurity measures such as encryption, firewalls, intrusion detection systems, and access controls.

Information Security (Infosec) Levels: Also referred to as "security levels", information security (Infosec) levels designate classifications assigned to data and operations based on sensitivity and security requisites, dictating access control and data handling procedures across networks. In some embodiments, an infosec level may define a security network.

External Feedback: In various embodiments, external feedback comprises feedback data from at least one source external to a given digital twin, including digital twin performance data as received, analyzed or processed by the IDMP. External feedback may also include physical twin performance data, data from a virtual sensor, data from a physical sensor, user input (e.g., a user prompt, or a user response over a GUI), data from a simulation, a product certification file, or a product requirements file. In some embodiments, external feedback may also include feedback from control algorithms or processes in the IDMP that track digital twin performance (e.g., tracking error levels and/or tolerance between digital and corresponding physical twin data). External feedback data can also include feedback data that is external to the IDMP.

Twin Configuration: A twin configuration includes data specifying the configuration of a digital or a physical twin. Twin configurations may include a twin version identifier identifying the digital twin, one or more digital thread identifiers identifying the digital threads responsible for instantiating and running a twin, one or more model representation identifiers (e.g., URIs) identifying the model representations that are used by the twin, and an authoritative twin indicator (e.g., a boolean or binary variable) indicating whether the twin is an authoritative twin. The various twin configurations associated with the various physical and digital twins of a given product may be stored in a twin configuration set of the IDMP. In some embodiments, the twin configuration set acts as a specification database for the various digital and physical twins for one or more products or systems. In some embodiments, the twin configuration of a digital twin may include time and space restrictions on the associated digital twin, such as a validity time frame, a validity cutoff time, a validity space, or a validity geographical area (e.g., geofencing, proximity to another twin configuration).

Zero-knowledge approach: A zero-knowledge approach in data operations refers to a method where computational processes and data analyses are conducted such that the underlying data remains completely confidential and undisclosed to the parties performing the operations. This technique enables the validation, aggregation, and processing of data without exposing the actual data content, thereby preserving privacy and confidentiality.

Workflow: A workflow typically representing an entire process or sequence of operations that achieves a specific goal or outcome. It encompasses the complete set of activities, from initiation to completion, that are required to fulfill a business process or software function. Workflows often involve multiple participants, systems, or departments and can be complex, involving branching paths, decision points, and parallel processes.

Digital Workflow: A digital workflow refers to a series of digital tasks and process steps that are carried out electronically to achieve a specific outcome. Digital workflows involve the use of digital tools, software applications, and technologies to streamline and manage various activities within an organization or project. They often enable full or partial automation, and typically include elements such as data input, information processing, task assignment, approval processes, and document management, all conducted in a digital environment.

Tasks and Process Steps: A task is usually a subset of a workflow and represents a discrete unit of work that needs to be completed as part of the larger process. Tasks are more specific and focused than workflows and are often assigned to individual agents. They have defined inputs, outputs, and objectives. Multiple tasks typically make up a workflow, and each task contributes to the overall goal of the workflow. A process step, or simply "step", in turn, is the smallest unit of work within this hierarchy. Process steps are the individual actions or operations that, when combined, form a task. They are highly specific, often atomic actions that represent the most granular level of detail in a workflow. Multiple process steps are usually required to complete a single task, and the successful execution of all steps results in the completion of the task. In the context of digital workflows, the terms "digital task", "digital workflow task", and "digital engineering task" are used interchangeably herein.

Digital Task Implementation: An orchestration script, or a platform script, may be generated over the IDMP to implement a digital task including one or more process steps, where the "implementation" of the digital task through an orchestration script means that the orchestration script includes instructions carrying out each process step required to complete the digital task.

Resource-capability mapping: A framework for identifying and linking available resources with the capabilities they enable or support. An exemplary resource-capability mapping is the IDMP API, or platform API, where the resource refers to third-party tools and functions integrated into and accessible via the IDMP, and where the exemplary capability refers to IDMP functions written in scripts for completing certain tasks using the available resource. Such resource-capability mappings may be used to identify how tool-specific resources such as tool functions, access and control capabilities, human-machine interfaces, processes, and objects can be allocated, invoked, and utilized efficiently and effectively to achieve specific IDMP platform functions or tasks. Resource capability mapping also assists with zero-knowledge implementations where the capability details are available to a user while the specific digital tool resource or its functions are only mapped within the customer environment. Another example of the resource-capability mapping framework is the variable mapping table disclosed herein.

CONCLUSIONS

One of ordinary skill in the art knows that the use cases, structures, schematics, flow diagrams, and steps may be performed in any order or sub-combination, while the inventive concept of the present invention remains without departing from the broader scope of the invention. Every embodiment may be unique, and step(s) of method(s) may be either shortened or lengthened, overlapped with other activities, postponed, delayed, and/or continued after a time gap, such that every active user and running application program is accommodated by the server(s) to practice the methods of the present invention.

For simplicity of explanation, the embodiments of the methods of this disclosure are depicted and described as a series of acts or steps. However, acts or steps in accordance with this disclosure can occur in various orders and/or concurrently, and with other acts or steps not presented and described herein. Furthermore, not all illustrated acts or steps may be required to implement the methods in accordance with the disclosed subject matter. In addition, those skilled in the art will understand and appreciate that the methods could alternatively be represented as a series of interrelated states via a state diagram or events or their equivalent.

As used herein, the singular forms "a," "an," and "the" include plural references unless the context clearly indicates otherwise. Thus, for example, reference to "a cable" includes a single cable as well as a bundle of two or more different cables, and the like.

The terms "comprise," "comprising," "includes," "including," "have," "having," and the like, used in the specification and claims are meant to be open-ended and not restrictive, meaning "including but not limited to."

In the foregoing description, numerous specific details are set forth, such as specific structures, dimensions, processes, parameters, etc., to provide a thorough understanding of the present invention. The particular features, structures, materials, or characteristics may be combined in any suitable manner in one or more embodiments. The words "example", "exemplary", "illustrative" and the like, are used herein to mean serving as an example, instance, or illustration. Any aspect or design described herein as "example" or its equivalents is not necessarily to be construed as preferred or advantageous over other aspects or designs. Rather, use of the words "example" or equivalents is intended to present concepts in a concrete fashion.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A, X includes B, or X includes both A and B, then "X includes A or B" is satisfied under any of the foregoing instances.

Reference throughout this specification to "an embodiment," "certain embodiments," or "one embodiment" means that a particular feature, structure, or characteristic described in connection with the embodiment is included in at least one embodiment. Thus, the appearances of the phrase "an embodiment," "certain embodiments," or "one embodiment" throughout this specification are not necessarily all referring to the same embodiment.

As used herein, the term "about" in connection with a measured quantity, refers to the normal variations in that measured quantity, as expected by one of ordinary skill in the art in making the measurement and exercising a level of care commensurate with the objective of measurement and the precision of the measuring equipment. For example, in some exemplary embodiments, the term "about" may include the recited number ±10%, such that "about 10" would include from 9 to 11. In other exemplary embodiments, the term "about" may include the recited number ±X %, where X is considered the normal variation in said measurement by one of ordinary skill in the art.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom. Features of the transitory physical storage medium described may be incorporated into/used in a corresponding method, digital documentation system and/or system, and vice versa.

Although the present invention has been described with reference to specific exemplary embodiments, it will be evident that the various modifications and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention, as defined by the claims.

What is claimed is:

1. One or more non-transitory physical storage media storing program code, the program code executable by a processor, the program code when executed by the processor causing the processor to implement a computerized process for interacting with a live digital object, the program code comprising code to:

generate the live digital object using a software-code-defined digital thread, wherein the live digital object comprises a digital artifact extracted from digital model data of a digital model file through a model representation, wherein the model representation comprises model-type-specific locators to the digital model data, wherein the live digital object is located in an object customer environment and the digital model file is located in a model customer environment that is distinct from the object customer environment, and wherein a notification of a modification of the digital model data appears in the live digital object within a predetermined delay;

initiate a connection to a multimodal interface, wherein the multimodal interface is configured to receive input from at least two different modalities, and wherein the multimodal interface is configured to output the at least two different modalities;

receive a security level of a first user;

determine an access permission of the first user to access the digital artifact and a modification permission of the first user to modify the digital artifact, based on the security level of the first user;

output to the multimodal interface, through the connection, the digital artifact based on the access permission of the first user to access the digital artifact;

receive from the multimodal interface, through the connection, an input from the first user related to the digital artifact; and generate a modified digital artifact from the digital artifact via the model representation, based on the modification permission of the first user to modify the digital artifact, and based on the input from the first user.

2. The one or more non-transitory physical storage media of claim 1, wherein the input from the first user comprises a spatial input, and wherein the program code further comprises code to:

display a plurality of authorized artifacts based on the security level of the first user, receive the spatial input from the first user comprising a first gestural input to select one of the plurality of authorized artifacts;

receive the spatial input from the first user comprising a second gestural input for a placement of the one of the plurality of authorized artifacts; and update the live digital object based on the placement of one of the plurality of authorized artifacts.

3. The one or more non-transitory physical storage media of claim 2, wherein the program code further comprises code to:

generate an orchestration script accessing the one of the plurality of authorized artifacts, wherein the orchestration script comprises instructions to generate a new live digital object, and wherein a new security level of the new live digital object is based on a given security level of the one of the plurality of authorized artifacts.

4. The one or more non-transitory physical storage media of claim 1, wherein the model representation comprises a model splice connected to the digital model file, wherein the model splice comprises one or more splice data items, one or more splice data structures, and a splice function providing access to the digital artifact, and wherein the access to the digital artifact is provided through an Application Programming Interface (API) or a Software Development Kit (SDK) endpoint.

5. The one or more non-transitory physical storage media of claim 4, wherein the live digital object is maintained using the software-code-defined digital thread, wherein the software-code-defined digital thread comprises instructions to access the model splice, and wherein the software-code-defined digital thread comprises instructions to access the digital model file and a different digital model file.

6. The one or more non-transitory physical storage media of claim 5, wherein the digital model file and the different digital model file are from different software tools, and wherein the software-code-defined digital thread accesses a different digital artifact through a different model splice connected to the different digital model file.

7. The one or more non-transitory physical storage media of claim 4, wherein the program code further comprises code to modify the model representation, wherein the code to modify the model representation comprises code to update the model splice, wherein the code to update the model splice comprises code to update a splice feature of the model splice selected from the group of splice features consisting of a given splice data item of the model splice, a given splice data structure of the model splice, and a given splice function of the model splice.

8. The one or more non-transitory physical storage media of claim 1, wherein the live digital object is a live digital document, and wherein the modified digital artifact appears on the live digital document within the predetermined delay.

9. The one or more non-transitory physical storage media of claim 1, wherein the program code further comprises code to:

send the modified digital artifact to a second user;

receive a feedback instruction from the second user; and responsive to action or approval of the first user, further modify the digital model file based on the feedback instruction from the second user.

10. The one or more non-transitory physical storage media of claim 1, wherein the live digital object is in an interconnected digital model platform (IDMP), wherein the IDMP comprises a natural language processing (NLP) module configured to engage in a dialogue with the first user based on the input from the first user, and wherein the multimodal interface is further configured to communicate with the first user in natural language.

11. The one or more non-transitory physical storage media of claim 10, wherein the multimodal interface comprises a conversational interface configured to receive an audio-based input, and wherein the input from the first user comprises a voice-based input.

12. The one or more non-transitory physical storage media of claim 1, wherein the input from the first user comprises a spatial input comprising at least one of an augmented reality (AR) input, a virtual reality (VR) input, a mixed reality (MR) input, and a gestural input.

13. The one or more non-transitory physical storage media of claim 12, wherein the multimodal interface comprises a spatial computing interface comprising a video input module, an audio input module, and a gesture input module, wherein a video-based input is captured via video received at the video input module, wherein an audio-based input is captured via audio received at the audio input module, and wherein at least one gesture is extracted via the gestural input module.

14. A system for interacting with a live digital object, comprising:

at least one processor; and at least one memory storing program code, the program code executable by the at least one processor to cause the at least one processor to execute a process for interacting with the live digital object, the program code comprising code to:

generate the live digital object using a software-code-defined digital thread, wherein the live digital object comprises a digital artifact extracted from digital model data of a digital model file through a model representation, wherein the model representation comprises model-type-specific locators to the digital model data, wherein the live digital object is located in an object customer environment and the digital model file is located in a model customer environment that is distinct from the object customer environment, and wherein a notification of a modification of the digital model data appears in the live digital object within a predetermined delay;

initiate a connection to a multimodal interface, wherein the multimodal interface is configured to receive input from at least two different modalities, and wherein the multimodal interface is configured to output the at least two different modalities;

receive a security level of a first user;

determine an access permission of the first user to access the digital artifact and a modification permission of the first user to modify the digital artifact, based on the security level of the first user;

output to the multimodal interface, through the connection, the digital artifact based on the access permission of the first user to access the digital artifact;

receive from the multimodal interface, through the connection, an input from the first user related to the digital artifact; and generate a modified digital artifact from the digital artifact via the model representation, based on the modification permission of the first user to modify the digital artifact, and based on the input from the first user.

15. A computer-implemented method for interacting with a live digital object, comprising:

generating the live digital object using a software-code-defined digital thread, wherein the live digital object comprises a digital artifact extracted from digital model data of a digital model file through a model representation, wherein the model representation comprises model-type-specific locators to the digital model data, wherein the live digital object is located in an object customer environment and the digital model file is located in a model customer environment that is distinct from the object customer environment, and wherein a notification of a modification of the digital model data appears in the live digital object within a predetermined delay;

initiating a connection to a multimodal interface, wherein the multimodal interface is configured to receive input from at least two different modalities, and wherein the multimodal interface is configured to output the at least two different modalities;

receiving a security level of a first user;

determining an access permission of the first user to access the digital artifact and a modification permission of the first user to modify the digital artifact, based on the security level of the first user;

outputting to the multimodal interface, through the connection, the digital artifact based on the access permission of the first user to access the digital artifact;

receiving from the multimodal interface, through the connection, an input from the first user related to the digital artifact; and generating a modified digital artifact from the digital artifact via the model representation, based on the modification permission of the first user to modify the digital artifact, and based on the input from the first user.

16. The computer-implemented method of claim 15, wherein the digital artifact is located in the model customer environment along with the digital model file.

17. The computer-implemented method of claim 15, wherein the object customer environment is the first user's customer environment.

18. The computer-implemented method of claim 17, wherein the digital artifact is represented in the live digital object as a live chip comprising a live link to the digital artifact, and wherein the method further comprises:

authenticating the first user for access to the digital artifact;

alerting the first user that the digital artifact is ready for access, through a visual cue within the live chip displayed in one of the two different modalities; and authorizing the first user to access the digital artifact, upon receiving the input from the first user.

19. The computer-implemented method of claim 15, further comprising:

generating an orchestration script based on the model representation, wherein the model representation comprises access to a selective portion of the digital artifact, wherein the model representation comprises an external, commonly-accessible function script, wherein the external, commonly-accessible function script provides one or more addressable Application Programming Interface (API) or Software Development Kit (SDK) endpoints that are accessible by third-party applications and users, wherein the addressable API or SDK endpoints enable access to the digital artifact without access to an entirety of the digital model file, and wherein the model representation is accessible via the addressable API or SDK endpoints by the third-party applications and users; and executing the orchestration script to generate the live digital object, wherein the live digital object is configured through the orchestration script to access the digital artifact.

20. The computer-implemented method of claim 15, wherein the live digital object further comprises a second digital artifact extracted from a second digital model, and wherein the digital artifact and the second digital artifact are accessed by the first user through distinct modalities of the at least two different modalities.

* * * * *